(12) United States Patent
Yoshinari et al.

(10) Patent No.: US 11,885,995 B2
(45) Date of Patent: Jan. 30, 2024

(54) IMAGE DISPLAY APPARATUS, INFORMATION DISPLAY SYSTEM FOR VEHICLE, AND OPTICAL FILM

(71) Applicant: FUJIFILM Corporation, Tokyo (JP)

(72) Inventors: Shinichi Yoshinari, Minamiashigara (JP); Isao Fujiwara, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/848,764

(22) Filed: Jun. 24, 2022

(65) Prior Publication Data

US 2022/0326424 A1  Oct. 13, 2022

Related U.S. Application Data

(63) Continuation of application No. PCT/JP2020/044247, filed on Nov. 27, 2020.

(30) Foreign Application Priority Data

Dec. 27, 2019 (JP) .................................. 2019-238746
Aug. 21, 2020 (JP) .................................. 2020-139926

(51) Int. Cl.
*G02B 5/30* (2006.01)
*B60K 35/00* (2006.01)
(Continued)

(52) U.S. Cl.
CPC ............ *G02B 5/3016* (2013.01); *B60K 35/00* (2013.01); *C09K 19/3852* (2013.01);
(Continued)

(58) Field of Classification Search
CPC ............ G02B 5/3016; B60K 2370/152; B60K 2370/23; B60K 2370/33; B60K 2370/37;
(Continued)

(56) References Cited

U.S. PATENT DOCUMENTS

2003/0133207 A1   7/2003  Minami et al.
2010/0092784 A1   4/2010  Kamada et al.
(Continued)

FOREIGN PATENT DOCUMENTS

JP    2003-58066 A    2/2003
JP    2008-165201 A   7/2008
(Continued)

OTHER PUBLICATIONS

International Preliminary Report on Patentability and Written Opinion of the International Searching Authority for International Application No. PCT/JP2020/044247, dated Jul. 7, 2022, with an English translation.
(Continued)

*Primary Examiner* — Ruiyun Zhang
(74) *Attorney, Agent, or Firm* — Birch, Stewart, Kolasch & Birch, LLP

(57) ABSTRACT

Provided is a low-cost image display apparatus that has asymmetry in the display characteristics in the right-to-left direction, displays a clear image to the driver, exhibits an appropriate viewing angle control function that reduces reflected glare on the window glass, and is thinly made while causing no moire, and there are also provided an information display system for a vehicle, and an optical film. The image display apparatus includes a viewing-side polarizing plate, a liquid crystal cell, a backlight-side polarizing plate, an optical film, and a backlight in this order, in which the optical film includes an optically anisotropic layer and a polarizer in this order from the liquid crystal cell side, the absorption axis of the backlight-side polarizing plate and the absorption axis of the polarizer are parallel or orthogonal to (Continued)

each other, the optically anisotropic layer is optically uniaxially anisotropic, while in a case where the optic axis of the optically anisotropic layer is projected onto the polarizer as viewed from the viewing-side of the image display apparatus, the azimuthal angle of the optic axis is +50° to +70° or −50° to −70° with respect to the horizontal direction, the average tilt angle of the optic axis with respect to the main surface of the optically anisotropic layer is 20° to 45°, and the in-plane phase difference Re (550) of the optically anisotropic layer is 70 nm to 240 nm.

7 Claims, 29 Drawing Sheets

(51) Int. Cl.
  *C09K 19/38* (2006.01)
  *C09K 19/56* (2006.01)
  *C09K 19/04* (2006.01)

(52) U.S. Cl.
  CPC ........ *C09K 19/56* (2013.01); *B60K 2370/152* (2019.05); *B60K 2370/18* (2019.05); *B60K 2370/23* (2019.05); *B60K 2370/33* (2019.05); *B60K 2370/37* (2019.05); *C09K 2019/0448* (2013.01); *C09K 2323/00* (2020.08); *C09K 2323/03* (2020.08)

(58) Field of Classification Search
  CPC ................ C09K 19/56; C09K 19/3852; C09K 2019/0448; C09K 2323/00; C09K 2323/03
  USPC .................................................. 428/1.1, 1.3
  See application file for complete search history.

(56) References Cited

U.S. PATENT DOCUMENTS

| | | |
|---|---|---|
| 2018/0113334 A1 | 4/2018 | Fang et al. |
| 2019/0079232 A1 | 3/2019 | Saito et al. |
| 2019/0154896 A1 | 5/2019 | Yanai |

FOREIGN PATENT DOCUMENTS

| | | |
|---|---|---|
| JP | 2010-266743 A | 11/2010 |
| JP | 2011-248114 A | 12/2011 |
| JP | 2018-72819 A | 5/2018 |
| JP | 2019-40354 A | 3/2019 |
| WO | WO 2017/199973 A1 | 11/2017 |
| WO | WO 2018/003380 A1 | 1/2018 |

OTHER PUBLICATIONS

International Search Report for International Application No. PCT/JP2020/044247, dated Feb. 9, 2021, with an English translation.
Japanese Notice of Reasons for Refusal for Japanese Application No. 2021-567095, dated Feb. 28, 2023, with an English translation.

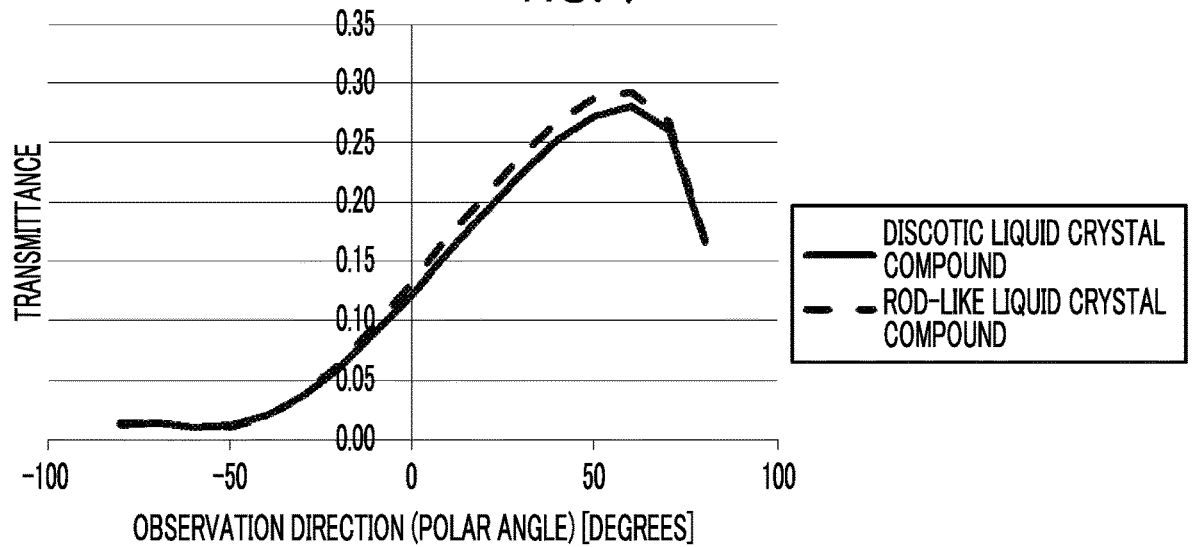
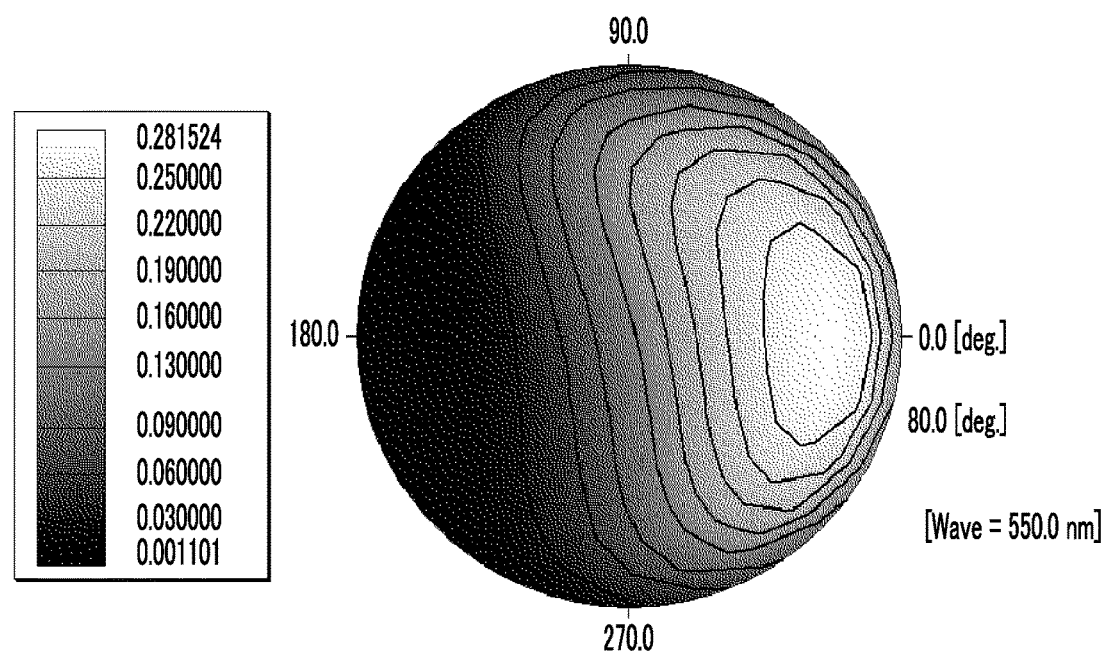

FIG. 25
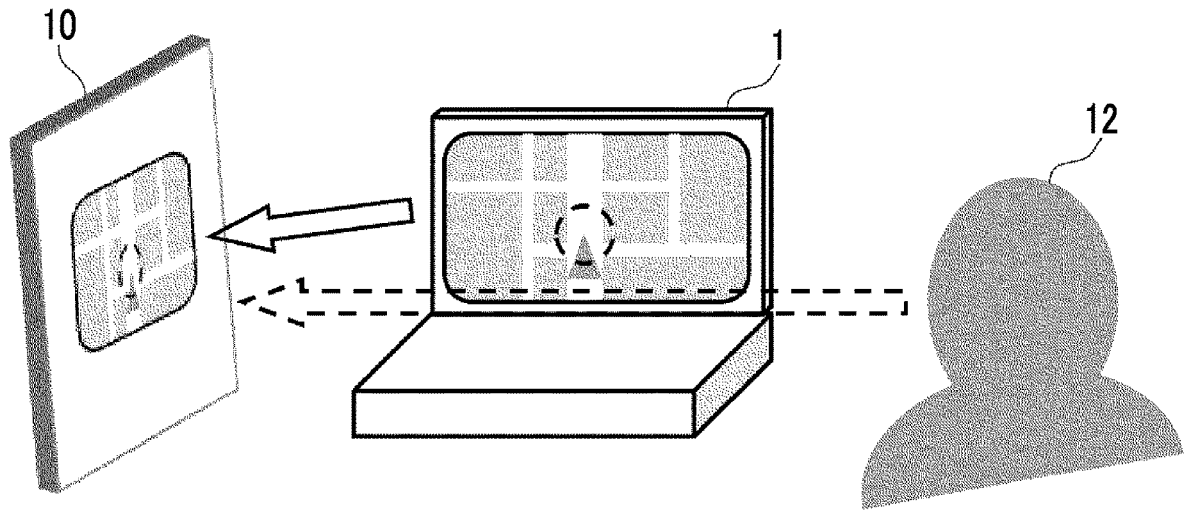
FIG. 26
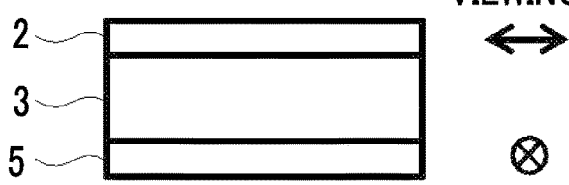

EXAMPLE 1-2

EXAMPLE 1-3

EXAMPLE 1-4

EXAMPLE 1-5

COMPARATIVE EXAMPLE 1-5

COMPARATIVE EXAMPLE 1-6

FIG. 43
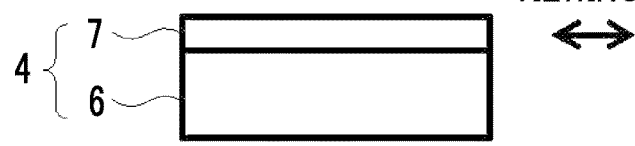
IN-PLANE AXIS
DIRECTION AS
VIEWED FROM
VIEWING SIDE
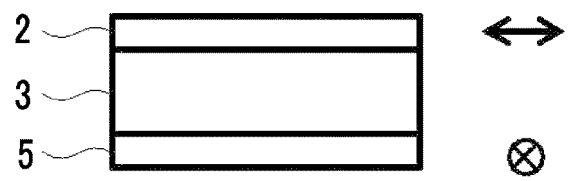
FIG. 44
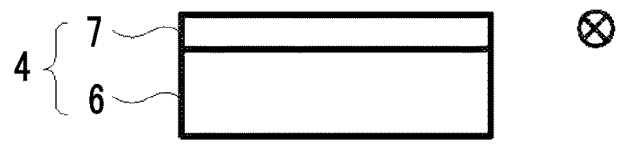
IN-PLANE AXIS
DIRECTION AS
VIEWED FROM
VIEWING SIDE
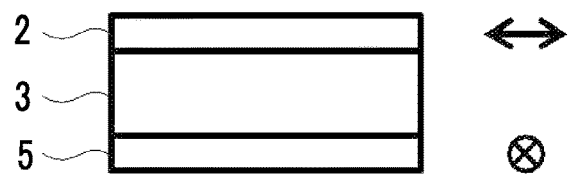

EXAMPLE 2-1

EXAMPLE 2-2

EXAMPLE 2-3

EXAMPLE 2-4

Transmittance contour

EXAMPLE 2-5

EXAMPLE 2-6

COMPARATIVE EXAMPLE 2-6

IMAGE DISPLAY APPARATUS, INFORMATION DISPLAY SYSTEM FOR VEHICLE, AND OPTICAL FILM

CROSS-REFERENCE TO RELATED APPLICATIONS

This application is a Continuation of PCI International Application No. PCT/JP2020/044247 filed on Nov. 27, 2020, which claims priority under 35 U.S.C. § 119(a) to Japanese Patent Application No. 2019-238746 filed on Dec. 27, 2019 and Japanese Patent Application No. 2020-139926 filed on Aug. 21, 2020. Each of the above applications is hereby expressly incorporated by reference, in its entirety, into the present application.

BACKGROUND OF THE INVENTION

1. Field of the Invention

The present invention relates to an image display apparatus, an information display system for a vehicle equipped with the image display apparatus, and an optical film used in this image display apparatus.

2. Description of the Related Art

Image display apparatuses are required to have a wide viewing angle in use applications such as televisions, monitors, and mobile devices. Particularly, a liquid crystal display device is optically compensated by using a retardation film or the like in order to widen the viewing angle. Furthermore, many display devices that can realize wide viewing angles without requiring special optical compensation, such as an in-plane switching mode liquid crystal display device and an organic electroluminescence image display apparatus, have also been proposed.

In contrast, a louver film has been proposed as a method of deliberately limiting the viewing angle for the purpose of protecting privacy (JP2003-58066A). Furthermore, it has been proposed to impart a desired viewing angle limiting function by providing an electro-optical element for controlling the viewing angle (JP2018-72819A).

Meanwhile, in recent years, an information display system for a vehicle has been proposed, which not only delivers the state around the vehicle to the driver as in the past but also repeatedly displays the display that calls the driver's attention and the distance between the vehicle and an obstacle and assists the driver in safe driving, by replacing the side mirrors and rear-view mirrors of automobiles with display devices. Furthermore, there has been proposed a system which secures the driver's field of vision by covering a vehicle body structure that obstructs the driver's field of vision, such as a side pillar, with an image display apparatus and displaying an image that complements the obstructed field of vision (JP2019-40354A).

As the image display apparatus incorporated into such a system, the above-mentioned liquid crystal display device, organic electroluminescence display device, and the like can be applied. Due to the structural design of the vehicle, since it is not always possible to dispose the driver and the image display apparatus so as to face each other, it is necessary that the image display apparatus can correctly display both color and brightness even from various angles (polar angles and azimuthal angles). However, in an image display apparatus capable of uniform display over a wide range of azimuthal angles and polar angles, there is a risk that the displayed image may be unintentionally reflected on a reflector such as a windshield or a window glass, which may rather obstruct the driver.

SUMMARY OF THE INVENTION

In order to prevent such reflected glare, it is conceivable to apply the above-mentioned louver film or electro-optical element to an image display apparatus. However, conventional louver films have symmetry horizontally or vertically, and it is difficult to achieve both the display of a clear image to the driver and the reduction of reflected glare on the window glass. Furthermore, moire may occur depending on the azimuth and angle of observation. When a louver film is combined with an electro-optical element that controls the viewing angle, the visible range (observation direction in which the image on the display can be seen) can be controlled relatively freely; however, the thickness of the device increases so that it is difficult to mount the combination in the limited space inside a vehicle, and the manufacturing cost also increases high.

An object of the present invention is to solve such a problem, and the object is to provide a low-cost image display apparatus that has asymmetry in the display characteristics in the right-to-left direction, displays a clear image to the driver, exhibits an appropriate viewing angle control function that reduces reflected glare on the window glass, and is thinly made while causing no moire, as well as an information display system for a vehicle and an optical film.

The inventors of the present invention have found that the above-described problems can be solved by the following configurations.

[1] An image display apparatus comprising in the following order:
a viewing-side polarizing plate;
a liquid crystal cell;
a backlight-side polarizing plate;
an optical film; and
a backlight,
in which the optical film includes an optically anisotropic layer and a polarizer in this order from a liquid crystal cell side,
an absorption axis of the backlight-side polarizing plate and an absorption axis of the polarizer are parallel or orthogonal to each other,
the optically anisotropic layer is optically uniaxially anisotropic, while in a case where an optic axis of the optically anisotropic layer is projected onto the polarizer as viewed from a viewing-side of the image display apparatus, an azimuthal angle of the optic axis of the optically anisotropic layer is +50° to +70° or −50° to −70° with respect to a horizontal direction,
an average tilt angle of the optic axis with respect to a main surface of the optically anisotropic layer is 20° to 45°, and
an in-plane phase difference Re (550) of the optically anisotropic layer at a wavelength of 550 nm is 70 nm to 240 nm.

[2] An image display apparatus comprising:
a viewing-side polarizing plate;
a liquid crystal cell;
a backlight-side polarizing plate;
an optical film; and
a backlight in this order, in which the optical film includes an optically anisotropic layer and a polarizer in this order from a liquid crystal cell side, an absorption axis of the backlight-side polarizing plate and an absorption axis of the polarizer are parallel or orthogonal to each other, the optically anisotropic layer is an optically anisotropic layer in which optically anisotropic bodies having positive birefringence are hybrid-aligned, while in a case where a slow axis of the optically anisotropic layer is projected onto the polarizer as viewed from a viewing-side of the image display apparatus, an azimuthal angle of the slow axis is +50° to +70° or −50° to −70° with respect to a horizontal direction, the average tilt angle of the slow axis with respect to the main surface of the optically anisotropic layer is 20° to 45°, and an in-plane phase difference Re (550) of the optically anisotropic layer at a wavelength of 550 nm is 70 nm to 240 nm.

[3] An image display apparatus comprising:
a viewing-side polarizing plate;
a liquid crystal cell;
a backlight-side polarizing plate;
an optical film; and
a backlight in this order, in which the optical film includes an optically anisotropic layer and a polarizer in this order from a liquid crystal cell side, an absorption axis of the backlight-side polarizing plate and an absorption axis of the polarizer are parallel or orthogonal to each other, the optically anisotropic layer is an optically anisotropic layer in which optically anisotropic bodies having negative birefringence are hybrid-aligned, while in a case where a fast axis of the optically anisotropic layer is projected onto the polarizer as viewed from a viewing-side of the image display apparatus, an azimuthal angle of the fast axis is +50° to +70° or −50° to −70° with respect to a horizontal direction, an average tilt angle of the fast axis with respect to a main surface of the optically anisotropic layer is 20° to 45°, and an in-plane phase difference Re (550) of the optically anisotropic layer at a wavelength of 550 nm is 70 nm to 240 nm.

[4] An image display apparatus comprising:
an optical film;
a viewing-side polarizing plate;
a liquid crystal cell;
a backlight-side polarizing plate; and
a backlight in this order, in which the optical film includes an optically anisotropic layer and a polarizer in this order from a liquid crystal cell side, an absorption axis of the viewing-side polarizing plate and an absorption axis of the polarizer are parallel or orthogonal to each other, the optically anisotropic layer is optically uniaxially anisotropic, while in a case where an optic axis of the optically anisotropic layer is projected onto the polarizer as viewed from a viewing-side of the image display apparatus, an azimuthal angle of the optic axis of the optically anisotropic layer is +50° to +70° or −50° to −70° with respect to a horizontal direction, an average tilt angle of the optic axis with respect to a main surface of the optically anisotropic layer is 20° to 45°, and an in-plane phase difference Re (550) of the optically anisotropic layer at a wavelength of 550 nm is 70 nm to 240 nm.

[5] An image display apparatus comprising:
an optical film;
a viewing-side polarizing plate;
a liquid crystal cell;
a backlight-side polarizing plate; and
a backlight in this order, in which the optical film includes an optically anisotropic layer and a polarizer in this order from a liquid crystal cell side, an absorption axis of the viewing-side polarizing plate and an absorption axis of the polarizer are parallel or orthogonal to each other, the optically anisotropic layer is an optically anisotropic layer in which optically anisotropic bodies having positive birefringence are hybrid-aligned, while in a case where a slow axis of the optically anisotropic layer is projected onto the polarizer as viewed from a viewing-side of the image display apparatus, an azimuthal angle of the slow axis is +50° to +70° or −50° to −70° with respect to a horizontal direction, the average tilt angle of the slow axis with respect to the main surface of the optically anisotropic layer is 20° to 45°, and an in-plane phase difference Re (550) of the optically anisotropic layer at a wavelength of 550 nm is 70 nm to 240 nm.

[6] An image display apparatus comprising:
an optical film;
a viewing-side polarizing plate;
a liquid crystal cell;
a backlight-side polarizing plate; and
a backlight in this order, in which the optical film includes an optically anisotropic layer and a polarizer in this order from a liquid crystal cell side, an absorption axis of the viewing-side polarizing plate and an absorption axis of the polarizer are parallel or orthogonal to each other, the optically anisotropic layer is an optically anisotropic layer in which optically anisotropic bodies having negative birefringence are hybrid-aligned, while in a case where a fast axis of the optically anisotropic layer is projected onto the polarizer as viewed from a viewing-side of the image display apparatus, an azimuthal angle of the fast axis is +50° to +70° or −50° to −70° with respect to a horizontal direction, an average tilt angle of the fast axis with respect to a main surface of the optically anisotropic layer is 20° to 45°, and an in-plane phase difference Re (550) of the optically anisotropic layer at a wavelength of 550 nm is 70 nm to 240 nm.

[7] The image display apparatus according to [1] or [4],
in which the optically anisotropic layer has a liquid crystal cured layer formed of a liquid crystal composition including a liquid crystal compound, and
the liquid crystal compound is aligned so as to be uniformly inclined over a thickness direction in the liquid crystal cured layer.

[8] The image display apparatus according to any one of [2], [3], [5], and [6],
in which the optically anisotropic layer has a liquid crystal cured layer formed of a liquid crystal composition including a liquid crystal compound, and the liquid crystal compound is hybrid-aligned over a thickness direction in the liquid crystal cured layer.

[9] The image display apparatus according to [7] or [8], in which the liquid crystal compound is a disk-like liquid crystal compound or a rod-like liquid crystal compound.

[10] The image display apparatus according to any one of [1] to [9],
in which an in-plane phase difference Re (λ) of the optically anisotropic layer satisfies relationships of the following Formula (1) and Formula (2):

$$Re(450)/Re(550)<1.0 \quad (1)$$

$$Re(650)/Re(550)>1.0 \quad (2).$$

[11] The image display apparatus according to any one of [1] to [10],
in which the optically anisotropic layer has a liquid crystal cured layer formed by using a liquid crystal composition including a liquid crystal compound, and
the liquid crystal composition includes 0.1 to 3.0 parts by mass of a polymer A including at least constitutional units represented by General Formula (1) and General Formula (2), which will be described later, per 100 parts by mass of the liquid crystal compound.

[12] An information display system for a vehicle, comprising the image display apparatus according to any one of [1] to [11].

[13] An optical film comprising at least:
an optically anisotropic layer; and
a polarizer,
in which the optically anisotropic layer is optically untaxially anisotropic, while in a case where an optic axis of the optically anisotropic layer is projected onto the polarizer as viewed from an optically anisotropic layer side, an angle formed by the optic axis and an absorption axis of the polarizer is +50° to +70° or −50° to −70°,
an average tilt angle of the optic axis with respect to a main surface of the optically anisotropic layer is 20° to 45°, and
an in-plane phase difference Re (550) of the optically anisotropic layer at a wavelength of 550 nm is 70 nm to 240 nm.

[14] An optical film comprising at least:
an optically anisotropic layer and
a polarizer,
in which the optically anisotropic layer is an optically anisotropic layer in which optically anisotropic bodies having positive optical birefringence are hybrid-aligned, while in a case where a slow axis of the optically anisotropic layer is projected onto the polarizer as viewed from an optically anisotropic layer side, an angle formed by the slow axis and an absorption axis of the polarizer is +50° to +70° or −50° to −70°,
the average tilt angle of the slow axis with respect to the main surface of the optically anisotropic layer is 20° to 45°, and
an in-plane phase difference Re (550) of the optically anisotropic layer at a wavelength of 550 nm is 70 nm to 240 nm.

[15] An optical film comprising at least:
an optically anisotropic layer; and
a polarizer,
in which the optically anisotropic layer is an optically anisotropic layer in which optically anisotropic bodies having negative optical birefringence are hybrid-aligned, while in a case where a fast axis of the optically anisotropic layer is projected onto the polarizer as viewed from an optically anisotropic layer side, an angle formed by the fast axis and an absorption axis of the polarizer is +50° to +70° or −50° to −70°,
an average tilt angle of the fast axis with respect to a main surface of the optically anisotropic layer is 20° to 45°, and
an in-plane phase difference Re (550) of the optically anisotropic layer at a wavelength of 550 nm is 70 nm to 240 nm.

[16] An optical film comprising at least:
an optically anisotropic layer; and
a polarizer,
in which the optically anisotropic layer is optically uniaxially anisotropic, while in a case where an optic axis of the optically anisotropic layer is projected onto the polarizer as viewed from an optically anisotropic layer side, an angle formed by the optic axis and a transmission axis of the polarizer is +50° to +70° or −50° to −70°,
an average tilt angle of the optic axis with respect to a main surface of the optically anisotropic layer is 20° to 45°, and
an in-plane phase difference Re (550) of the optically anisotropic layer at a wavelength of 550 nm is 70 nm to 240 nm.

[17] An optical film comprising at least:
an optically anisotropic layer; and
a polarizer,
in which the optically anisotropic layer is an optically anisotropic layer in which optically anisotropic bodies having negative optical birefringence are hybrid-aligned, while in a case where a slow axis of the optically anisotropic layer is projected onto the polarizer as viewed from an optically anisotropic layer side, an angle formed by the slow axis and a transmission axis of the polarizer is +50° to +70° or −50° to −70°,
the average tilt angle of the slow axis with respect to the main surface of the optically anisotropic layer is 20° to 45°, and
an in-plane phase difference Re (550) of the optically anisotropic layer at a wavelength of 550 nm is 70 nm to 240 nm.

[18] An optical film comprising at least:
an optically anisotropic layer; and
a polarizer,
in which the optically anisotropic layer is an optically anisotropic layer in which optically anisotropic bodies having negative optical birefringence are hybrid-aligned, while in a case where a fast axis of the optically anisotropic layer is projected onto the polarizer as viewed from an optically anisotropic layer side, an angle formed by the fast axis and a transmission axis of the polarizer is +50° to +70° or −50° to −70°,
an average tilt angle of the fast axis with respect to a main surface of the optically anisotropic layer is 20° to 45°, and
an in-plane phase difference Re (550) of the optically anisotropic layer at a wavelength of 550 nm is 70 nm to 240 nm.

[19] The optical film according to [13] or [16],
in which the optically anisotropic layer has a liquid crystal cured layer formed by using a liquid crystal composition including a liquid crystal compound, and the liquid crystal compound is aligned so as to be uniformly inclined over a thickness direction in the liquid crystal cured layer.

[20] The optical film according to any one of [14], [15], [17], and [18], in which the optically anisotropic layer has a liquid crystal cured layer formed by using a liquid crystal composition including a liquid crystal compound, and the liquid crystal compound is hybrid-aligned in the liquid crystal cured layer.

[21] The optical film according to [19] or [20], wherein the liquid crystal compound is a disk-like liquid crystal compound or a rod-like liquid crystal compound.

[22] The optical film according to any one of [13] to [21], in which an in-plane phase difference Re ($\lambda$) of the optically anisotropic layer satisfies relationships of the following Formula (3) and Formula (4):

$$Re(450)/Re(550) < 1.0 \quad (3)$$

$$Re(650)/Re(550) > 1.0 \quad (4)$$

[23] The optical film according to any one of [13] to [22], in which the optically anisotropic layer has a liquid crystal cured layer formed by using a liquid crystal composition including a liquid crystal compound, and the liquid crystal composition includes 0.1 to 3.0 parts by mass of a polymer A including at least constitutional units represented by General Formula (1) and General Formula (2), which will be described later, per 100 parts by mass of the liquid crystal compound.

According to the present invention, there can be provided a low-cost image display apparatus that has asymmetry in the display characteristics in the right-to-left direction, displays a clear image to the driver, exhibits an appropriate viewing angle control function that reduces reflected glare on the window glass, and is thinly made while causing no moire, as well as an information display system for a vehicle and an optical film.

BRIEF DESCRIPTION OF THE DRAWINGS

FIG. 9 is a graph showing the relationship between the polar angle and the transmittance.

FIG. 10 is a contour diagram showing the simulation results for the configuration in FIG. 5 of the image display apparatus according to the embodiment of the invention.

FIG. 25 is a diagram for explaining an evaluation method in the Examples.

FIG. 26 is a conceptual diagram showing a configuration of the image display apparatus in a simulation.

FIG. 43 is a conceptual diagram showing a configuration of the image display apparatus in a simulation.

FIG. 44 is a conceptual diagram showing a configuration of the image display apparatus in a simulation.

DESCRIPTION OF THE PREFERRED EMBODIMENTS

Figure 1:
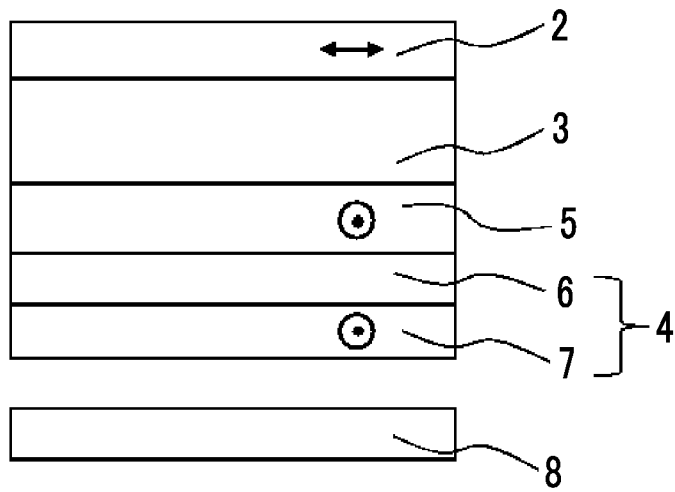
FIG. 1 is a conceptual diagram showing an example of an image display apparatus according to an embodiment of the invention.

Hereinafter, the present invention will be described in detail. In the present specification, a numerical value range represented using the term "to" means a range including the numerical values described before and after "to" as the lower limit value and the upper limit value, respectively.

In the present specification, Re (λ) and Rth (λ) are the in-plane phase difference (in-plane retardation) (nm) at wavelength λ and the retardation (nm) in the thickness direction, respectively. Re (λ) is measured by causing light having a wavelength of λ nm to enter in the normal direction of a film in AxoScan of Axometrics, Inc.

In a case where the film to be measured is represented by a uniaxial or biaxial refractive index ellipsoid, Rth (λ) is calculated by the following method. Upon selecting the measurement wavelength λ nm, measurement can be made by exchanging the wavelength selection filter manually or by converting a measured value using a program or the like.

Regarding Rth (λ), Re (λ) is measured at a total of 7 points by taking the in-plane slow axis (determined by AxoScan) as the tilting axis (rotation axis) (in a case where there is no slow axis, any direction in the film plane is designated as the rotation axis) and causing light with a wavelength of λnm to enter in directions each inclined in 10-degree steps from the normal direction to 60 degrees on one side with respect to the film normal direction, and Rth (λ) is calculated by AxoScan based on the measured retardation values, an assumed value of the average refractive index, and the input film thickness value.

In the above description, in the case of a film having a direction in which the retardation value becomes zero at a certain inclined angle while taking the in-plane slow axis from the normal direction as the rotation axis, the retardation value at an inclined angle larger than the inclined angle is calculated by AxoScan, after changing the sign to the negative sign.

It is also possible that the retardation value is measured in any two inclined directions while taking the slow axis as the tilting axis (rotation axis) (in a case where there is no slow axis, any direction in the film plane is designated as the rotation axis), and Rth is calculated from the following Mathematical Formula (I) and Formula (II) based on the retardation values, the assumed value of the average refractive index, and the input film thickness value.

Mathematical Formula (I)
$$Re(\theta) = \left[nx - \frac{ny \times nz}{\sqrt{\left(ny\sin\left(\sin^{-1}\left(\frac{\sin(-\theta)}{nx}\right)\right)\right)^2 + nz\cos\left(\sin^{-1}\left(\frac{\sin(-\theta)}{nx}\right)\right)^2}}\right] \times \frac{d}{\cos\left(\sin^{-1}\left(\frac{\sin(-\theta)}{nx}\right)\right)}$$

$$Rth = \{(nx + ny)/2 - nz\} \times d \qquad \text{Mathematical Formula (II)}$$

In the formula, Re (θ) represents the retardation value in a direction inclined at the angle θ from the normal direction.

Furthermore, nx represents the refractive index in the slow axis direction in the plane, nv represents the refractive index in a direction orthogonal to nx in the plane, nz represents the refractive index in a direction orthogonal to nx and ny, and d represents the film thickness.

In a case where the film to be measured is a film that cannot be represented by a uniaxial or biaxial refractive index ellipsoid, that is, a film that does not have a so-called optic axis, Rth (λ) is calculated by the following method.

Regarding Rth (λ), Re (λ) is measured at a total of 13 points by taking the in-plane slow axis (determined by AxoScan) as the tilting axis (rotation axis) and causing light with a wavelength of λ nm to enter in directions each inclined in 10-degree steps from −60 degrees to +60 degrees with respect to the film normal direction, and Rth (λ) is calculated by AxoScan based on the measured retardation values, an assumed value of the average refractive index, and the input film thickness value.

Furthermore, in a case where it is said that a film has reverse wavelength dispersibility, this refers to the case where at least either Re (450)/Re (550)<1.0 and Re (650)/Re (550)>1.0, or Rth (450)/Rth (550)<1.0 and Rth (650)/Rth (550)>1.0 is satisfied. In a case where either Re (450)/Re (550)≤1.0 and Re (650)/Re (550)≤1.0, or Rth (450)/Rth (550)≥1.0 and Rth (650)/Rth (550)≥1.0 is satisfied, it is considered as forward wavelength dispersibility.

According to the present invention, a material having negative birefringence means that the refractive index ellipsoid intrinsic to the material has a disk shape. Furthermore, a material having positive birefringence represents a material in which the refractive index ellipsoid intrinsic to the material is a rod shape. The optical axis (optic axis) of the refractive index ellipsoid is the same as the axis of symmetry, and this is the normal direction of the disc plane for a material having negative birefringence, and the major axis direction for a material having positive birefringence.

<Optical Film>

The 1A-th aspect of the optical film according to an embodiment of the invention is an optical film including at least an optically anisotropic layer and a polarizer, wherein the optically anisotropic layer is optically uniaxially anisotropic, while in a case Where an optic axis of the optically anisotropic layer is projected onto the polarizer as viewed from an optically anisotropic layer side, an angle formed by the optic axis and an absorption axis of the polarizer is +50° to +70° or −50° to −70°, an average tilt angle of the optic axis with respect to a main surface of the optically anisotropic layer is 20° to 45°, and the in-plane phase difference Re (550) of an optically anisotropic layer at a wavelength of 550 nm is 70 nm to 240 nm.

The 1B-th aspect of the optical film according to the embodiment of the invention is an optical film including at least an optically anisotropic layer and a polarizer, wherein the optically anisotropic layer is an optically anisotropic body in which optically anisotropic bodies having positive optical birefringence are hybrid-aligned, while in a case where a slow axis of the optically anisotropic layer is projected onto the polarizer as viewed from an optically anisotropic layer side, an angle formed by the slow axis and an absorption axis of the polarizer is +50° to +70° or −50° to −70°, the average tilt angle of the slow axis with respect to the main surface of the optically anisotropic layer is 20° to 45°, and the in-plane phase difference Re (550) of an optically anisotropic layer at a wavelength of 550 nm is 70 nm to 240 nm.

The 1C-th aspect of the optical film according to the embodiment of the invention is an optical film including at least an optically anisotropic layer and a polarizer, wherein the optically anisotropic layer is an optically anisotropic body in which optically anisotropic bodies having negative optical birefringence are hybrid-aligned, while in a case Where a fast axis of the optically anisotropic layer is projected onto the polarizer as viewed from an optically anisotropic layer side, an angle formed by the fast axis and an absorption axis of the polarizer is +50° to +70° or −50° to −70°, an average tilt angle of the fast axis with respect to a main surface of the optically anisotropic layer is 20° to 45°, and the in-plane phase difference Re (550) of an optically anisotropic layer at a wavelength of 550 nm is 70 nm to 240 nm.

The 2A-th aspect of the optical film according to the embodiment of the invention is an optical film including at least an optically anisotropic layer and a polarizer, wherein the optically anisotropic layer is optically uniaxially anisotropic, while in a case where an optic axis of the optically anisotropic layer is projected onto the polarizer as viewed from an optically anisotropic layer side, an angle formed by the optic axis and a transmission axis of the polarizer is +50° to +70° or −50° to −70°, an average tilt angle of the optic axis with respect to a main surface of the optically anisotropic layer is 20° to 45°, and the in-plane phase difference Re (550) of an optically anisotropic layer at a wavelength of 550 nm is 70 nm to 240 nm.

The 2B-th aspect of the optical film according to the embodiment of the invention is an optical film including at least an optically anisotropic layer and a polarizer, wherein the optically anisotropic layer is an optically anisotropic body in which optically anisotropic bodies having negative optical birefringence are hybrid-aligned, while in a case where a slow axis of the optically anisotropic layer is projected onto the polarizer as viewed from an optically anisotropic layer side, an angle formed by the slow axis and a transmission axis of the polarizer is +50° to +70° or −50° to −70°, the average tilt angle of the slow axis with respect to the main surface of the optically anisotropic layer is 20° to 45°, and the in-plane phase difference Re (550) of an optically anisotropic layer at a wavelength of 550 nm is 70 nm to 240 nm.

The 2C-th aspect of the optical film according to the embodiment of the invention is an optical film including at least an optically anisotropic layer and a polarizer, wherein the optically anisotropic layer is an optically anisotropic body in which optically anisotropic bodies having negative optical birefringence are hybrid-aligned, while in a case where a fast axis of the optically anisotropic layer is projected onto the polarizer as viewed from an optically anisotropic layer side, an angle formed by the fast axis and a transmission axis of the polarizer is +50° to +70° or −50° to −70°, an average tilt angle of the fast axis with respect to a main surface of the optically anisotropic layer is 20° to 45°, and the in-plane phase difference Re (550) of an optically anisotropic layer at a wavelength of 550 nm is 70 nm to 240 nm.

The optical films of the 1A-th aspect to the 2C-th aspect of the invention are all used by being disposed between a backlight-side polarizing plate and a backlight in an image display apparatus (liquid crystal display device). At that time, each of the optical films is disposed such that the absorption axis of the backlight-side polarizing plate and the absorption axis of the polarizer are parallel or orthogonal to each other. As a result, the configuration of the image display apparatus according to the embodiment of the invention is obtained.

In the following description, the optical films of the 1A-th aspect to the 1C-th aspect will be collectively referred to as the optical film of the first aspect. Furthermore, the optical films of the 2A-th aspect to the 2C-th aspect will be collectively referred to as the optical film of the second aspect. In the optical film of the first aspect, the angle formed by the optic axis of the optically anisotropic layer and the absorption axis of the polarizer is +50° to +70° or −50° to −70°, whereas in the optical film of the second aspect, the angle formed by the optic axis of the optically anisotropic layer and the transmission axis of the polarizer is +50° to +70° or −50° to −70°.

For example, in a case where the image display apparatus is disposed such that the absorption axis of the backlight-side polarizing plate is horizontal, an image display apparatus having the following configuration is obtained by subjecting the optical film of the first aspect to a disposition in which the absorption axis of the polarizer is parallel to the absorption axis of the backlight-side polarizing plate. In a case where the image display apparatus is disposed such that the absorption axis of the backlight-side polarizing plate is horizontal an image display apparatus having the following configuration is obtained by subjecting the optical film of the second aspect to a disposition in which the transmission axis of the polarizer is parallel to the absorption axis of the backlight-side polarizing plate, that is, a disposition in which the absorption axis of the polarizer is orthogonal to the absorption axis of the backlight-side polarizing plate.

Furthermore, for example, in a case where the image display apparatus is disposed such that the absorption axis of the backlight-side polarizing plate is vertical, an image display apparatus having the following configuration is obtained by subjecting the optical film of the first aspect to a disposition in which the absorption axis of the polarizer is orthogonal to the absorption axis of the backlight-side polarizing plate. In a case where the image display apparatus is disposed such that the absorption axis of the backlight-side polarizing plate is vertical, an image display apparatus having the following configuration is obtained by subjecting the optical film of the second aspect to a disposition in which the transmission axis of the polarizer is orthogonal to the absorption axis of the backlight-side polarizing plate, that is, a disposition in which the absorption axis of the polarizer is parallel to the absorption axis of the backlight-side polarizing plate.

The main surface is the largest surface of a sheet-like object (a plate-like object, film, or the like).

Hereinafter, the optical film will also be described by describing the image display apparatus having the optical film.

<Image Display Apparatus (First Aspect)>

The 1A-th aspect of the image display apparatus according to the embodiment of the invention is an image display apparatus including a viewing-side polarizing plate, a liquid crystal cell, a backlight-side polarizing plate, an optical film, and a backlight in this order, wherein the optical film includes an optically anisotropic layer and a polarizer in this order from a liquid crystal cell side, an absorption axis of the backlight-side polarizing plate and an absorption axis of the polarizer are parallel or orthogonal to each other, the optically anisotropic layer is optically uniaxially anisotropic, while in a case where the optic axis of the optically anisotropic layer is projected onto a first polarizer as viewed from the viewing-side of the image display apparatus, the azimuthal angle of the optic axis is +50° to +70° or −50° to −70° with respect to the horizontal direction, an average tilt angle of the optic axis with respect to a main surface of the optically anisotropic layer is 20° to 45°, and the in-plane phase difference Re (550) of the optically anisotropic layer at a wavelength of 550 nm is 70 nm to 240 nm.

The 1B-th aspect of the image display apparatus according to the embodiment of the invention is an image display apparatus including a viewing-side polarizing plate, a liquid crystal cell, a backlight-side polarizing plate, an optical film, and a backlight in this order, wherein the optical film includes an optically anisotropic layer and a polarizer in this order from a liquid crystal cell side, an absorption axis of the backlight-side polarizing plate and an absorption axis of the polarizer are parallel or orthogonal to each other, the optically anisotropic layer is an optically anisotropic layer in which optically anisotropic bodies having positive birefringence are hybrid-aligned, while in a case where a slow axis of the optically anisotropic layer is projected onto the polarizer as viewed from a viewing-side of the image display apparatus, an azimuthal angle of the slow axis is +50° to +70° or −50° to −70° with respect to a horizontal direction, the average tilt angle of the slow axis with respect to the main surface of the optically anisotropic layer is 20° to 45°, and the in-plane phase difference Re (550) of the optically anisotropic layer at a wavelength of 550 nm is 70 nm to 240 nm.

The 1C-th aspect of the image display apparatus according to the embodiment of the invention is an image display apparatus including a viewing-side polarizing plate, a liquid crystal cell, a backlight-side polarizing plate, an optical film, and a backlight in this order, wherein the optical film includes an optically anisotropic layer and a polarizer in this order from a liquid crystal cell side, an absorption axis of the backlight-side polarizing plate and an absorption axis of the polarizer are parallel or orthogonal to each other, the optically anisotropic layer is an optically anisotropic layer in which optically anisotropic bodies having negative birefringence are hybrid-aligned, while in a case where a fast axis of the optically anisotropic layer is projected onto the polarizer as viewed from a viewing-side of the image display apparatus, an azimuthal angle of the fast axis is +50° to +70° or −50° to −70° with respect to a horizontal direction, an average tilt angle of the fast axis with respect to a main surface of the optically anisotropic layer is 20° to 45°, and the in-plane phase difference Re (550) of the optically anisotropic layer at a wavelength of 550 nm is 70 nm to 240 nm.

In the following description, the image display apparatuses of the 1A-th aspect to the 1C-th aspect are collectively referred to as the image display apparatus of the first aspect.

A liquid crystal display device can be used as a preferred aspect of the image display apparatus according to the first aspect of the invention.

A more specific embodiment of the image display apparatus of the first aspect of the invention is shown in FIG. 1. The image display apparatus 1 shown in FIG. 1 includes a viewing-side polarizing plate 2, a liquid crystal cell 3, a backlight-side polarizing plate 5, an optical film 4, and a backlight 8 in this order. As shown in FIG. 1, the optical film 4 includes an optically anisotropic layer 6 and a polarizer 7 in this order from the liquid crystal cell 3 side. In the image display apparatus 1, basically, each member is disposed such that the main surfaces of the members are parallel to each other.

Each polarizing plate(polarizer) may include a polarizing plate protective film that is not shown in the drawing.

In FIG. 1, the arrow of the viewing-side polarizing plate 2 indicates that the absorption axis of the viewing-side polarizing plate 2 is parallel to the paper surface, the mark of the backlight-side polarizing plate 5 indicates that the absorption axis of the backlight-side polarizing plate 5 is perpendicular to the paper surface, and the mark of the polarizer 7 indicates that the absorption axis of the polarizer is perpendicular to the paper surface.

That is, in the example shown in FIG. 1, the absorption axis of the backlight-side polarizing plate 5 and the absorption axis of the polarizer 7 of the optical film 4 are parallel to each other.

Here, according to the present invention, in the case of the image display apparatus of the 1A-th aspect, the optically anisotropic layer 6 is optically uniaxially anisotropic, the azimuthal angle of the optic axis in a case where the optic axis of the optically anisotropic layer 6 is projected onto the polarizer 7 as viewed from the viewing-side of the image display apparatus 1 is +50° to +70° or −50° to −70° with respect to the horizontal direction, the average tilt angle of the optic axis with respect to the main surface of the optically anisotropic layer 6 is 20° to 45°, and the in-plane phase difference Re (550) of the optically anisotropic layer 6 at a wavelength of 550 nm is 70 nm to 240 nm.

Furthermore, in the case of the image display apparatus of the 1B-th aspect, the optically anisotropic layer 6 is an optically anisotropic layer in which optically anisotropic bodies having positive birefringence are hybrid-aligned, the azimuthal angle of the slow axis in a case where the slow axis of the optically anisotropic layer 6 is projected onto the polarizer 7 as viewed from viewing-side of the image display apparatus 1 is +50° to +70° or −50° to −70° with respect to the horizontal direction, the average tilt angle of the slow axis with respect to the main surface of the optically anisotropic layer 6 is 20° to 45°, and the in-plane phase difference Re (550) of the optically anisotropic layer 6 at a wavelength of 550 nm is 70 nm to 240 nm.

Furthermore, in the case of the image display apparatus of the 1C-th aspect, the optically anisotropic layer 6 is an optically anisotropic layer in which optically anisotropic bodies having negative birefringence are hybrid-aligned, the azimuthal angle of the fast axis in a case where the fast axis of the optically anisotropic layer 6 is projected onto the polarizer 7 as viewed from viewing-side of the image display apparatus 1 is +50° to +70° or −50° to −70° with respect to the horizontal direction, the average tilt angle of the fast axis with respect to the main surface of the optically anisotropic layer 6 is 20° to 45°, and the in-plane phase difference Re (550) of the optically anisotropic layer 6 at a wavelength of 550 nm is 70 nm to 240 nm.

The following description will be given mainly in connection with the image display apparatus of the 1A-th aspect; however, for the image display apparatus of the 1B-th aspect, the optic axis of the optically anisotropic layer 6 that is uniaxially anisotropic in the image display apparatus of the 1A-th aspect can be replaced and read as the slow axis of the optically anisotropic layer 6 that is hybrid-aligned. With regard to the image display apparatus of the 1C-th aspect, the optic axis of the optically anisotropic layer 6 that is uniaxially anisotropic in the image display apparatus of the 1A-th aspect can be replaced and read as the fast axis of the optically anisotropic layer 6 that is hybrid-aligned.

In the image display apparatus of the first aspect of the invention, since the optically anisotropic layer 6 has such a configuration, the image (video) displayed by the image display apparatus can be imparted with asymmetry in the right-to-left direction. As a result, a clear image can be displayed to the driver, and an appropriate viewing angle control function that reduces reflected glare on the window glass can be exhibited. Furthermore, the occurrence of moire in the displayed image can be suppressed. Therefore, the optical film 4 can be said to be a viewing angle control film. Furthermore, since the optical film 4 having the optically anisotropic layer 6 and the polarizer 7 is only added to an image display apparatus (liquid crystal display device) having a general configuration, the thickness can be reduced, and the cost can be suppressed.

The configuration of such an optically anisotropic layer and the operation of the image display apparatus will be described in detail later.

The image display apparatus may have other members as necessary. For example, the image display apparatus may have a configuration in which an optical compensation film is disposed between a liquid crystal cell and a polarizing plate. Alternatively, the image display apparatus may have a pressure-sensitive adhesive layer for sticking each of the members to each other.

[Liquid Crystal Cell]

According to the invention, liquid crystal cells having various conventionally known display modes can be used as the liquid crystal cell. Regarding the display mode of the liquid crystal cell, various display modes such as Twisted Nematic (TN), In-Plane Switching (IPS), Ferroelectric Liquid Crystal (FLC), Anti-ferroelectric Liquid Crystal (AFLC), Optically Compensatory Bend (OCB), Super Twisted Nematic (STN), Vertically Aligned (VA), Electrically Controlled Birefringence (ECB), and Hybrid Aligned Nematic (HAN) can be utilized. Furthermore, display modes obtained by subjecting the above-described display modes to alignment division can also be utilized. The optical film according to the embodiment of the invention is effective for an image display apparatus that uses a liquid crystal cell in any display mode. The image display apparatus according to the embodiment of the invention may be any of a transmissive type, a reflection type, or a semi-transmissive type; however, from the viewpoint that stabilization of the display contrast is easy, the transmissive type is preferred.

The liquid crystal cell is formed by supporting liquid crystals between two sheets of substrates having an electrode layer. In a transmissive type image display apparatus, the electrode layer is a transparent electrode layer.

The liquid crystal layer of the liquid crystal cell is usually formed by enclosing liquid crystals in the space formed by interposing a spacer between two sheets of substrates. The transparent electrode layer is formed as a transparent film including a conductive substance, on at least one or both of the two sheets of substrates. The liquid crystal cell may also be further provided with a gas barrier layer, a hard coat layer, or an undercoat layer (undercoat layer) (used for adhering the transparent electrode layer). These layers are usually provided on a substrate. The substrate of the liquid crystal cell generally has a thickness of 50 μm to 2 mm.

Regarding the display mode of the liquid crystal cell, a transmissive type TN mode, an IPS or FFS mode, and a VA mode are preferred from the viewpoint of display responsiveness, and from the viewpoint that the viewing angle design is easier, an IPS or FTS mode is particularly preferred.

[Polarizing Plate]

Since the viewing-side polarizing plate and the backlight-side polarizing plate have basically similar configurations except that the disposition is different, they will be collectively described as a polarizing plate in the following description.

Regarding the polarizing plate, a conventionally known linearly polarizing plate that is used in a liquid crystal display device or the like can be appropriately utilized.

As an example, as the polarizing plate, a polarizing plate in which a (linear) polarizer that will be described below is laminated with a polarizing plate protective film as necessary, is used. The same also applies to the viewing-side polarizing plate 2 and the backlight-side polarizing plate 5. The relative disposition of the transmission axes of the viewing-side polarizing plate 2 and the backlight-side polarizing plate 5 can be disposed according to the display mode of the liquid crystal display device used and the normally black mode or the normally white mode, and the relative disposition may be a so-called crossed nicols disposition in which the transmission axes are orthogonal to each other (for example, FIG. 1), or a so-called para-nicols disposition in which the transmission axes are parallel to each other.

(Polarizer)

Regarding the above-mentioned polarizer, known ones can be utilized without limitation, and examples include an iodine-based polarizer that utilizes iodine as a dichroic coloring agent in a polymer, a dye-based polarizer that utilizes a dichroic dye instead of iodine, a polyene-based polarizer, a polarizer formed of a lyotropic liquid crystal compound having light absorption anisotropy, and a polarizer in which host liquid crystals are aligned by using a dichroic coloring agent as a guest. Furthermore, a wire grid polarizer, and a reflective polarizer based on a stretched multilayer film of a polymer or a reflective type polarizer in which a cholesteric liquid crystal film and $\lambda/4$ plate are combined, may be used.

(Polarizing Plate Protective Film)

As described above, the polarizing plate can include a polarizing plate protective film, and impartment of strength and independence of the polarizing plate; suppression of deterioration caused by moisture, heat, and the like; enhancement of adhesion to other members; and the like can be promoted (not shown in FIG. 1). Regarding the polarizing plate protective film, known ones can be utilized without limitation, and examples include plastic films of a polyester such as polyethylene terephthalate (PET), a polycarbonate, an acrylic resin, an epoxy resin, a polyurethane, a polyimide, a polyolefin, a cycloolefin resin, a cellulose derivative, and a silicone. From the viewpoint of transparency, an acrylic resin, a polycarbonate resin, a cellulose derivative (particularly triacetyl cellulose), and a cycloolefin resin are preferred, and in a case where isotropy is required, an acrylic resin, a cellulose derivative (particularly triacetyl cellulose), and a cycloolefin resin are preferred. Furthermore, in a case where strength is required for use on the viewing-side surface of the viewing-side polarizing plate or the backlight-side surface of the backlight-side polarizing plate, polyethylene terephthalate, an acrylic resin, and a cellulose derivative (particularly triacetyl cellulose) are preferred. In a case where the base material used for the optically anisotropic layer that will be described later is incorporated into the polarizing plate, the base material may also function as the polarizing plate protective film.

The image display apparatus may have a pressure-sensitive adhesive layer and an adhesive layer, a cushion layer, a barrier layer, a hard coat layer, an easy adhesion layer, and the like as other layers. Furthermore, the image display apparatus may have an optical compensation film between the liquid crystal cell and the viewing-side polarizing plate and/or the backlight-side polarizing plate. The optical compensation film is provided so as to improve the viewing angle characteristics intrinsic to the liquid crystal cell, and regarding a material that can be used, various polymer films and liquid crystal materials described in connection with the optically anisotropic layer that will be described later can be used. Furthermore, the optical design can be appropriately designed with reference to known technologies.

[Backlight]

A backlight is a lighting device that irradiates light toward a liquid crystal cell. As the backlight, a conventionally known backlight that is used in a liquid crystal display device can be appropriately utilized. Examples of the backlight include a direct type backlight in which a plurality of light sources are disposed on the back surface side (opposite side of the liquid crystal cell) of the backlight-side polarizing plate, and a side light type backlight in which a light source is disposed to face a side surface of a plate-shaped light guide plate, and the light emitted by the light source is guided within the light guide plate to emit planar light through the main surface of the light guide plate. The backlight may have optical films such as a diffusion sheet and a light condensing sheet, in order to adjust the luminance distribution of the irradiated light. The light source is not particularly limited, and various light sources used in liquid crystal display devices such as an LED (light emitting diode) and a cold cathode fluorescent lamp can be appropriately utilized.

[Optical Film]

The optical film 4 has an optically anisotropic layer 6 and a polarizer 7. In the image display apparatus of the first aspect, the optical film 4 is disposed between the backlight-side polarizing plate 5 and the backlight 8. Furthermore, the optical film 4 is disposed in the order of the optically anisotropic layer 6 and the polarizer 7 from the liquid crystal cell 3 side. Therefore, the image display apparatus 1 is disposed in the order of the viewing-side polarizing plate 2, the liquid crystal cell 3, the backlight-side polarizing plate 5, the optically anisotropic layer 6, the polarizer 7, and the backlight 8 from the viewing-side.

As described above, in the image display apparatus of the 1A-th aspect, the optically anisotropic layer 6 is optically uniaxially anisotropic, the azimuthal angle of the optic axis in a case where the optic axis of the optically anisotropic layer 6 is projected onto the polarizer 7 as viewed from the viewing-side of the image display apparatus 1 is +50° to +70° or −50° to −70° with respect to the horizontal direction, the average tilt angle of the optic axis with respect to the main surface of the optically anisotropic layer 6 is 20° to 45°, and the in-plane phase difference Re (550) of the optically anisotropic layer 6 at a wavelength of 550 nm is 70 nm to 240 nm.

Furthermore, as described above, the absorption axis of the polarizer 7 is parallel the absorption axis of the backlight-side polarizing plate 5.

Here, according to the present invention, optically uniaxial anisotropy means that the refractive index ellipsoid is a spheroid. The spheroid refers to a spheroid obtainable by rotating an ellipse by taking its major axis or minor axis as the rotation axis. A spheroid obtained by rotating around the minor axis is also called an oblate spheroid, and this corresponds to a refractive index ellipsoid of a material having negative birefringence. A spheroid obtained by rotating around the major axis is also called a prolate spheroid, and this corresponds to a refractive index ellipsoid of a material having positive birefringence.

Furthermore, in the optically uniaxially anisotropic refractive index ellipsoid of the optically anisotropic layer, the refractive index in the rotation axis direction is referred to as extraordinary light refractive index (ne), and the refractive index in a direction perpendicular to the rotation axis is referred to as ordinary light refractive index (no). Furthermore, according to the present invention, the direction of the optic axis of the optically anisotropic layer is defined as the direction of extraordinary light refractive index (ne).

Figure 2:
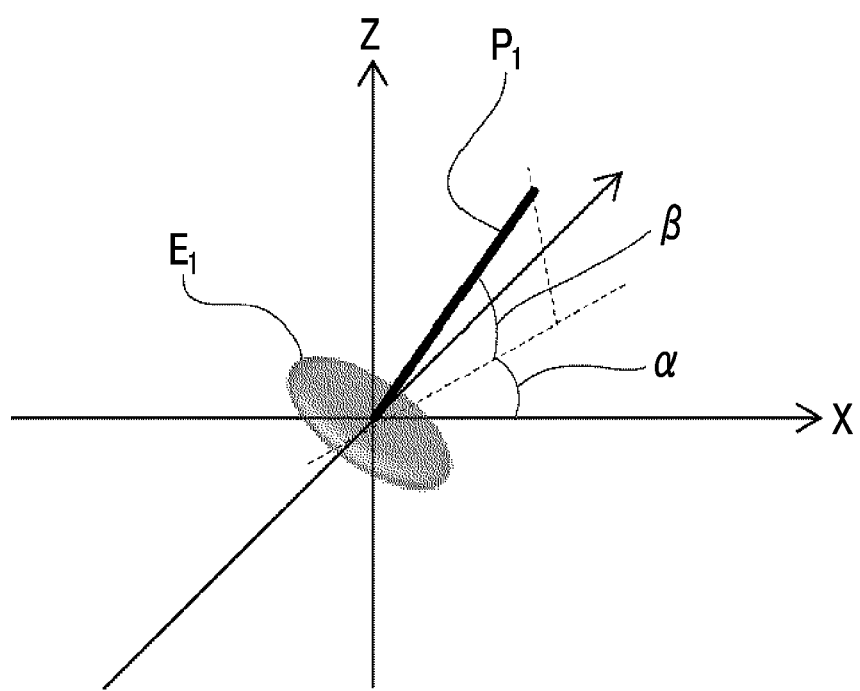
FIG. 2 is a conceptual diagram for explaining a tilt angle and an azimuthal angle of an optic axis of a disk-like liquid crystal compound.

For example, in a case where the optically anisotropic layer has a liquid crystal cured layer using a disk-like liquid crystal compound, as shown in FIG. 2, the refractive index ellipse $E_1$ of the disk-like liquid crystal compound is an oblate spheroid, and the optic axis $P_1$ is defined in the direction parallel to the minor axis of the refractive index ellipsoid $E_1$. The direction of the optic axis of the disk-like liquid crystal compound is the normal direction with respect to the disc plane of the molecule.

Figure 3:
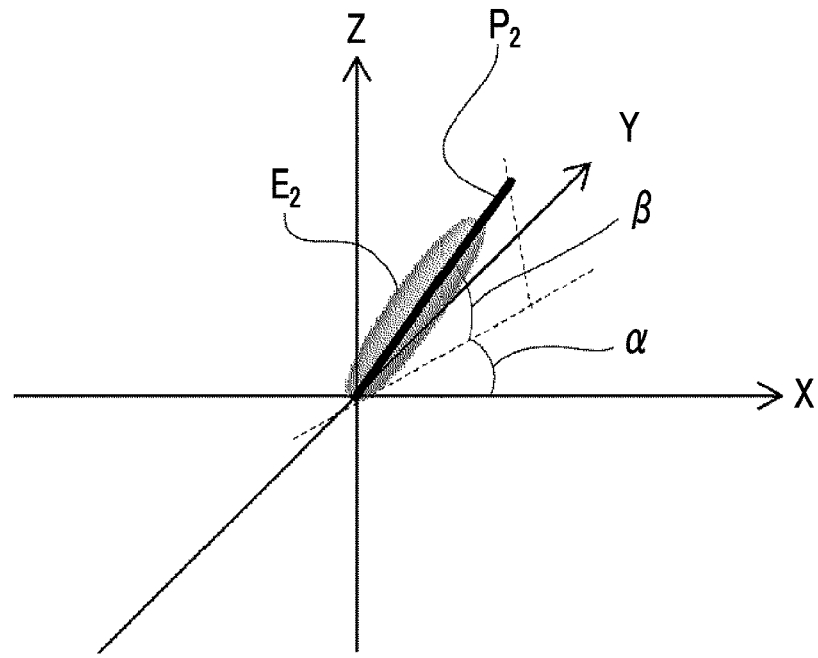
FIG. 3 is a conceptual diagram for explaining a tilt angle and an azimuthal angle of an optic axis of a rod-like liquid crystal compound.

Furthermore, in a case where the optically anisotropic layer has a liquid crystal cured layer using a rod-like liquid crystal compound, as shown in FIG. 3, the refractive index ellipsoid $E_2$ of the disk-like liquid crystal compound is a prolate spheroid, and the optic axis $P_2$ is defined in the direction parallel to the major axis of the refractive index ellipsoid $E_2$. The direction of the optic axis of the rod-like liquid crystal compound is the major axis direction of the molecule.

Hybrid alignment is an alignment in which the tilt angle of the optic axis in an optically anisotropic layer that is uniaxially anisotropic, the tilt angle of the slow axis in an optically anisotropic layer having positive birefringence, and the tilt angle of the fast axis in an optically anisotropic layer having negative birefringence continuously change along the thickness direction of the optically anisotropic layer.

The azimuthal angle and the tilt angle of the optic axis are defined as follows.

First, the image display apparatus is installed in the direction in which the image display apparatus is normally used, and a coordinate system is defined, in which while the lamination direction of each member in the linage display apparatus is taken as the Z axis, the sign of the viewing-side is defined as plus, the sign of the backlight side is defined as minus; while the horizontal direction as viewed from the viewing-side is taken as the X axis, the sign of the right-hand side direction is defined as plus, the sign of the left-hand side direction is defined as negative; and while the vertical direction as viewed from the viewing-side is taken as the Y axis, the sign of the upward direction is defined as plus, and the sign of the downward direction is defined as minus.

The azimuthal angle is an angle formed with respect to the horizontal direction in a case where the optic axis of the uniaxially anisotropic body in the optically anisotropic layer as viewed from the viewing-side, the slow axis of the optically anisotropic body having positive birefringence, or the fast axis of the optically anisotropic body having negative birefringence is projected onto the polarizer. That is, in FIG. 2, the optic axis $P_1$ is projected onto the X-Y plane, and the angle α formed by the projection line of the optic axis $P_1$ and the X axis is the azimuthal angle. Furthermore, in FIG. 3, the optic axis $P_2$ is projected onto the X-Y plane, and the angle α formed by the projection line of the optic axis $P_2$ and the X axis is the azimuthal angle. The azimuthal angle of the optic axis is represented in the range of +90° to −90°, the sign of the angle rotated counterclockwise from the X axis is defined as plus, and the sign of the angle rotated clockwise is defined as minus.

Regarding the form of the optic axis whose azimuthal angle is a certain angle, there are two forms in which the inclination directions of the optic axis are opposite directions. For example, in a case where the azimuthal angle is a plus angle, a form in which the optic axis rises to the plus side in the X direction and the Y direction, and a form in which the optic axis rises to the minus side in the X direction and the Y direction are present. Similarly, in a case where the azimuthal angle has a minus angle, a form in which the optic axis rises from the plus side in the X direction to the minus side in the Y direction, and a form in which the optic axis rises from the minus side in the X direction to the plus side in the Y direction are present.

The tilt angle is an optic axis angle of the optic axis of the uniaxially anisotropic body, the slow axis of the optically anisotropic body having positive birefringence, or the fast axis of the optically anisotropic body having negative birefringence, with respect to the main surface, in the optically anisotropic layer. That is, in FIG. 2, the angle β formed by the X-Y plane and the optic axis is the tilt angle. Similarly, in FIG. 3, the amide β formed by the X-Y plane and the optic axis is the tilt angle.

In the case of uniaxial anisotropy, the tilt angle has one certain value across the thickness direction of the layer; however, in the case of hybrid alignment, the tilt angle of the optic axis in the optically anisotropic layer of uniaxial anisotropy, the tilt angle of the slow axis in the optically anisotropic layer having positive birefringence, and the tilt angle of the fast axis in the optically anisotropic layer having negative birefringence continuously keep changing along the thickness direction of the support. Regarding the tilt angle in that case, an average value of the tilt angles on the surface on the viewing-side and the surface on the backlight side of the optically anisotropic layer, and this is taken as the average tilt angle.

Next, a mechanism by which the image display apparatus of the first aspect of the present invention having such an optical film exhibits a viewing angle control function with asymmetry in the display characteristics in the right-to-left direction will be described by using FIG. 4. The image display apparatus 1 shown in FIG. 4 has a configuration similar to that of the image display apparatus 1 shown in FIG. 1.

Figure 4:
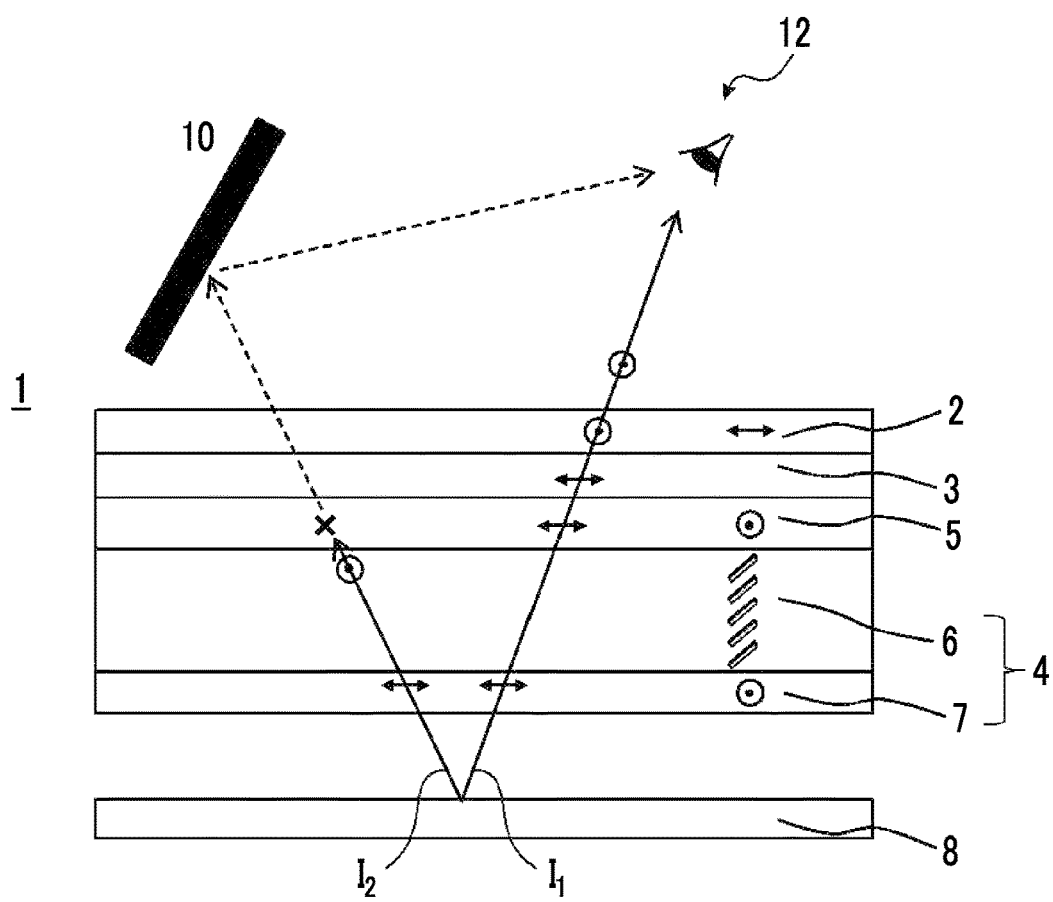
FIG. 4 is a conceptual diagram for explaining the operation of the image display apparatus shown in FIG. 1.

In the image display apparatus 1 shown in FIG. 4, in a case where light is emitted from the backlight 8, the light becomes linearly polarized light that oscillates in a direction parallel to the paper surface, at the time of being transmitted through the polarizer 7. The linearly polarized light that has been transmitted through the polarizer 7 is incident on the optically anisotropic layer 6. At that time, since the optically anisotropic layer 6 has an optic axis as described above, the phase difference given to the light differs depending on the angle of incidence (polar angle, azimuthal angle) on the optically anisotropic layer 6.

For example, in a case where the traveling direction of the light $I_1$ (see FIG. 4) emitted from the backlight 8 in an oblique direction is close to parallel to the optic axis of the optically anisotropic layer 6, which is a uniaxially anisotropic body, almost no phase difference is given to the light $I_1$ from the optically anisotropic layer 6, and the light $I_1$ is transmitted through the optically anisotropic layer 6 as linearly polarized light oscillating in a direction parallel to the paper surface. The light $I_1$ transmitted through the optically anisotropic layer 6 enters the backlight-side polarizing plate 5. Since the absorption axis of the backlight-side polarizing plate 5 is perpendicular to the paper surface, most of the light $I_1$, which is linearly polarized light in the direction parallel to the paper surface, is transmitted through the backlight-side polarizing plate 5 without being absorbed by the backlight-side polarizing plate 5. The light $I_1$ that has been transmitted through the backlight-side polarizing plate 5 enters the liquid crystal cell 3 and the viewing-side polarizing plate 2 and is transmitted or blocked off, depending on the on/off state of the liquid crystal cell 3. As a result, an image is displayed. Therefore, an image can be displayed to an observer 12 who sees the image display apparatus 1 from this direction.

On the other hand, light $I_2$ emitted in a direction different from the light $I_1$, that is, in a direction not parallel to the optic axis of the optically anisotropic layer 6, is given a phase difference by the optically anisotropic layer 6. At that time, a phase difference of $\lambda/2$ is given to the obliquely incident light $I_2$ by setting the in-plane phase difference Re (550) of the optically anisotropic layer 6 to be in the above-described range, and also, by setting the azimuthal angle of the optic axis to be in the above-described range, the angle formed by the oscillation direction of the light $I_2$ and the optic axis of the optically anisotropic layer 6 becomes close to 45°. As a result, the light $I_2$ is converted by the optically anisotropic layer 6 from linearly polarized light oscillating in a direction parallel to the paper surface to linearly polarized light oscillating in a direction perpendicular to the paper surface. Since the absorption axis of the backlight-side polarizing plate 5 is perpendicular to the paper surface, the light $I_2$ that has passed through the optically anisotropic layer 6 is absorbed by the backlight-side polarizing plate 5. Therefore, the light $I_2$ is not transmitted through the backlight-side polarizing plate 5, and the amount of light incident on the liquid crystal cell 3 and the viewing-side polarizing plate 2 is reduced. That is, the amount of light in the displayed image is reduced. For that reason, even in a case where a reflector 10 such as a windshield is present in the direction in which the light $I_2$ is emitted, the image formed by the light $I_2$ can be suppressed from being reflected on the reflector 10 and observed by the observer $I_2$ (See the broken line arrow in FIG. 4). Here, the description has been made on the premise that the optically anisotropic body is a uniaxial body; however, it may be considered that a similar phenomenon occurs even in a case where the optically anisotropic body is a hybrid-aligned optically anisotropic body.

As described above, it has been suggested to replace the side mirrors and rear-view mirrors of an automobile with image display apparatuses, or to cover a vehicle body structure that obstructs the driver's visual field, such as a side pillar, with an image display apparatus and display a video that complements the obstructed visual field. In a case where the image display apparatus is incorporated in a vehicle in this way, it is not always possible to dispose the image display apparatus such that the driver and the image display apparatus face each other, due to the structural design of the vehicle. Therefore, it is necessary to widen the viewing angle of the image display apparatus so that the image display apparatus can correctly display both color and brightness even from various angles (polar angles, azimuthal angles). Conventional image display apparatuses are designed so as not to depend on the polar angle or the azimuthal angle in a case where the viewing angle is widened. However, in an image display apparatus having a wide viewing angle, since the image display apparatus is designed to emit image light even in directions other than the observer (driver), a displayed image is reflected as glare on reflectors such as the windshield and window glasses, and there has been a problem that the glare disturbs the driver.

In order to prevent such reflected glare of a displayed image, it is conceivable to apply a louver film or an electro-optical element. However, since conventional louver films have symmetry horizontally or vertically, there is a problem that it is difficult to achieve both the display of a clear image to the driver and the reduction of reflected glare on the window glass. Furthermore, the electro-optical element has a problem that the thickness of the device increases so that it is difficult to mount the device in a limited space in a vehicle, and the manufacturing cost also increases high.

In contrast, in the image display apparatus of the first aspect of the present invention, the polarization state of the light incident on the liquid crystal cell can be made dependent on the polar angle and the azimuthal angle by setting the azimuthal angle and the average tilt angle of the optic axis of the optically anisotropic layer and the in-plane phase difference Re (550) to be in the above-described ranges. As a result, a visual field region (visible range) in which the light that has passed through the optically anisotropic layer 6 and is incident on the backlight-side polarizing plate 5 is mostly transmitted without being absorbed in the backlight-side polarizing plate 5, and a visual field region in which that the light is absorbed by the backlight-side polarizing plate 5 and the amount of transmitted light is reduced, can be provided horizontally asymmetrically. Therefore, by disposing the image display apparatus according to the embodiment of the invention such that the visible range turns toward the direction of the observer and regions other than that turn toward the direction of a reflector 10 such as the windshield, the reflected glare on the reflector 10 can be suppressed, and a clear display can be made to the observer 12.

Furthermore, by disposing an optical film having an optically anisotropic layer and a polarizer between the backlight-side polarizing plate and the backlight, the light beam before entering the liquid crystal cell is provided with directivity, and the thickness of the apparatus can be reduced by integrating the function of the optical film with the backlight polarizing plate. As a result, it is possible to control the viewing angle asymmetrically in the right-to-left direction without affecting the design even in use applications for a vehicle.

Furthermore, in the louver film formed of a fine structure, moire may occur between the member constituting the backlight and the pixels and the like of the liquid crystal cell. In contrast, since the image display apparatus according to the embodiment of the invention does not essentially have such a fine structure, moire does not occur.

From the description given above, it can be seen that the visible range occurs in a direction parallel to the optic axis of the optically anisotropic layer. Therefore, the polar angle in the central direction of the visible range can be adjusted mainly by controlling the average tilt angle of the optic axis in the optically anisotropic layer.

The average tilt angle, azimuthal angle, and in-plane phase difference Re of the optic axis of the optically anisotropic layer may be appropriately set according to the direction to be defined as the visible range in the image display apparatus.

The viewing angle control function of the image display apparatus according to the embodiment of the invention will be described in more detail by using simulation.

Figure 5:
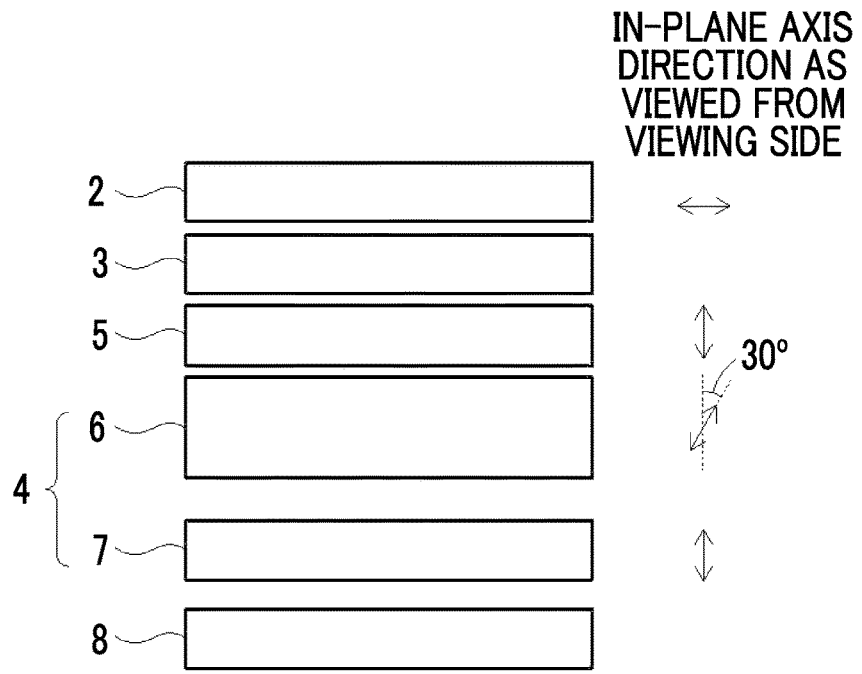
FIG. 5 is a conceptual diagram of a configuration for simulating the image display apparatus according to the embodiment of the invention.
Figure 7:
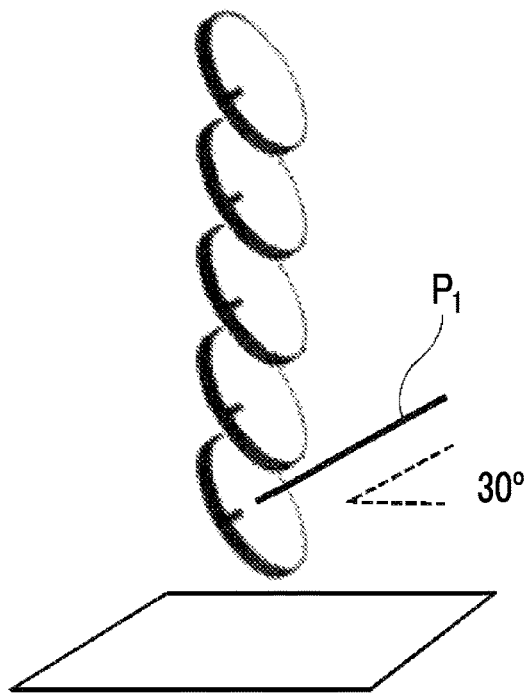
FIG. 7 is a diagram conceptually showing the alignment state of the disk-like liquid crystal compound in the optically anisotropic layer of the image display apparatus shown in FIG. 5.

The simulation conditions are as follows.
(1) Calculation software: LCD Master (SHINTECH, Inc.)
(2) Layer configuration: Shown in FIG. 5 and FIG. 6.
(3) Optically anisotropic layer:

In FIG. 5, the optically anisotropic layer is a liquid crystal cured layer formed by using a disk-like liquid crystal compound. As shown in FIG. 7, the disk-like liquid crystal compound is a uniaxially anisotropic body having a uniform tilt alignment (O plate) in which the disc plane of the disk-like liquid crystal compound has a tilt angle of 60° with respect to the main surface of the image display apparatus, that is, the optic axis of the disk-like liquid crystal compound is tilted at 30° with respect to the main surface of the optically anisotropic layer. Furthermore, in a case where the image display apparatus is disposed such that the absorption axis of the viewing-side polarizing plate 2 is in the right-to-left direction, the disc plane is tilted with the lower left side being upside with respect to the main surface of the image display apparatus. In addition, the optic axis of the optically anisotropic layer as viewed from the viewing-side polarizing plate 2 side is at 60° counterclockwise with respect to the horizontal direction and is at 30° clockwise with respect to the absorption axis of the backlight-side polarizing plate 5. The refractive index of the disk-like liquid crystal compound was set to ne=1.550 and no=1.650 at a wavelength of 550 nm.

Figure 6:
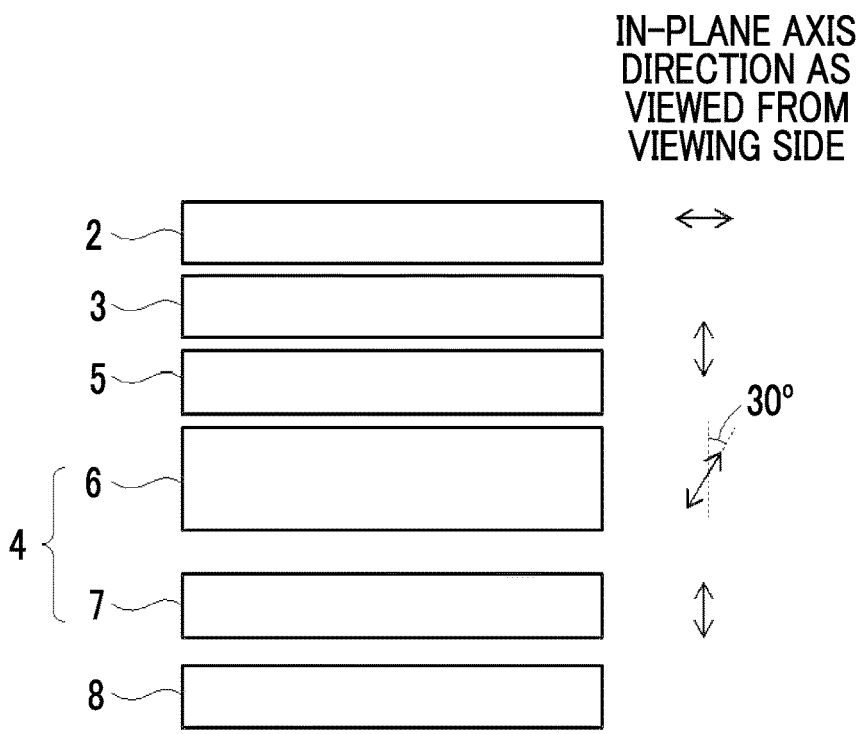
FIG. 6 is a conceptual diagram of a configuration for simulating the image display apparatus according to the embodiment of the invention.
Figure 8:
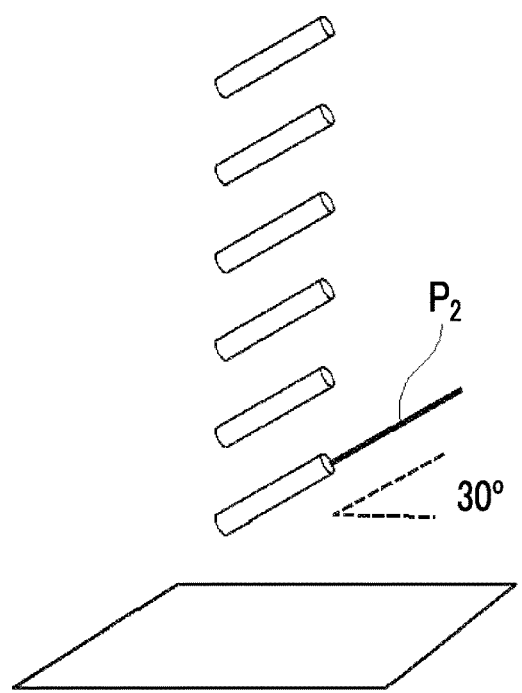
FIG. 8 is a diagram conceptually showing the alignment state of the rod-like liquid crystal compound in the optically anisotropic layer of the image display apparatus shown in FIG. 6.

In FIG. 6, the optically anisotropic layer is a liquid crystal cured layer formed by using a rod-like liquid crystal compound. As shown in FIG. 8, the rod-like liquid crystal compound is a uniaxially anisotropic body having a uniform tilt alignment (O plate) in which the major axis direction of the rod-like liquid crystal compound (liquid crystal molecules) has a tilt angle of 30° from the main surface of the image display apparatus, that is, the optic axis is tilted at 30° with respect to the main surface of the optically anisotropic layer. Furthermore, in a case where the image display apparatus is disposed such that the absorption axis of the viewing-side polarizing plate 2 is in the right-to-left direction, the major axis of the liquid crystal molecules is tilted at 30° with the upper right side being upside with respect to the main surface of the image display apparatus. In addition, the optic axis of the optically anisotropic layer as viewed from the viewing-side polarizing plate 2 side is at 60° counterclockwise with respect to the horizontal direction, and the optic axis is at 30° clockwise with respect to the absorption axis of the backlight-side polarizing plate 5. The refractive index of the rod-like liquid crystal compound was set to ne=1.623 and no=1.503 at a wavelength of 550 nm.

Figure 11:
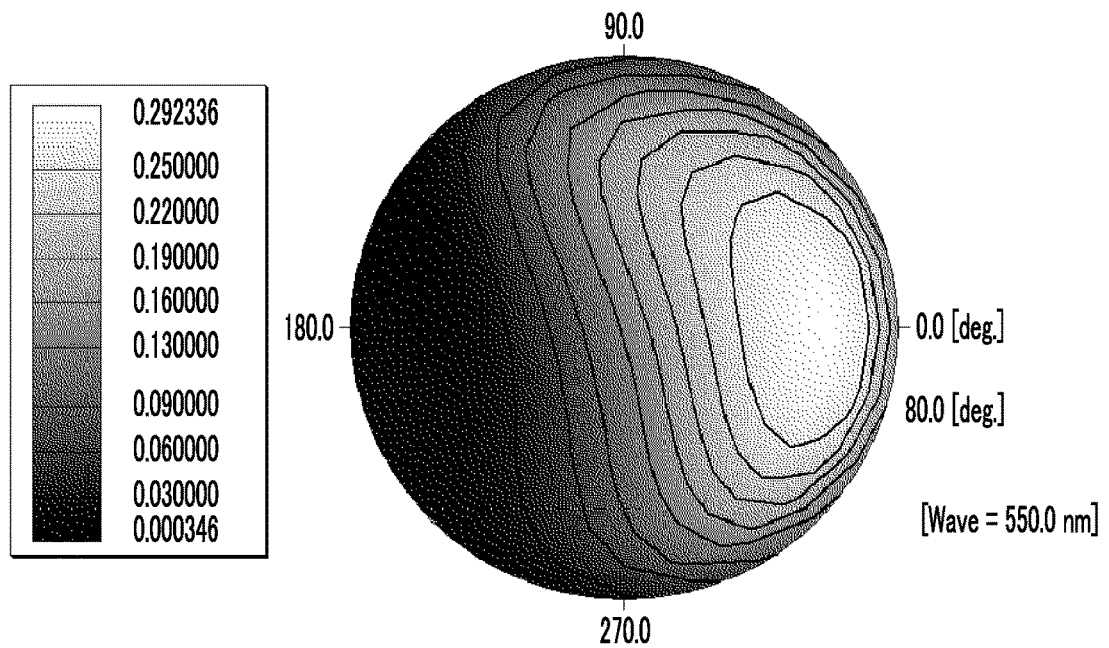
FIG. 11 is a contour diagram showing the simulation results for the configuration in FIG. 6 of the image display apparatus according to the embodiment of the invention.

Changes in the display luminance from an azimuthal angle of 0° to 180° and a polar angle of −80° to 80° in the configurations of FIG. 5 and FIG. 6 are shown in FIG. 9. Furthermore, contour diagrams of the luminance distribution in each of the configurations of FIG. 5 and FIG. 6 are shown in FIG. 10 and FIG. 11. From FIG. 9, FIG. 10, and FIG. 11, it can be seen that in both the configuration of FIG. 5 and the configuration of FIG. 6, the visible range has a center in the vicinity of an azimuthal angle of 0° and a polar angle of 60°, and the brightness is significantly reduced in regions other than the visible range.

Figure 12:
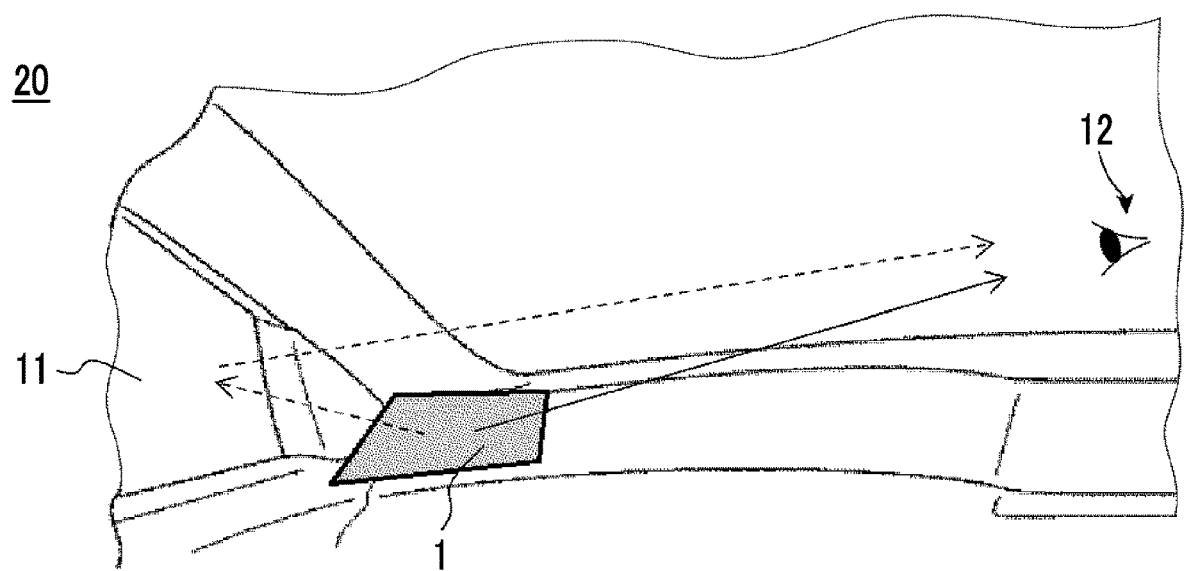
FIG. 12 is a conceptual diagram showing an information display device for a vehicle according to an embodiment of the invention.

An image display apparatus exhibiting such characteristics is disposed, for example, along the vehicle interior as shown in FIG. 12, and at the time of displaying information that complements the visual field obstructed by a pillar or the body, the amount of light in the image displayed on the side window 11 side can be reduced so that the image can be clearly displayed to the driver 12 while suppressing the reflected glare on the side window 11, by disposing the visible range toward the driver 12 side. In the above-mentioned simulation, the visible range is provided on the right-hand side of the image display apparatus; however, a person ordinarily skilled in the art can appropriately change the above-mentioned parameters and the disposition of each member in order to provide the visible range in a desired direction, without limiting the direction to the right-hand side.

For example, with regard to the configuration shown in FIG. 5, in the case of a configuration similar to the configuration shown in FIG. 5 except that the absorption axis of the polarizer 7 of the optical film 4 is disposed so as to be orthogonal to the absorption axis of the backlight-side polarizing plate 5, the visible range has the center in the vicinity of an azimuthal angle of 180° and a polar angle of 60°. That is, the azimuthal angle in the visible range changes by 180°, depending on whether the absorption axis of the polarizer 7 is parallel or orthogonal to the absorption axis of the backlight-side polarizing plate 5.

As described above, regarding the form in which the azimuthal angle of the optic axis of the optically anisotropic layer is a certain angle, there are two forms in which the inclination directions of the optic axis are opposite directions.

For example, in a case where a configuration is similar to the configuration shown in FIG. 5 except that the inclination direction of this optic axis is the opposite direction, that is, in a case where the disc plane of the disk-like liquid crystal compound is tilted with the upper right side being upside with respect to the main surface of the liquid crystal display device (in a case where the optic axis is tilted to the lower left side), the visible range has the center in the vicinity of an azimuthal angle of 180° and a polar angle of 60°. That is, even in a case where the azimuth direction of the optic axis of the optically anisotropic layer is the same, the azimuthal angle in the visible range changes by 180° depending on the inclination direction of the optic axis.

Here, the refractive index anisotropy in the optically anisotropic layer may be forward wavelength dispersion but is preferably reverse wavelength dispersion.

In a case where the refractive index anisotropy of the optically anisotropic layer is forward wavelength dispersion, depending on the display mode of the liquid crystal cell used and the design of the refractive index anisotropy, tinting of the display may be observed in a region where the display brightness gradually decreases. Regarding this tinting, a more neutral display can be achieved by adjusting the wavelength dispersibility of the optically anisotropic layer. That is, in a region where the display brightness changes dark, in a case where there is a difference in the phase difference change at each wavelength, the transmittance for each wavelength is different, and it is visually recognized as tinting. In contrast, by making the optically anisotropic layer reverse wavelength dispersible, the phase difference changes at each wavelength are even, brightness is decreased while maintaining neutral tint, and only the reflected glare in a specific angle direction can be suppressed.

More specifically, in the optically anisotropic layer, it is desirable that the refractive index anisotropy $\Delta n$, the film thickness d, and Re ($\lambda$) satisfy the relationships of the following Formulae (5), (6), and (7).

$$80 \text{ nm} < \Delta n \times d < 320 \text{ nm} \quad (5)$$

$$Re(450)/Re(550) < 1.0 \quad (6)$$

$$Re(650)/Re(550) > 1.0 \quad (7)$$

Hereinafter, the materials and configurations constituting the optically anisotropic layer will be described.

Regarding the materials constituting the optically anisotropic layer, known materials can be utilized without limitation, and examples include a polyester such as polyethylene terephthalate (PET), a polycarbonate, an acrylic resin, an epoxy resin, a polyurethane, a polyamide, a polyolefin, a cycloolefin resin, a cellulose derivative, and stretched films thereof, or a liquid crystal film having a liquid crystal cured film obtainable by fixing the alignment of a liquid crystal composition including a liquid crystal compound. From the viewpoint that the above-mentioned optic axis can be easily realized, a liquid crystal film having a liquid crystal cured film obtainable by fixing the alignment of a liquid crystal composition is particularly preferable.

It is preferable that the above-mentioned liquid crystal film having a liquid crystal cured film obtainable by fixing the alignment of a liquid crystal composition is formed from a polymerizable liquid crystal composition including a polytnerizable liquid crystal compound.

The liquid crystal compound may be a rod-like liquid crystal compound or a disk-like liquid crystal compound.

The above-mentioned liquid crystal cured film obtainable by fixing the alignment of a liquid crystal composition is formed by bringing a polymerizable liquid crystal composition into a desired alignment state and then curing the liquid crystal composition. For example, the liquid crystal cured film can be produced by applying the polymerizable liquid crystal composition directly on a substrate or on an alignment-treated surface of an alignment film formed on the substrate, aligning the liquid crystal composition along the direction of the alignment treatment, and fixing the liquid crystal composition in that alignment state. Known substrates can be used, and examples thereof include a polyester such as polyethylene terephthalate (PET), a polycarbonate, an acrylic resin, an epoxy resin, a polyurethane, a polyamide, a polyolefin, a cycloolefin resin, and a cellulose derivative. In a case where the polymerizable liquid crystal composition is applied directly on the substrate, alignment restriction force can be imparted to the surface of the substrate by rubbing the surface, irradiating the substrate with polarized light, or stretching the entire substrate.

Regarding the alignment film, a rubbing-treated film of a layer including an organic compound such as a polymer, an obliquely vapor-deposited film of an inorganic compound, a film having microgrooves, or a membrane obtained by accumulating a Langmuir-Blodgett (LB) membrane obtained by the Langmuir-Blodgett method of an organic compound such as ω-tricosanoic acid, dioctadecylmethylammonium chloride, or methyl stearate. In addition, there is also an alignment film in which an alignment function is generated by irradiation with light.

As the alignment film, a film formed by subjecting the surface of a layer (polymer layer) including an organic compound such as a polymer to a rubbing treatment, can be preferably used. The rubbing treatment is carried out by rubbing the surface of the polymer layer with paper or cloth several times in a certain direction (preferably in the longitudinal direction of the support). Regarding the polymer used for forming the alignment flint, it is preferable to use a polyimide, a polyvinyl alcohol, the modified polyvinyl alcohol described in paragraphs [0071] to [0095] of JP3907735B, the polymer having a polymerizable group as described in JP1997-152509A (JP-H09-152509A), or the like.

Furthermore, it is a preferred embodiment to use a so-called photo-alignment film (photo-alignment layer) in which a photo-alignment material is irradiated with polarized light or non-polarized light to firm an alignment layer.

According to the present invention, it is preferable to impart the alignment restriction force by a step of irradiating the photo-alignment film with polarized light from an oblique direction or a step of irradiating the photo-alignment film with non-polarized light from an oblique direction.

The thickness of the alignment film is not particularly limited as long as it can exhibit an alignment function; however, the thickness is preferably 0.01 to 5 μm, and more preferably 0.05 to 2 μm.

Examples of the photo-alignment material used for the photo-alignment film include the azo compounds described in JP2006-285197A, JP2007-076839A, JP2007-138138A, JP2007-094071A, and JP2007-121721A, JP2007-140465A, JP2007-156439A, JP2007-133184A, JP2009-109831A, JP3883848B, and JP4151746B; the aromatic ester compounds described in JP2002-229039A; the maleimide and/or alkenyl-substituted nadiimide compounds having a photo-alignable unit as described in JP2002-265541A and JP2002-317013A; the photo-crosslinkable silane derivatives described in JP4205195B and JP4205198B; the photo-crosslinkable polyimides, polyamides, or esters described in JP2003-520878A. JP2004-529220A, and JP4162850B; and the compounds capable of photodimerization, particularly cinnamate compounds, chalcone compounds, and coumarin compounds, described in JP1997-118717A (JP-H09-118717A), JP 1998-506420A (JP-H10-506420A), JP2003-505561A, WO2010/150748A, JP2013-177561A, and JP2014-12823A. Particularly preferred examples include azo compounds, photo-crosslinkable polyimides, polyamides, esters, cinnamate compounds, and chalcone compounds.

Adjustment of the average tilt angle in the thickness direction of the optic axis of the optically anisotropic layer to a desired angle can be realized by inclining the alignment of the liquid crystal compound. The liquid crystal compound may be configured to be uniformly inclined over the thickness direction or a configuration in which at least a portion of the liquid crystal compound is tilt-aligned may also be adopted.

As an example in which a portion of the liquid crystal compound is tilt-aligned, the liquid crystal compound may be fixed in a so-called hybrid alignment state. In the hybrid alignment, the angle between the optic axis of the liquid crystal compound and the layer surface increases or decreases as the distance from the alignment film surface increases in the depth direction of the layer. It is preferable that the angle decreases with an increase in the distance from the alignment film surface. In addition, the change in the angle can be a continuous increase, a continuous decrease, an intermittent increase, an intermittent decrease, a change including a continuous increase and a continuous decrease, or an intermittent change including an increase and a decrease. An intermittent change includes a region where the angle does not change in the middle of the thickness direction. According to the present specification, the term "hybrid alignment" is to include an alignment state in which the angle is increasing or decreasing on the whole even in a case where a region without any change in the angle is included.

The optically anisotropic layer may have one layer or two or more layers of the above-described liquid crystal cured layer. In a case where the optically anisotropic layer has two or more layers of the liquid crystal cured layer, for example, the optically anisotropic layer may be configured to have a uniformly aligned liquid crystal cured layer in which the liquid crystal compound is uniformly inclined in the film thickness direction, and a hybrid-aligned liquid crystal cured layer, or may be configured to have a plurality of layers of the hybrid-aligned liquid crystal cured layers.

Figure 13:
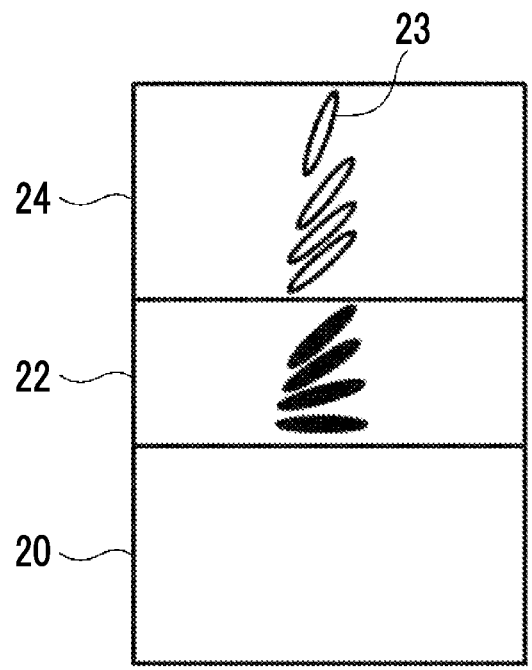
FIG. 13 is a conceptual diagram for explaining a method for controlling a tilt angle in a liquid crystal cured layer.

Here, in a case where an attempt is made to produce an optically anisotropic layer (O plate) in which the liquid crystal compound is uniformly inclined in the thickness direction within the layer, a means for independently controlling each of the tilt angle on the support side and the tilt angle on the air interface side is necessary. As a means for controlling the tilt angle on the support side, as shown in FIG. 13, a liquid crystal layer 22 that has been subjected to hybrid alignment is separately provided between the liquid crystal cured layer 24 (O plate), for which it is intended to perform uniform tilt alignment on the liquid crystal compound 23, and the support 20, and the tilt angle on the support 20 side of the liquid crystal cured layer 24 is controlled by utilizing the tilt angle at the air side interface of the liquid crystal layer 22. The idea of utilizing the liquid crystal layer 22 in which the hybrid alignment is fixed as such, as an alignment film and controlling the alignment direction of another liquid crystal layer applied thereon is described in JP3969637B and the like.

Figure 14:
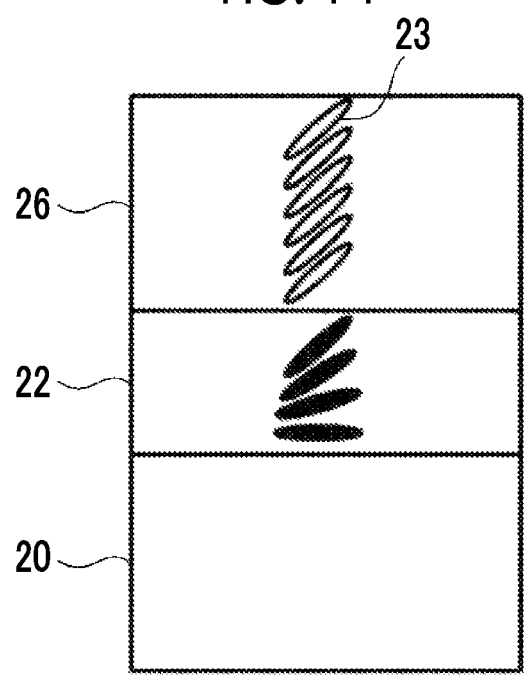
FIG. 14 is a conceptual diagram for explaining a method for controlling a tilt angle in a liquid crystal cured layer.

On the other hand, the tilt angle of the liquid crystal compound 23 on the air interface side of the liquid crystal cured layer 24 has a property of being aligned in the vertical direction due to an excluded volume effect unless special measures are taken. That is, the optical axis of a disk-like liquid crystal compound is apt to turn toward the horizontal direction, and the optical axis of the rod-like liquid crystal compound is apt to turn toward the vertical direction. Therefore, it is difficult to fix the tilt angle of the liquid crystal compound 23 on the air interface side at any angle. In contrast, as will described later, by blending a special compound at a specific proportion, the tilt angle of the liquid crystal compound 23 on the air interface side can be controlled at any angle as shown in FIG. 14.

In a case where the liquid crystal cured layer 24 (O plate) formed on the support 20 by the above-described method is transferred and used as an optical film (viewing angle control film), in a case where the support 20 (TAC film or the like) and/or the hybrid-aligned liquid crystal layer 22 remains, unfavorable phenomena such as coloring in a case of being observed from an oblique direction, the right-to-left viewing angle adjustment performance, and film thickness increasing may occur. Therefore, as described above, in a case where the liquid crystal cured layer 24 is formed by using the hybrid-aligned liquid crystal layer 22 as an alignment film, the performance can be further improved by enabling peeling at the interface between the liquid crystal cured layer 24 (O plate) and the liquid crystal layer 22 so that the liquid crystal cured layer 24 alone is used as an optically anisotropic layer. In this case, since both the liquid crystal cured layer 24 (O plate) and the liquid crystal layer 22 are liquid crystal compounds having similar properties, the adhesive force tends to be high and peeling at the interface is difficult; however, interfacial peeling is enabled by reducing the amount of residual double bonds on the surface by reducing the amount of residual oxygen at the time of curing the liquid crystal layer 22 with ultraviolet radiation to 100 ppm or less.

Here, with regard to the liquid crystal cured layer 24, a layer (O plate) having optical anisotropy in which the liquid crystal compound is uniformly inclined in the thickness direction in the layer, which is most preferable in terms of performance in the use application of the present application, has been described as an example; however, in the present invention, it is also acceptable to produce a liquid crystal cured layer that is hybrid-aligned by widely varying the tilt angle of the liquid crystal compound from the air interface side to the support interface side, and causing interfacial peeling between this liquid crystal cured layer and the liquid crystal layer 22 to use only the liquid crystal cured layer as the optically anisotropic layer.

—Liquid Crystal Compound—

Examples of a liquid crystal compound that can be utilized for the production of the optically anisotropic layer include both a rod-like liquid crystal compound and a disk-like liquid crystal compound.

Regarding the rod-like liquid crystal compound, azomethines, azoxies, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes, and alkenylcyclohexylbenzonitriles are preferably used. Fixing of these rod-like liquid crystal compounds is carried out by introducing a polymerizable group into the terminal structure of a rod-like liquid crystal compound (similarly to the case of a disk-like liquid crystal compound that will be described later) and utilizing this polymerization and curing reaction. As a specific example, an example of curing a polymerizable nematic rod-like liquid crystal compound with ultraviolet radiation is described in JP2006-209073A. Furthermore, not only the above-mentioned low-molecular-weight liquid crystal compound but also a polymer liquid crystal compound can be used. The polymer liquid crystal compound is a polymer having a side chain corresponding to a low-molecular-weight liquid crystal compound such as described above. An optically anisotropic layer using a polymer liquid crystal compound is described in JP1993-053016AJP-H05-053016A and the like.

Furthermore, as the rod-like liquid crystal compound, a compound whose refractive index anisotropy is reverse wavelength dispersible can be used. In a case where it is said that the refractive index anisotropy of a compound is reverse wavelength dispersible, it is implied that the refractive index anisotropy $\Delta n$ of the molecules increases with the wavelength. It can be said that a compound having reverse wavelength dispersibility satisfies the following formulae with regard to the refractive index anisotropy $\Delta n(\lambda)$ in the case of uniaxially aligning the compound:

$$\Delta n(450)/\Delta n(550) < 1.0$$

$$\Delta n(650)/\Delta n(550) > 1.0.$$

On the contrary, the refractive index anisotropy $\Delta n$ of molecules decreasing with the wavelength is referred to as forward wavelength dispersibility. Regarding such a compound having reverse wavelength dispersibility, for example, the compounds described in JP2009-173893A, JP2010-030979A, JP2010-031223A, JP2011-006360A, JP2011-006361A, JP2011-042606A, JP2012-077055 A, JP2013-509458A, WO2012/147904A, WO2012/141245A, WO2013/18526A, JP2008-107767A, JP2010-084032A, JP2016-081035A, and the like can be utilized. By using a mixture of these compounds and a liquid crystal compound having forward wavelength dispersibility, the wavelength dispersibility can be controlled, and tinting of display images and the light leakage of the display can be reduced.

Examples of a disk-like (discotic) liquid crystal compound that can be used for the production of an optically anisotropic layer include the benzene derivatives described in Research Report by C. Destrade et al. and Mol. Cryst. Vol. 71, p. 111 (1981); truxene derivatives described in Research Report by C, Destrade et al., Mol. Cryst. Vol. 122, p. 141 (1985), and Physicslett, A, Vol. 78, p. 82 (1990); cyclohexane derivatives described in Research Report by B. Kohne et al. and Angew. Chem. Vol. 96, p. 70 (1984); and aza-crown-based and phenylacetylene-based macrocycles described in J. M. Lehn et al, J. Chem. Commun., p. 1794 (1985), Research Report by J. Zhantz et al., and J. Am. Chem. Soc. Vol. 116, p. 2655 (1994).

Regarding the molecule of a disk-like liquid crystal compound, compounds showing liquid crystallinity having a structure in which the mother nucleus at the molecule center is radially substituted with a linear alkyl group, an alkoxy group, or a substituted benzoyloxy group as a side chain of the mother nucleus, are also included. It is preferable that the disk-like liquid crystal compound is a compound in which the molecule or an aggregate of molecules is a compound having rotation symmetry and capable of imparting a certain alignment. An optically anisotropic layer formed from a composition containing a disk-like liquid crystal compound does not need to exhibit liquid crystallinity in a state of being finally included in the optically anisotropic layer. For example, in a case where a low-molecular-weight weight disk-like liquid crystal compound having a group that reacts with heat or light is subjected to a polymerization reaction or the like by heating or light irradiation to increase the molecular weight, liquid crystallinity is lost; however, an optically anisotropic layer including such a disk-like liquid crystal compound having an increased molecular weight can also be utilized for the present invention. Preferred examples of the disk-like liquid crystal compound include the compounds described in JP1996-050206A (JP-H08-050206A). Furthermore, the polymerization of disk-like liquid crystalline molecules is described in JP1996-027284A (JP-H08-027284A).

In order to fix the disk-like liquid crystal compound by polymerization, it is necessary to bond a polymerizable group as a substituent to a disk-like core of a molecule of the disk-like liquid crystal compound. A compound in which the disk-like core and the polymerizable group are bonded through a linking group is preferred, whereby the alignment state can be maintained even in the polymerization reaction. For example, the compounds described in paragraph numbers [0151] to [0168] in JP2000-155216A may be mentioned.

In the composition for forming the optically anisotropic layer (polymerizable liquid crystal composition), additives such as a plasticizer, a surfactant, and a polymerizable monomer may be used in combination with the liquid crystal compound. These additives are added for various purposes such as improving the uniformity of a coating film, the strength of the film, the aligning properties of the liquid crystal compound, and the like.

Examples of the polymerizable monomer include radically polymerizable or cationically polymerizable compounds. The polymerizable monomer is preferably a polyfunctional radically polymerizable monomer, and a monomer that is copolymerizable with the above-mentioned polymerizable group-containing liquid crystal compound is preferred. For example, those described in paragraph numbers [0018] to [0020] in the specification of JP2002-296423A may be mentioned. The amount of addition of the above-described compound is generally in the range of 1% to 50% by mass, and preferably in the range of 5% to 30% by mass, with respect to the liquid crystal compound.

Examples of the surfactant include conventionally known compounds; however, a fluorine-based compound is particularly preferable. Specific examples thereof include the compounds described in paragraph numbers [0028] to [0056] in JP2001-330725A.

Examples of a polymer that can be used include a cellulose ester. Preferred examples of the cellulose ester include those described in paragraph number [0178] in JP2000-155216A. The amount of addition of the polymer is preferably in the range of 0.1% to 10% by mass, and more preferably in the range of 0.1% to 8% by mass, with respect to the liquid crystalline molecules, so as not to hinder the alignment of the liquid crystal compound.

The discotic nematic liquid crystal phase-solid phase transition temperature of the disk-like liquid crystalline molecules is preferably 0° C. to 300° C., and more preferably 70° C. to 170° C.

The optically anisotropic layer can be formed by applying a coating liquid including a liquid crystal compound and optionally including a polymerizable initiator that will be described below and any optional component on the surface, preferably the surface of an alignment film.

Regarding the solvent to be used for preparing the coating liquid, an organic solvent is preferably used. Examples of the organic solvent include an amide (for example, N,N-dimethylformamide), a sulfoxide (for example, dimethyl sulfoxide), a heterocyclic compound (for example, pyridine), a hydrocarbon (for example, benzene or hexane), an alkyl halide (for example, chloroform, dichloromethane, or tetrachloroethane), an ester (for example, methyl acetate or butyl acetate), a ketone (for example, acetone or methyl ethyl ketone), and an ether (for example, tetrahydrofuran or 1,2-dimethoxyethane). An alkyl halide and a ketone are preferred. Two or more kinds of organic solvents may be used together.

Coating of the coating liquid can be carried out by a conventionally known method. The optically anisotropic layer may be formed as a single film by coaling once or may be formed as a laminate of a plurality of layers by lamination coating or sticking.

The thickness of the optically anisotropic layer is preferably 0.1 µm to 20 µm, more preferably 0.5 µm to 15 µm, and even more preferably 1 µm to 10 µm, from the viewpoint of reducing the thickness of the apparatus as a whole.

Regarding a method of maintaining and fixing the alignment state of the aligned liquid crystal compound, it is preferable to carry out the method by a polymerization reaction. The polymerization reaction includes a thermal polymerization reaction using a thermal polymerization initiator and a photopolymerization reaction using a photopolymerization initiator, and a photopolymerization reaction is more preferred. Examples of the photopolymerization initiator include α-carbonyl compounds (described in U.S. Pat. Nos. 2,367,166A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of triarylimidazole dimers and p-aminophenyl ketone (U.S. Pat. No. 3,549,367A), acridine and phenazine compounds (JP1985-105667A (JP-S60-105667A), U.S. Pat. No. 4,239,850A), and oxadiazole compounds (U.S. Pat. No. 4,212,970A).

The amount of use of the photopolymerization initiator is preferably in the range of 0.01% to 20% by mass, and more preferably in the range of 0.5% to 5% by mass, of the solid content of the coating liquid.

It is preferable to use ultraviolet radiation for the light irradiation for polymerizing the liquid crystal compound.

The irradiation energy is preferably in the range of 20 mJ/cm² to 50 J/cm², more preferably in the range of 20 to 5000 mJ/cm², and even more preferably in the range of 100 to 800 mJ/cm². Furthermore, in order to promote the photopolymerization reaction, light irradiation may be carried out under heating conditions.

The average direction of the optic axis of the liquid crystal compound in the optically anisotropic layer can be generally adjusted by selecting the material of the liquid crystal or the alignment film utilized for forming the optically anisotropic layer or selecting the conditions for the rubbing treatment method, or by the polarization direction of the polarized light to be irradiated on the photo-alignment film or the irradiation angle of the non-polarized light. Furthermore, the direction of the optic axis of the liquid crystal compound on the surface side (air side) in the optically anisotropic layer can be generally adjusted by selecting the type of the additive (for example, a plasticizer, a surfactant, a polymerizable monomer, and a polymer) that is used together with the liquid crystal compound used for forming the optically anisotropic layer. The degree of change in the alignment direction of the optic axis can also be adjusted by selecting the liquid crystal compound and the additive in the same manner as described above.

For example, it is preferable that the liquid crystal composition used for forming the liquid crystal cured layer includes 0.1 to 3.0 parts by mass of a polymer A that includes at least constitutional units represented by the following General Formula (1) and General Formula (2) per 100 parts by mass of the liquid crystal compound in the liquid crystal composition.

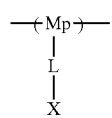

General Formula (1)

In General Formula (1), Mp represents a trivalent group constituting a portion or the entirety of the polymer main chain; L represents a single bond or a divalent linking group; and X represents a substituted or unsubstituted aromatic ring or a group in which a plurality of substituted or unsubstituted aromatic rings are bonded through a single bond.

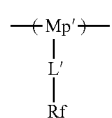

General Formula (2)

In General Formula (2), Mp' represents a group represented by Formula (X1) or a group represented by Formula (X2); L' represents a single bond or a divalent linking group; and Rf represents an alkyl group having a CF₃ group or a CF₂H group at the end and represents an alkyl group in which 50% or more of hydrogen atoms in the alkyl group have been substituted with fluorine atoms. In Formula (X1) and Formula (X2), the symbol * represents the bonding position. However, a hydrogen atom in Formula (X1) and Formula (X2) may be substituted with a substituent.

(X1)

(X2)

As the liquid crystal composition has the polymer A, the alignment direction (tilt angle) of the liquid crystal compound on the air interface side of the liquid crystal cured layer can be adjusted.

General Formula (1), Mp is a trivalent group and constitutes a portion or the entirety of the main chain of the polymer.

Preferred specific examples of Mp will be shown below; however, Mp is not limited to this. Furthermore, the site represented by the symbol * in Mp represents a site that is linked to L.

(Mp-1)

(Mp-2)

(Mp-3)

(Mp-4)

(Mp-5)

(Mp-6)

(Mp-7)

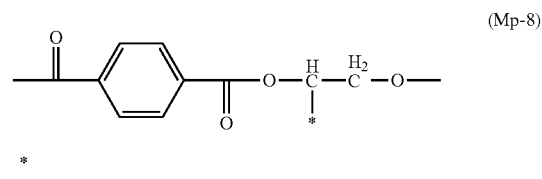

(Mp-8)

-continued (Mp-9)
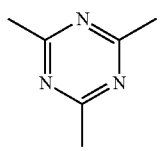

(Mp-10)
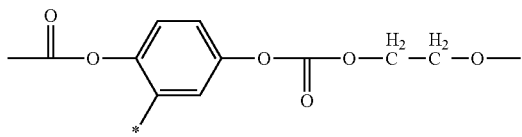

(Mp-11)
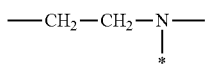

(Mp-12)
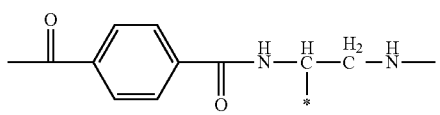

(Mp-13)
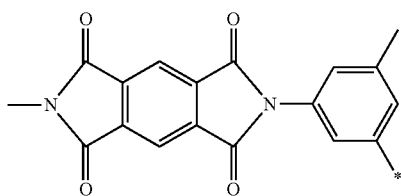

(Mp-14)
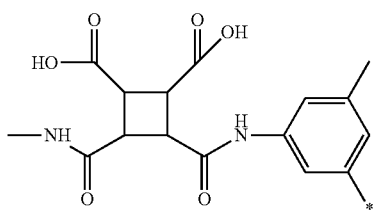

(Mp-15)
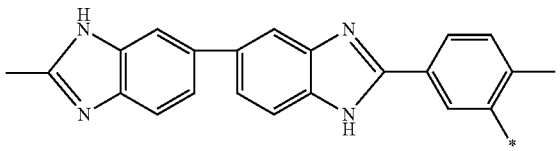

(Mp-16)

(Mp-17)

(Mp-18)
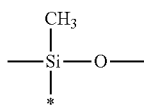

-continued (Mp-19)
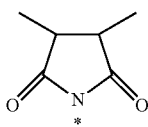

Examples of the divalent linking group represented by L in General Formula (3) include divalent linking groups selected from a substituted or unsubstituted alkylene group having 1 to 20 carbon atoms (for example, a methylene group, an ethylene group, a propylene group, a butylene group, and an isopropylene group), an alkenylene group having 2 to 20 carbon atoms (for example, a vinylene group and a butene group), —O—, —NR$^{a1}$—, —S—, —PR$^{a2}$—, —Si(R$^{a3}$)(R$^{a4}$)—, —C(=O)—, —C(=O)O—, —C(=O)NR$^{a5}$—, —OC(=O)O—, —OC(=O)NR$^{a6}$—, —NR$^{a7}$C(=O)NR$^{a8}$—, —(—O)$_2$CH—, and a group formed by linking two or more of these.

Here, R$^{a1}$ to R$^{a8}$ each represent a substitutable substituent, and examples include a hydrogen atom, a halogen atom, an alkyl group, an alkenyl group, an alkynyl group, a cyano group, a hydroxyl group, a nitro group, a carboxyl group, an alkoxy group, a silyloxy group, an acyloxy group, an alkoxycarbonyloxy group, an amino group (excluding an anilino group), an acylamino group, an aminocarbonylamino group, an alkoxycarbonylamino group, a mercapto group, an alkylthio group, a sulfamoyl group, a sulfo group, an alkylsulfinyl group, an alkylsulfonyl group, an acyl group, an alkoxycarbonyl group, an imide group, a phosphino group, a phosphinyl group, a phosphinyloxy group, a phosphinylamino group, and a silyl group, while a hydrogen atom or an alkyl group is preferred.

A linking group as shown below, which is formed by linking two or more of the above-described linking groups, is also preferable. Furthermore, the site represented by the symbol * in L represents a site that is linked to Mp. In the following formulae, m represents an integer of 1 to 20, preferably 1 to 16, more preferably 2 to 12, and even more preferably 2 to 6.

(L-1)
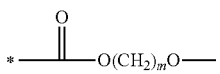

(L-2)
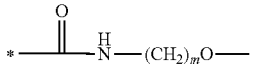

(L-3)
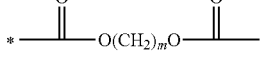

(L-4)
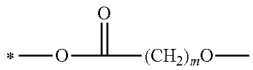

(L-5)
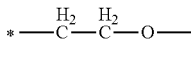

(L-6)
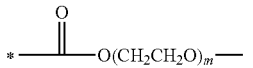

(L-7)
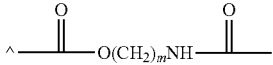

In a case where Mp represents (Mp-1) or (Mp-2), L is preferably a divalent linking group selected from —O—, —NR$^{a11}$— (R$^{a11}$ represents a hydrogen atom or an aliphatic hydrocarbon group having 1 to 10 carbon atoms), —S—, —C(=O)—, —S(=O)$_2$—, a substituted or unsubstituted alkylene group having 1 to 20 carbon atoms, or a group formed by linking two or more of these; and more preferably —O—, —C(=O)O—, —C(=O)NH—, or a divalent linking group consisting of a combination of one or more of these and an alkylene group. For example, the above-mentioned (L-1), (L-2), (L-3), and (L-6) may be mentioned.

X represents a substituted or unsubstituted aromatic ring, or a group in which a plurality of substituted or unsubstituted aromatic rings are bonded through a single bond.

The aromatic ring may be a monocyclic ring or may be a multicyclic ring (so-called aromatic fused ring).

The number of aromatic rings is not particularly limited; however, the number is preferably 1 to 5.

The aromatic ring is not only a hydrocarbon-based aromatic ring in which the atoms constituting the ring are carbon atoms only, but also an aromatic ring fused with a heterocyclic ring having a heteroatom as a ring-constituting atom.

The group in which a plurality of substituted or unsubstituted aromatic rings are bonded through a single bond, means a group having a structure in which a plurality of (two or more) aromatic rings are bonded to each other by a single bond, and for example, a biphenyl group corresponds to this.

Regarding X, a substituted or unsubstituted indenyl group having 5 to 30 carbon atoms, a substituted or unsubstituted naphthyl group, a substituted or unsubstituted phenyl group, or a substituted or unsubstituted biphenyl group is more preferred, and a substituted or unsubstituted naphthyl group, a substituted or unsubstituted phenyl group, or a substituted or unsubstituted biphenyl group is even more preferred.

It is preferable that L' in General Formula (2) represents a divalent linking group selected from —O—, —NR$^{a11}$— (provided that R$^{a11}$ represents a hydrogen atom, an aliphatic hydrocarbon group having 1 to 10 carbon atoms, or an aryl group having 6 to 20 carbon atoms), —S—, —C(=O)—, —S(=O)$_2$—, a substituted or unsubstituted alkylene group having 1 to 20 carbon atoms, and a group formed by linking two or more of these.

Rf represents an alkyl group having a CF$_3$ group or a CF$_2$H group at the end, the alkyl group being an alkyl group in which 50% or more of hydrogen atoms in the alkyl group are substituted with fluorine atoms.

The hydrogen atom substituted with a fluorine atom in the alkyl group may be 50% or more, preferably 60% or more, and more preferably 70% or more.

Regarding the above-described alkyl group, a group represented by -L$^a$-L$^b$-R$^x$ is preferred.

L$^a$ represents a single bond or an alkylene group that may include an oxygen atom. The number of carbon atoms of the alkylene group is not particularly limited, and the number of carbon atoms is preferably 1 to 4, and more preferably 1 to 3.

L$^b$ represents a perfluoroalkylene group. The number of carbon atoms of the perfluoroalkylene group is not particularly limited, and the number of carbon atoms is preferably 3 to 20, and more preferably 3 to 10.

R$^x$ represents a CF$_3$ group or a CF$_2$H group.

The polymer A may include a constitutional unit other than a constitutional unit represented by General Formula (1) and a constitutional unit containing the structure represented by General Formula (2).

The content of the constitutional unit represented by General Formula (1) in the polymer A is not particularly limited; however, the content is preferably 1% to 90% by mass, more preferably 3% to 80% by mass, and even more preferably 20% to 80% by mass, with respect to all the constitutional units of the polymer (C).

The content of the constitutional unit represented by General Formula (2) in the polymer A is not particularly limited; however, the content is preferably 5% to 90% by mass, more preferably 10% to 80% by mass, and even more preferably 20% to 60% by mass, with respect to all the constitutional units of the polymer (C).

Regarding the polarizer 7, a polarizer similar to the polarizer of the above-mentioned viewing-side polarizing plate 2 and the backlight-side polarizing plate 5 can be utilized. The polarizer 7 can be used as a reflective polarizer from the viewpoint of recycling the light incident from the backlight 8 and enhancing the luminance per power consumption. Furthermore, various functional layers that can be combined may be given to the above-mentioned polarizer as necessary.

The above-mentioned optically anisotropic layer 6 and the polarizer 7 may be provided separately from the backlight-side polarizing plate 5 or may be provided integrally with the backlight-side polarizing plate 5 by adhesion. From the viewpoint of reducing the thickness of the image display apparatus, as shown in FIG. 1, it is preferable that the backlight-side polarizing plate 5, the optically anisotropic layer 6, and the polarizer 7 are laminated and integrated.

<Image Display Apparatus (Second Aspect)>

With regard to the 2A-th aspect of the image display apparatus according to the embodiment of the invention,
the image display apparatus according to the embodiment of the present invention is
an image display apparatus including an optical film, a viewing-side polarizing plate, a liquid crystal cell, a backlight-side polarizing plate, and a backlight in this order,
wherein the optical film includes an optically anisotropic layer and a polarizer in this order from a liquid crystal cell side,
an absorption axis of the viewing-side polarizing plate and an absorption axis of the polarizer are parallel or orthogonal to each other,
the optically anisotropic layer is optically uniaxially anisotropic, while in a case where the optic axis of the optically anisotropic layer is projected onto a first polarizer as viewed from the viewing-side of the image display apparatus, the azimuthal angle of the optic axis is +50° to +70° or −50° to −70° with respect to the horizontal direction,
an average tilt angle of the optic axis with respect to a main surface of the optically anisotropic layer is 20° to 45°, and
the in-plane phase difference Re (550) of the optically anisotropic layer at a wavelength of 550 nm is 70 nm to 240 nm.

The 2B-th aspect of the image display apparatus of the invention is
an image display apparatus including an optical film, a viewing-side polarizing plate, a liquid crystal cell, a backlight-side polarizing plate, and a backlight in this order,
wherein the optical film includes an optically anisotropic layer and a polarizer in this order from a liquid crystal cell side, an absorption axis of the viewing-side polarizing plate and an absorption axis of the polarizer are parallel or orthogonal to each other, the optically anisotropic layer is an optically anisotropic layer in which optically anisotropic bodies having positive birefringence are hybrid-aligned, while in a case where a slow axis of the optically anisotropic layer is projected onto the polarizer as viewed from a viewing-side of the image display apparatus, an azimuthal angle of the slow axis is +50° to +70° or −50° to −70° with respect to a horizontal direction, the average tilt angle of the slow axis with respect to the main surface of the optically anisotropic layer is 20° to 45°, and the in-plane phase difference Re (550) of the optically anisotropic layer at a wavelength of 550 nm is 70 nm to 240 nm.

The 2C-th aspect of the image display apparatus according to the embodiment of the invention is an image display apparatus including an optical film, a viewing-side polarizing plate, a liquid crystal cell, a backlight-side polarizing plate, and a backlight in this order, wherein the optical film includes an optically anisotropic layer and a polarizer in this order from a liquid crystal cell side, an absorption axis of the viewing-side polarizing plate and an absorption axis of the polarizer are parallel or orthogonal to each other, the optically anisotropic layer is an optically anisotropic layer in which optically anisotropic bodies having negative birefringence are hybrid-aligned, while in a case where a fast axis of the optically anisotropic layer is projected onto the polarizer as viewed from a viewing-side of the image display apparatus, an azimuthal angle of the fast axis is +50° to +70° or −50° to −70° with respect to a horizontal direction, an average tilt angle of the fast axis with respect to a main surface of the optically anisotropic layer is 20° to 45°, and the in-plane phase difference Re (550) of the optically anisotropic layer at a wavelength of 550 nm is 70 nm to 240 nm.

In the following description, the image display apparatuses of the 2A-th aspect to the 2C-th aspect will be collectively referred to as the image display apparatus of the second aspect.

A liquid crystal display device can be used as a preferred aspect of the image display apparatus according to the second aspect of the invention.

Figure 15:
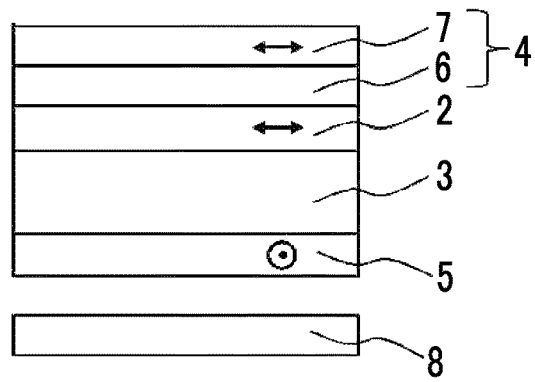
FIG. 15 is a conceptual diagram showing another example of the image display apparatus according to the embodiment of the invention.

A more specific embodiment of the image display apparatus of the second aspect of the invention is shown in FIG. 15. The image display apparatus 1*b* shown in FIG. 15 includes an optical film 4, a viewing-side polarizing plate 2, a liquid crystal cell 3, a backlight-side polarizing plate 5, and a backlight 8 in this order. As shown in FIG. 15, the optical film 4 includes the optically anisotropic layer 6 and the polarizer 7 in this order from the liquid crystal cell 3 side. In the image display apparatus 1*b*, basically, each member is disposed such that the main surfaces of the members are parallel to each other.

Each polarizing plate (polarizer) may include a polarizing plate protective film that is not shown in the drawing.

In FIG. 15, the arrow of the viewing-side polarizing plate 2 indicates that the absorption axis of the viewing-side polarizing plate 2 is parallel to the paper surface, the mark of the backlight-side polarizing plate 5 indicates that the absorption axis of the backlight-side polarizing plate 5 is perpendicular to the paper surface, and the mark of the polarizer 7 indicates that the absorption axis of the polarizer is parallel to the paper surface.

That is, in the example shown in FIG. 15, the absorption axis of the viewing-side polarizing plate 2 and the absorption axis of the polarizer 7 of the optical film 4 are parallel to each other.

Here, according to the present invention, in the case of the image display apparatus of the 2A-th aspect, the optically anisotropic layer 6 is optically uniaxially anisotropic, the azimuthal angle of the optic axis in a case where the optic axis of the optically anisotropic layer 6 is projected onto the polarizer 7 as viewed from the viewing-side of the image display apparatus 1*b* is +50° to +70° or −50° to −70° with respect to the horizontal direction, the average tilt angle of the optic axis with respect to the main surface of the optically anisotropic layer 6 is 20° to 45°, and the in-plane phase difference Re (550) of the optically anisotropic layer 6 at a wavelength of 550 nm is 70 nm to 240 nm.

Furthermore, in the case of the image display apparatus of the 2B-th aspect, the optically anisotropic layer 6 is an optically anisotropic layer in which optically anisotropic bodies having positive birefringence are hybrid-aligned, the azimuthal angle of the slow axis in a case where the slow axis of the optically anisotropic layer 6 is projected onto the polarizer 7 as viewed from viewing-side of the image display apparatus 1*b* is +50° to +70° or −50° to −70° with respect to the horizontal direction, the average tilt angle of the slow axis with respect to the main surface of the optically anisotropic layer 6 is 20° to 45°, and the in-plane phase difference Re (550) of the optically anisotropic layer 6 at a wavelength of 550 nm is 70 nm to 240 nm.

Furthermore, in the case of the image display apparatus of the 2C-th aspect, the optically anisotropic layer 6 is an optically anisotropic layer in which optically anisotropic bodies having negative birefringence are hybrid-aligned, the azimuthal angle of the fast axis in a case where the fast axis of the optically anisotropic layer 6 is projected onto the polarizer 7 as viewed from viewing-side of the image display apparatus 1*b* is +50° to +70° or −50° to −70° with respect to the horizontal direction, the average tilt angle of the fast axis with respect to the main surface of the optically anisotropic layer 6 is 20° to 45°, and the in-plane phase difference Re (550) of the optically anisotropic layer 6 at a wavelength of 550 nm is 70 nm to 240 nm.

The following description will be given mainly in connection with the image display apparatus of the 2A-th aspect; however, for the image display apparatus of the 2B-th aspect, the optic axis of the optically anisotropic layer 6 that is uniaxially anisotropic in the image display apparatus of the 2A-th aspect can be replaced and read as the slow axis of the optically anisotropic layer 6 that is hybrid-aligned. With regard to the image display apparatus of the 2C-th aspect, the optic axis of the optically anisotropic layer 6 that is uniaxially anisotropic in the image display apparatus of the 2A-th aspect can be replaced and read as the fast axis of the optically anisotropic layer 6 that is hybrid-aligned.

In the image display apparatus of the second aspect of the invention, since the optically anisotropic layer 6 has such a configuration, the image (video) displayed by the image display apparatus can be imparted with asymmetry in the right-to-left direction. As a result, a clear image can be displayed to the driver, and an appropriate viewing angle control function that reduces reflected glare on the window glass can be exhibited. Furthermore, the occurrence of moire in the displayed image can be suppressed. Therefore, the optical film 4 can be said to be a viewing angle control film. Furthermore, since the optical film 4 having the optically anisotropic layer 6 and the polarizer 7 is only added to an image display apparatus (liquid crystal display device) having a general configuration, the thickness can be reduced, and the cost can be suppressed.

The configuration of such an optically anisotropic layer and the operation of the image display apparatus will be described in detail later.

The image display apparatus may have other members as necessary. For example, the image display apparatus may have a configuration in which an optical compensation film is disposed between a liquid crystal cell and a polarizing plate. Alternatively, the image display apparatus may have a pressure-sensitive adhesive layer for sticking each of the members to each other.

Since the configuration of the liquid crystal cell, the polarizing plate, the backlight, and the like in the image display apparatus of the second aspect has a configuration similar to that of the liquid crystal cell, the polarizing plate, the backlight, and the like of the image display apparatus of the first aspect, further description thereof will not be repeated. Furthermore, the optical film in the image display apparatus of the second aspect has a configuration similar to that of the optical film of the image display apparatus of the first aspect, except that the position of disposition is different,

[Optical Film]

The optical film 4 has an optically anisotropic layer 6 and a polarizer 7. In the image display apparatus of the second aspect, the optical film 4 is disposed on a surface side of the viewing-side polarizing plate 2, the surface side being on the opposite side of the liquid crystal cell 3. That is, the optical film 4 is disposed on the surface on the viewing-side of the viewing-side polarizing plate 2. Furthermore, the optical film 4 is disposed in the order of the optically anisotropic layer 6 and the polarizer 7 from the liquid crystal cell 3 side. Therefore, the image display apparatus 1 is disposed in the order of the polarizer 7, the optically anisotropic layer 6, the viewing-side polarizing plate 2, the liquid crystal cell 3, the backlight-side polarizing plate 5, and the backlight 8 from the viewing-side.

As described above, in the image display apparatus of the 2A-th aspect, the optically anisotropic layer 6 is optically uniaxially anisotropic, the azimuthal angle of the optic axis in a case where the optic axis of the optically anisotropic layer 6 is projected onto the polarizer 7 as viewed from the viewing-side of the image display apparatus 1 is +50° to +70° or −50° to −70° with respect to the horizontal direction, the average tilt angle of the optic axis with respect to the main surface of the optically anisotropic layer 6 is 20° to 45°, and the in-plane phase difference Re (550) of the optically anisotropic layer 6 at a wavelength of 550 nm is 70 nm to 240 nm.

Furthermore, as described above, the absorption axis of the polarizer 7 is parallel to the absorption axis of the viewing-side polarizing plate 2.

Next, a mechanism by which the image display apparatus of the second aspect of the invention having such an optical film exhibits a viewing angle control function with asymmetry in the display characteristics in the right-to-left direction will be described by using FIG. 16. The image display apparatus 1b shown in FIG. 16 has a configuration similar to that of the image display apparatus 1b shown in FIG. 15.

Figure 16:
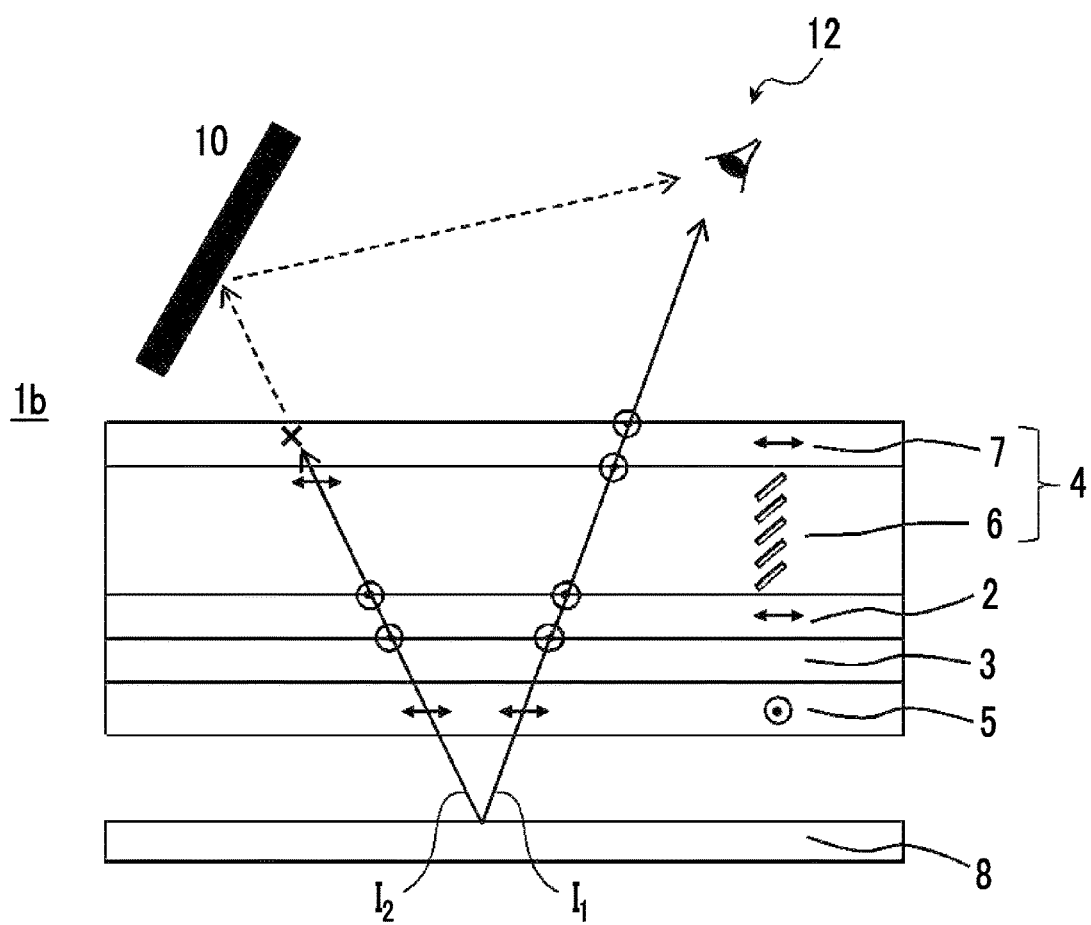
FIG. 16 is a conceptual diagram for explaining the operation of the image display apparatus shown in FIG. 15.

In the image display apparatus 1b shown in FIG. 16, in a case where light is emitted from the backlight 8, at the time of the light passing through the backlight-side polarizing plate 5, the liquid crystal cell 3, and the viewing-side polarizing plate 2, the light is transmitted or blocked off depending on the on/off state of the liquid crystal cell 3. At that time, the transmitted light becomes linearly polarized light that oscillates in a direction (direction perpendicular to the paper surface) orthogonal to the direction (direction parallel to the paper surface) of the absorption axis of the viewing-side polarizing plate 2.

The linearly polarized light that has passed through the viewing-side polarizing plate 2 enters the optically anisotropic layer 6 of the optical film 4. At that time, since the optically anisotropic layer 6 has an optic axis as described above, the phase difference given to the light differs depending on the angle of incidence (polar angle, azimuthal angle) on the optically anisotropic layer 6.

For example, in a case where the traveling direction of the light 11 (see FIG. 16) emitted from the backlight 8 in an oblique direction is close to parallel to the optic axis of the optically anisotropic layer 6, which is a uniaxially anisotropic body, almost no phase difference is given to the light $I_1$ from the optically anisotropic layer 6, and the light $I_1$ is transmitted through the optically anisotropic layer 6 as linearly polarized light oscillating in a direction perpendicular to the paper surface. The light $I_1$ transmitted through the optically anisotropic layer 6 enters the polarizer 7. Since the absorption axis of the polarizer 7 is parallel to the paper surface, most of the light $I_1$, which is linearly polarized light in the direction perpendicular to the paper surface, is transmitted through the polarizer 7 without being absorbed by polarizer 7. As a result, an image is displayed. Therefore, an image can be displayed to an observer 12 who sees the image display apparatus 1b from this direction.

On the other hand, light $I_2$ emitted in a direction different from the light $I_1$, that is, in a direction not parallel to the optic axis of the optically anisotropic layer 6, is given a phase difference by the optically anisotropic layer 6. At that time, a phase difference of $\lambda/2$ is given to the obliquely incident light $I_2$ by setting the in-plane phase difference Re (550) of the optically anisotropic layer 6 to be in the above-described range, and also, by setting the azimuthal angle of the optic axis to be in the above-described range, the angle formed by the oscillation direction of the light $I_2$ and the optic axis of the optically anisotropic layer 6 becomes close to 45°. As a result, the light $I_2$ is converted by the optically anisotropic layer 6 from linearly polarized light oscillating in a direction perpendicular to the paper surface to linearly polarized light oscillating in a direction parallel to the paper surface. Since the absorption axis of the polarizer 7 is parallel to the paper surface, the light $I_2$ that has passed through the optically anisotropic layer 6 is absorbed by the polarizer 7. Therefore, the amount of light $I_2$ emitted from the image display apparatus 1 is reduced. That is, the amount of light in the displayed image is reduce& For that reason, even in a case where a reflector 10 such as a windshield is present in the direction in which the light $I_2$ is emitted, the image formed by the light $I_2$ can be suppressed from being reflected on the reflector 10 and observed by the observer 12 (See the broken line arrow in FIG. 16). Here, the description has been made on the premise that the optically anisotropic body is a uniaxial body; however, it may be considered that a similar phenomenon occurs even in a case where the optically anisotropic body is a hybrid-aligned optically anisotropic body.

As described above, it has been suggested to replace the side mirrors and rear-view mirrors of an automobile with image display apparatuses, or to cover a vehicle body structure that obstructs the driver's visual field, such as a side pillar, with an image display apparatus and display a video that complements the obstructed visual field. In a case where the image display apparatus is incorporated in a vehicle in this way, it is not always possible to dispose the image display apparatus such that the driver and the image display apparatus face each other, due to the structural design of the vehicle. Therefore, it is necessary to widen the viewing angle of the image display apparatus so that the image display apparatus can correctly display both color and brightness even from various angles (polar angles, azimuthal angles). Conventional image display apparatuses are designed so as not to depend on the polar angle or the azimuthal angle in a case where the viewing angle is widened. However, in an image display apparatus having a wide viewing angle, since the image display apparatus is designed to emit image light even in directions other than the observer (driver), a displayed image is reflected as glare on reflectors such as the windshield and window glasses, and there has been a problem that the glare disturbs the driver.

In order to prevent such reflected glare of a displayed image, it is conceivable to apply a louver film or an electro-optical element. However, since conventional louver films have symmetry horizontally or vertically, there is a problem that it is difficult to achieve both the display of a clear image to the driver and the reduction of reflected glare on the window glass. Furthermore, the electro-optical element has a problem that the thickness of the device increases so that it is difficult to mount the device in a limited space in a vehicle, and the manufacturing cost also increases high.

In contrast, in the image display apparatus of the second aspect of the invention, as the azimuthal angle and the average tilt angle of the optic axis of the optically anisotropic layer and the in-plane phase difference Re (550) are set to be in the above-described ranges, as described above, a visual field region (visible range) in which the light that has passed through the viewing-side polarizing plate 2 (liquid crystal cell 3) is transmitted without being mostly absorbed by the polarizer 7, and a visual field region in which the light is absorbed by the polarizer 7 and the amount of transmitted light is reduced, can be provided horizontally asymmetrically. Therefore, by disposing the image display apparatus according to the embodiment of the invention such that the visible range turns toward the direction of the observer and regions other than that turn toward the direction of a reflector 10 such as the windshield, the reflected glare on the reflector 10 can be suppressed, and a clear display can be made to the observer 12.

Furthermore, by disposing an optical film having an optically anisotropic layer and a polarizer on the viewing-side of the viewing-side polarizing plate, the light beam emitted from the liquid crystal cell is given directivity, and by integrating the functions of the optical film with the viewing-side polarizing plate, the thickness of the device can be reduced. As a result, it is possible to control the viewing angle asymmetrically in the right-to-left direction without affecting the design even in use applications for a vehicle.

Furthermore, in the louver film formed of a fine structure, moire may occur between the member constituting the backlight and the pixels and the like of the liquid crystal cell. In contrast, since the image display apparatus according to the embodiment of the invention does not essentially have such a fine structure, moire does not occur.

From the description given above, it can be seen that the visible range occurs in a direction parallel to the optic axis of the optically anisotropic layer. Therefore, the polar angle in the central direction of the visible range can be adjusted mainly by controlling the average tilt angle of the optic axis in the optically anisotropic layer.

The average tilt angle, azimuthal angle, and in-plane phase difference Re of the optic axis of the optically anisotropic layer may be appropriately set according to the direction to be defined as the visible range in the image display apparatus.

The viewing angle control function of the image display apparatus according to the embodiment of the invention will be described in more detail by using simulation.

The simulation conditions are as follows.

Figure 17:
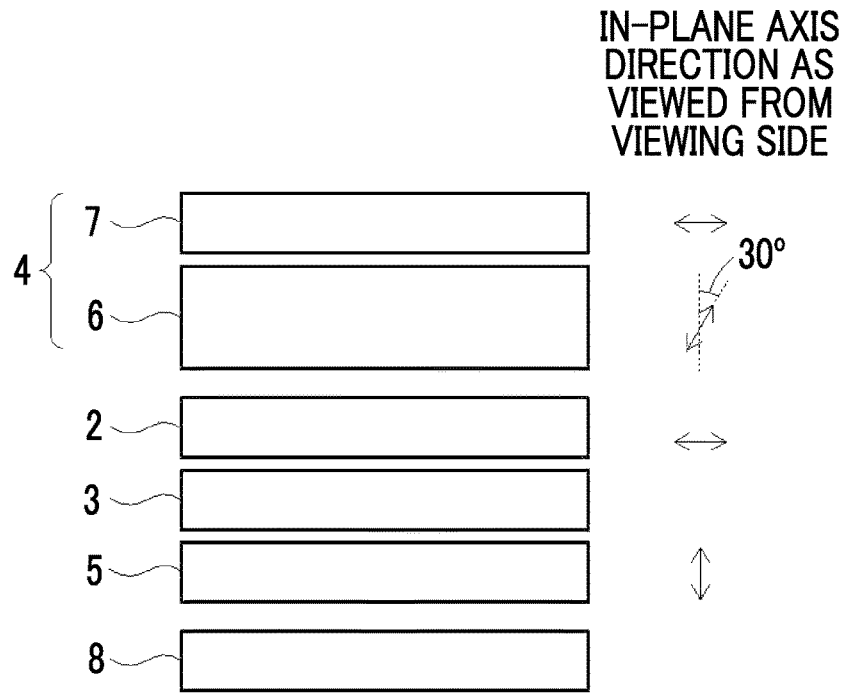
FIG. 17 is a conceptual diagram of a configuration for simulating the image display apparatus according to the embodiment of the invention.

(1) Calculation software: LCD Master (SHINTECH, Inc.)
(2) Layer configuration: Shown in FIG. 17 and FIG. 18.
(3) Optically anisotropic layer:

In FIG. 17, the optically anisotropic layer is a liquid crystal cured layer formed by using a disk-like liquid crystal compound. As shown in FIG. 7, the disk-like liquid crystal compound is a uniaxially anisotropic body having a uniform tilt alignment (O plate) in which the disc plane of the disk-like liquid crystal compound has a tilt angle of 60° with respect to the main surface of the image display apparatus, that is, the optic axis of the disk-like liquid crystal compound is tilted at 30° with respect to the main surface of the optically anisotropic layer. Furthermore, in a case where the image display apparatus is disposed such that the absorption axis of the viewing-side polarizing plate 2 is in the right-to-left direction, the disc plane is tilted with the lower left side being upside with respect to the main surface of the image display apparatus. In addition, the optic axis of the optically anisotropic layer as viewed from the viewing-side polarizing plate 2 side is at 60° counterclockwise with respect to the horizontal direction and is at 30° clockwise with respect to the absorption axis of the backlight-side polarizing plate 5. The refractive index of the disk-like liquid crystal compound was set to ne=1.550 and no=1,650 at a wavelength of 550 nm. Furthermore, the film thickness of the optically anisotropic layer was adjusted such that the front phase difference (retardation) at 550 nm of the optically anisotropic layer would be 250 nm.

Figure 18:
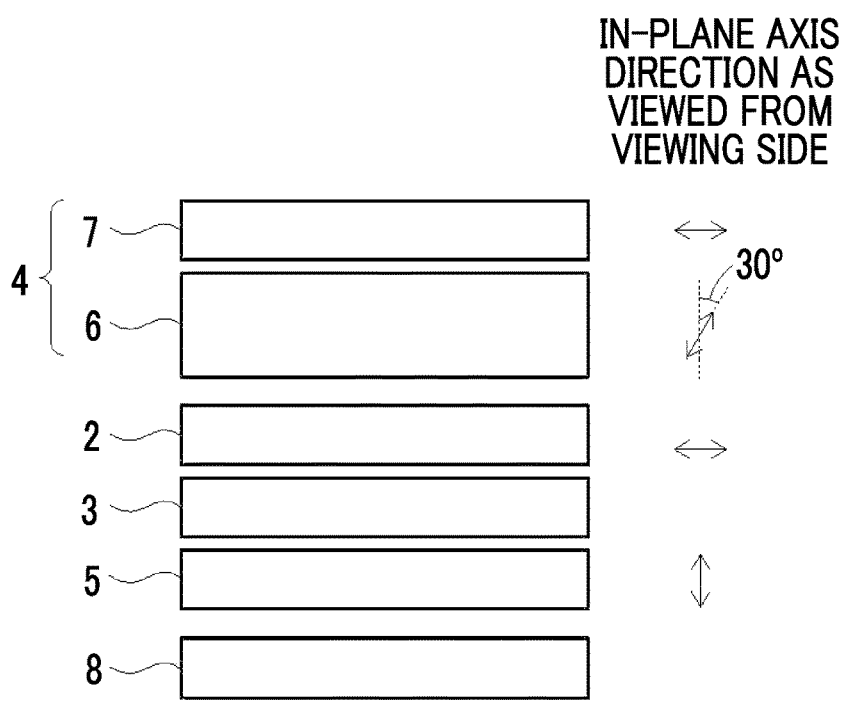
FIG. 18 is a conceptual diagram of a configuration for simulating the image display apparatus according to the embodiment of the invention.

In FIG. 18, the optically anisotropic layer is a liquid crystal cured layer formed by using a rod-like liquid crystal compound. As shown in FIG. 8, the rod-like liquid crystal compound is a uniaxially anisotropic body having a uniform tilt alignment (O plate) in which the major axis direction of the rod-like liquid crystal compound (liquid crystal molecules) has a tilt angle of 30° from the main surface of the image display apparatus, that is, the optic axis is tilted at 30° with respect to the main surface of the optically anisotropic layer. Furthermore, in a case where the image display apparatus is disposed such that the absorption axis of the viewing-side polarizing plate 2 is in the right-to-left direction, the major axis of the liquid crystal molecules is tilted at 30° with the upper right side being upside with respect to the main surface of the image display apparatus. In addition, the optic axis of the optically anisotropic layer as viewed from the viewing-side polarizing plate 2 side is at 60° counterclockwise with respect to the horizontal direction, and the optic axis is at 30° clockwise with respect to the absorption axis of the backlight-side polarizing plate 5. The refractive index of the rod-like liquid crystal compound was set to ne=1.623 and no=1.503 at a wavelength of 550 nm. Furthermore, the film thickness of the optically anisotropic layer was adjusted such that the front phase difference (retardation) at 550 nm of the optically anisotropic layer would be 250 ran.

Figure 19:
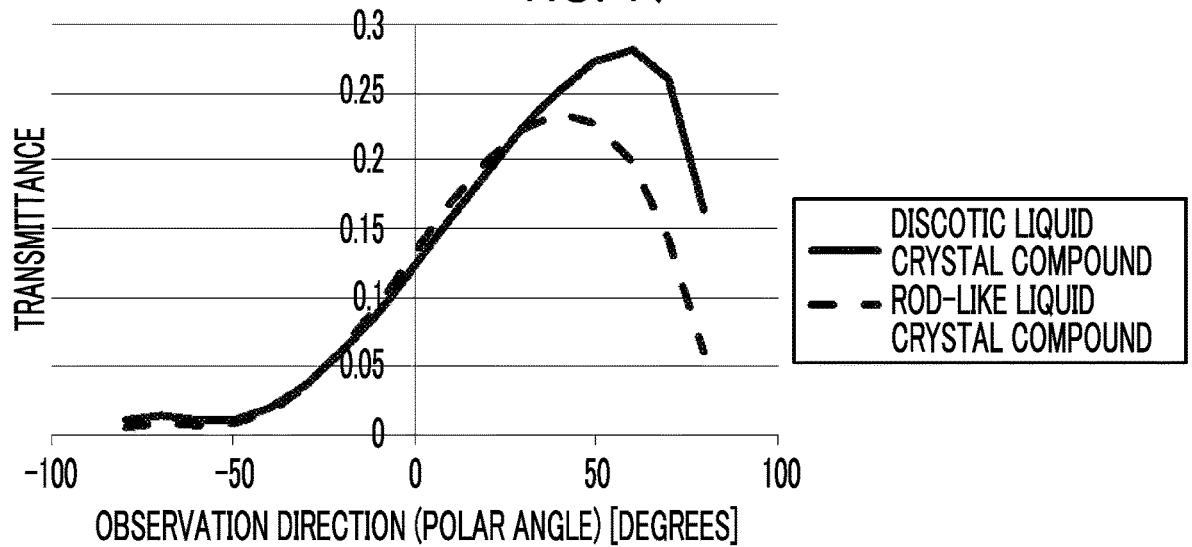
FIG. 19 is a graph showing the relationship between a polar angle and a transmittance.
Figure 20:
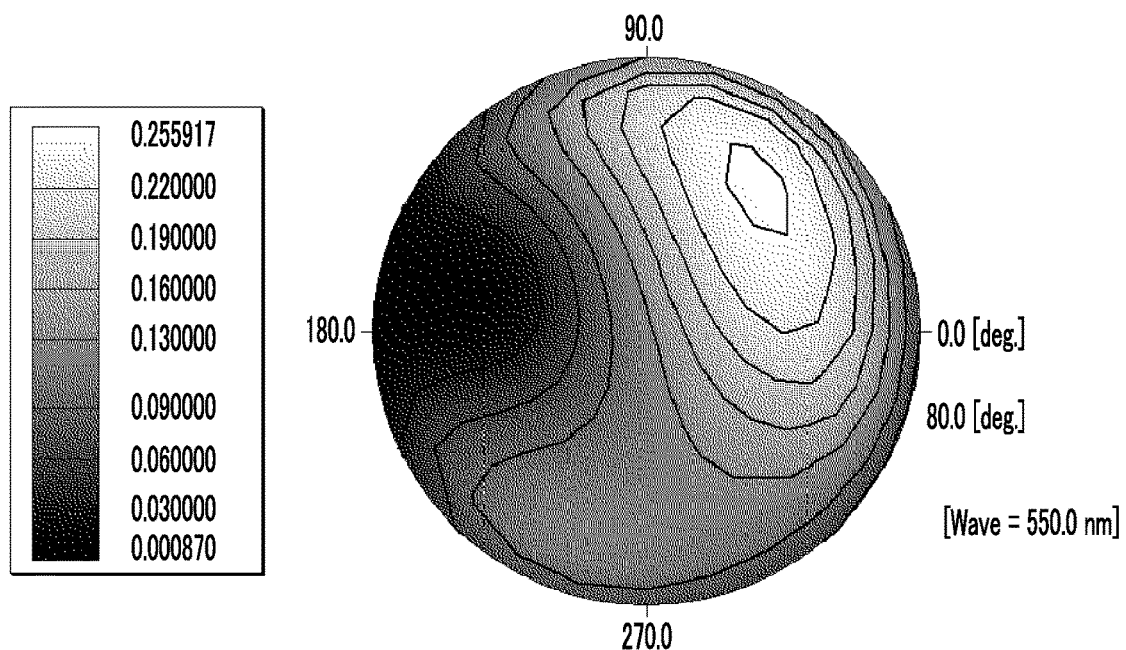
FIG. 20 is a contour diagram showing the simulation results for the configuration in FIG. 17 of the image display apparatus according to the embodiment of the invention.
Figure 21:
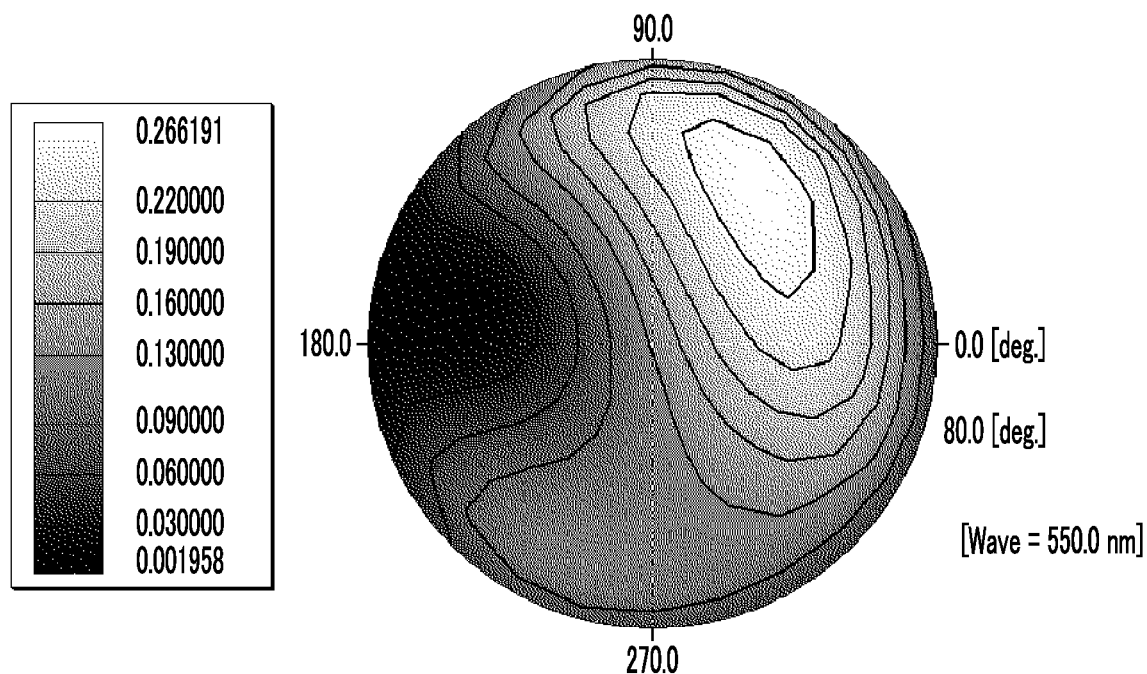
FIG. 21 is a contour diagram showing the simulation results for the configuration in FIG. 18 of the image display apparatus according to the embodiment of the invention.

Changes in the display luminance from an azimuthal angle of 0° to 180° and a polar angle of −80° to 80° in the configurations of FIG. 17 and FIG. 18 are shown in FIG. 19. Furthermore, contour diagrams of the luminance distribution in each of the configurations of FIG. 17 and FIG. 18 are shown in FIG. 20 and FIG. 21. From FIG. 19, FIG. 20, and FIG. 21, it can be seen that in both the configuration of FIG. 17 and the configuration of FIG. 18, the visible range has a center in the vicinity of an azimuthal angle of 0° and a polar angle of 60°, and the brightness is significantly reduced in regions other than the visible range.

An image display apparatus exhibiting such characteristics is disposed, for example, along the vehicle interior as shown in FIG. 12, and at the time of displaying information that complements the visual field obstructed by a pillar or the body, the amount of light in the image displayed on the side window 11 side can be reduced so that the image can be clearly displayed to the driver 12 while suppressing the reflected glare on the side window 11, by disposing the visible range toward the driver 12 side. In the above-mentioned simulation, the visible range is provided on the right-hand side of the image display apparatus; however, a person ordinarily skilled in the art can appropriately change the above-mentioned parameters and the disposition of each member in order to provide the visible range in a desired direction, without limiting the direction to the right-hand side.

For example, with regard to the configuration shown in FIG. 17, in the case of a configuration similar to the configuration shown in FIG. 17 except that the absorption axis of the polarizer 7 of the optical film 4 is disposed so as to be orthogonal to the absorption axis of the viewing-side polarizing plate 5, the visible range has the center in the vicinity of an azimuthal angle of 180° and a polar angle of 60°. That is, the azimuthal angle in the visible range changes by 180°, depending on whether the absorption axis of the polarizer 7 is parallel or orthogonal to the absorption axis of the viewing-side polarizing plate 5.

As described above, the refractive index anisotropy in the optically anisotropic layer may be forward wavelength dispersion but is preferably reverse wavelength dispersion.

[Information Display System for Vehicle]

The information display system for a vehicle according to the embodiment of the invention is
an information display system for a vehicle including the above-mentioned image display apparatus according to the embodiment of the invention on a vehicle structural member,
in which the visible range of the image display apparatus is directed toward the driver and fixed.

As already shown in FIG. 4 and FIG. 12, the information display system for a vehicle according to the embodiment of the invention can suppress reflected glare on a reflector such as a side window or a windshield and perform display without moire even in a case where the display surface cannot be disposed to face the front with respect to the driver due to structural or design reasons, and information display without stress to the driver can be realized. Furthermore, due to being thin, the information display system for a vehicle can be mounted without obstructing the structural or ornamental design of the vehicle.

The image display apparatus according to the embodiment of the invention is not limited to the above-mentioned information display system for a vehicle and can be used for various information display devices.

For example, in a virtual reality system that enables simulated experiences such as driving and moving by disposing a large number of image display apparatuses according to the embodiment of the invention in a fixed space partitioned by structural materials, reflected glare between the surfaces of the image display apparatuses are reduced, and there is no image deterioration caused by moire, so that a higher sense of immersion can be obtained. Furthermore, by using the image display apparatus according to the embodiment of the invention as an information display system in a dark place such as an aquarium and in a public space where many reflectors such as glass are present, high-quality and space-saving information display without reflected glare and moire is made possible.

EXAMPLES

Hereinafter, the functions will be described in more detail by way of Examples.

First, Examples of the image display apparatus of the first aspect will be described.

Example 1-1

(Production of Temporary Support)

A triacetyl cellulose film (TAC film) having a thickness of 60 μm manufactured by FUJIFILM Corporation was prepared. On the other hand, the following alignment film coating liquid was prepared, heated and dissolved at 85° C. for one hour with stirring, and filtered through a 0.45-μm filter.

Alignment Film Coating Liquid

| | |
|---|---|
| PVA203 (polyvinyl alcohol manufactured by Kuraray Co., Ltd.) | 2.4 parts by mass |
| Pure water | 97.6 parts by mass |

The prepared alignment film coating liquid was applied on the TAC film while regulating the coating amount so that the film thickness after drying would be 0.5 μm, and the alignment film coating liquid was dried at 100° C. for 2 minutes.

The dried coating film was subjected to a rubbing treatment to produce a film-like temporary support. The direction of the rubbing treatment was set to be parallel to the longitudinal direction of the film.

It was confirmed that as the temporary support, a general polyethylene terephthalate film (PET film, for example, manufactured by Toyobo Co., Ltd., COSMOSHINE A4100) can be used in addition to the TAC film.

(Formation of Liquid Crystal Layer X1)

The following polymerizable liquid crystal composition X1 was stirred and dissolved at room temperature to obtain a uniform solution. After dissolution, the solution was filtered through a 0.45-μm filter.

Polymerizable Liquid Crystal Composition X1

| | |
|---|---|
| Discotic liquid crystal compound B-1 | 100 parts by mass |
| Polymerizable monomer S1 | 10 parts by mass |
| Polymerization initiator (IRGACURE 907, manufactured by BASF) | 3 parts by mass |
| Methyl ethyl ketone | 339 parts by mass |

Discotic liquid crystal compound B-1 (polymerizable triphenylene type discotic liquid crystal compound)

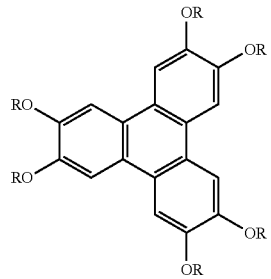

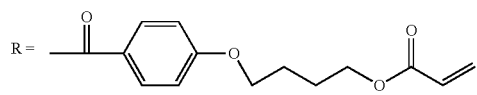

Polymerizable monomer S1

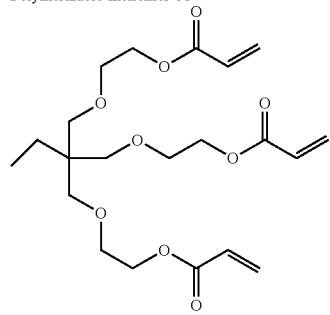

The prepared polymerizable liquid crystal composition X1 was applied and dried on the rubbing surface side of the temporary support while regulating the coating amount such that the film thickness after drying and ultraviolet exposure would be 1.26 μm, ultraviolet exposure of the liquid crystal composition was performed, and the entire surface was photocured, aligned, and fixed to form a liquid crystal layer X1. The drying conditions at this time were 105° C. for 2 minutes, and the ultraviolet exposure conditions were 80 mW/cm², 500 mJ/cm², and 80° C. Furthermore, at the time of ultraviolet exposure, nitrogen purging was performed, and exposure was performed in an atmosphere where the oxygen concentration was 100 ppm.

(Formation of Liquid Crystal Cured Layer Y1)

The following polymerizable liquid crystal composition Y1 was prepared and was stirred and dissolved at room temperature to obtain a uniform solution. After dissolution, the solution was filtered through a 0.45-μm filter.

Polymerizable Liquid Crystal Composition Y1

| | |
|---|---|
| Discotic liquid crystal compound A-1 | 80 parts by mass |
| Discotic liquid crystal compound A-2 | 20 parts by mass |
| Polymerizable monomer S1 | 10 parts by mass |
| Polymer C-1 | 1.0 parts by mass |
| Polymerization initiator (IRGACURE 907, manufactured by BASF) | 5 parts by mass |
| Methyl ethyl ketone | 356 parts by mass |

Discotic liquid crystal compound A-1 (1,3,5-substituted benzene type polymerizable discotic liquid crystal compound)

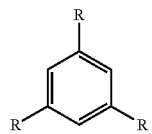

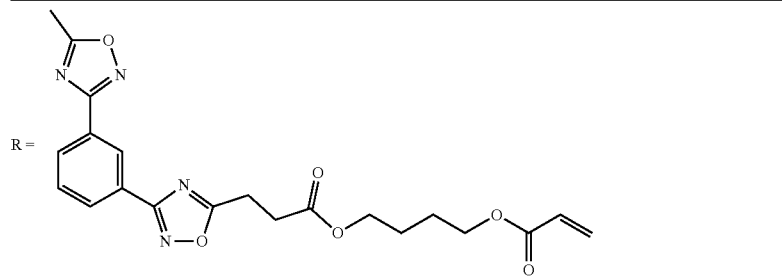

Discotic liquid crystal compound A-2 (1,3,5-substituted benzene type polymerizable discotic liquid crystal compound)

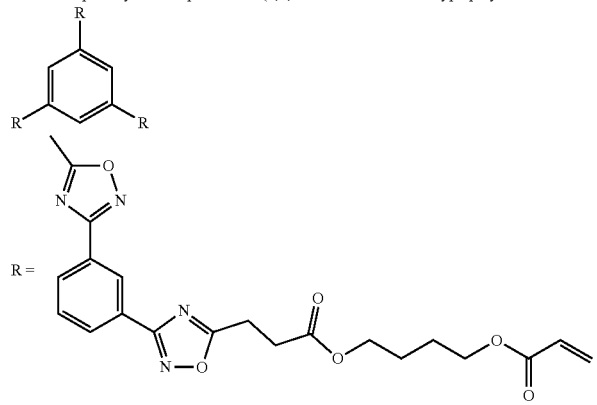

Polymer C-1

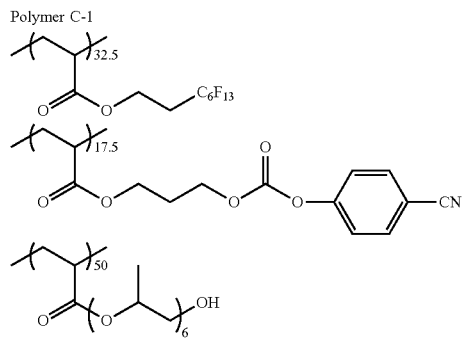

The number described for each of the above-described constitutional units represents the percent (%) by mass of each constitutional unit with respect to all the constitutional units of the polymer C-1, and the numbers are 32.5% by mass, 17.5% by mass, and 50.0% by mass from the left-hand side.

The polymerizable liquid crystal composition Y1 was applied and dried on the liquid crystal layer X1 produced as described above, while regulating the coating amount such that the film thickness after drying and ultraviolet exposure would be 1.18 μm, ultraviolet exposure of the liquid crystal composition was performed, and the entire surface was photocured, aligned, and fixed to form a liquid crystal cured layer Y1. The drying conditions at this time were 120° C. for 2 minutes, and the ultraviolet exposure conditions were 80 mW/cm$^2$, 500 mJ/cm$^2$, and 80° C. Furthermore, at the time of ultraviolet exposure, nitrogen purging was performed, and exposure was performed in an atmosphere where the oxygen concentration was 100 ppm.

As a result of the above-described operation, two sheets of transfer film Z1 having the liquid crystal layer X1 and the liquid crystal cured layer Y1 were produced. In the present Example, since it was necessary to laminate two sheets of the liquid crystal cured layer Y1 in order to match the in-plane phase difference with the target value, two sheets of identical layers were produced.

(Measurement of Tilt Angle)

Figure 22:
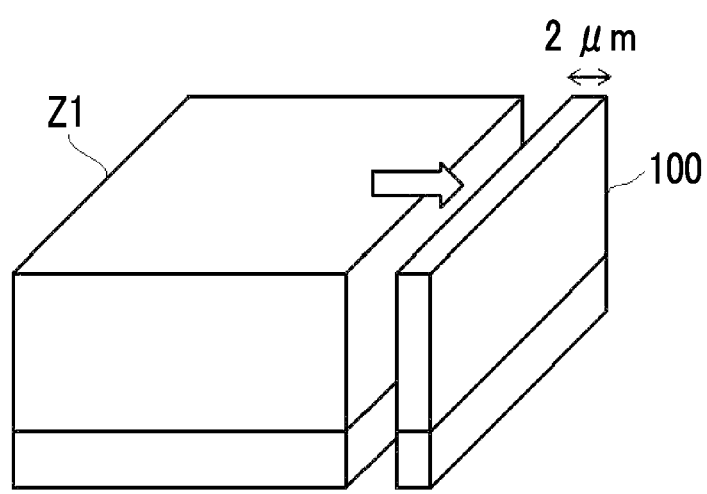
FIG. 22 is a diagram for explaining a method for measuring a tilt angle.
Figure 23:
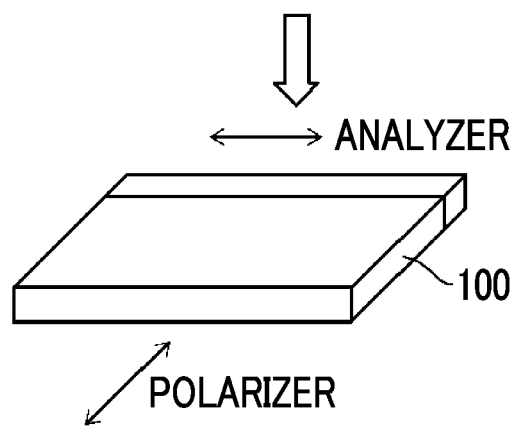
FIG. 23 is a diagram for explaining a method for measuring a tilt angle.

As shown in FIG. 22, a section 100 having a thickness of 2 μm was produced by using a microtome (manufactured by Leica Biosystems GmbH, rotating microtome: RM2265) by cutting the produced transfer film Z1 in parallel to the thickness direction of the film, and as shown in FIG. 23, the tilt angle of the disk-like liquid crystal compound of the liquid crystal layer X1 and the liquid crystal cured layer Y1 was measured from the cut surface side of the section 100 by using a polarization microscope. In the measurement using a polarization microscope, a polarizer and an analyzer were disposed in a crossed nicols manner, subsequently the extinguishing azimuthal angle was observed on the interface side of the liquid crystal layer X1 with the alignment film, the interface side of the liquid crystal layer X1 with the liquid crystal cured layer Y1, the interface side of the liquid crystal cured layer Y1 with the liquid crystal layer X1, and the air interface side of the liquid crystal cured layer Y1, while moving the azimuthal angle of the section, subsequently a sensitive color plate (λ plate) was inserted, the color in the vicinity of the above-described interfaces was observed, and the direction of the slow axis within the section was investigated to determine the tilt angle of the disc plane.

The tilt angle of the disc plane on the interface side of the liquid crystal layer X1 with the alignment film was 7 degrees, the tilt angle of the disc plane on the interface side of the liquid crystal layer X1 with the liquid crystal cured layer Y1 was 60 degrees, the tilt angle of the disc plane on the interface side of the liquid crystal cured layer Y1 with the liquid crystal layer X1 was 60 degrees, and the tilt angle of the disc plane on the air interface side of the liquid crystal cured layer Y1 was 60°. The tilt angle of the disk-like liquid crystal compound is an angle formed between the main surface of the layer and the disc plane of the disk-like liquid crystal compound.

As described above, the direction of the fast axis of the disk-like liquid crystal compound is a direction perpendicular to the disc plane. Therefore, in a case where the tilt angle of the disc plane of this disk-like liquid crystal compound is read as the tilt angle of the optic axis, the tilt angle of the optic axis on the interface side of the liquid crystal layer X1 with the alignment film is 83 degrees, the tilt angle of the optic axis on the interface side of the liquid crystal layer X1 with the liquid crystal cured layer Y1 is 30 degrees, the tilt angle of the optic axis on the interface side of the liquid crystal cured layer Y1 with the liquid crystal layer X1 is 30 degrees, and the tilt angle of the optic axis on the air interface side of the liquid crystal cured layer Y1 is 30°.

In the following description, unless particularly stated otherwise, the case of a uniaxially anisotropic body will be described by using the tilt angle of the optic axis.

The liquid crystal cured layer Y1 side of the transfer film Z1 was stuck to a 40 mm×40 mm glass plate by using an optical pressure-sensitive adhesive, and the liquid crystal layer X1, the alignment film, and the support were peeled off while leaving only the liquid crystal cured layer Y1 to transfer the liquid crystal cured layer Y1 onto the glass plate. Furthermore, the liquid crystal cured layer Y1 side of the transfer film Z1 was stuck onto the previous liquid crystal cured layer Y1, and the liquid crystal layer X1, the alignment film, and the support were peeled off while leaving only the liquid crystal cured layer Y1 to transfer the liquid crystal cured layer Y1. Using AxoScrm (manufactured by Axometrics, Inc.), the in-plane phase difference of the two layers of the liquid crystal cured layers Y1 transferred onto the glass plate and the average tilt angle of the optic axis were measured. As a result, it was verified that the in-plane phase difference was 125 nm, and the average tilt angle was 30°.

(Production of Optical Film)

A polarizing plate having a polarizer ("HLC2-2418" manufactured by Sanritz Co., Ltd.) was prepared.

To this polarizing plate, the liquid crystal cured layer Y1 side of the transfer film $Z_1$ produced as described above was bonded using an optical pressure-sensitive adhesive layer. At that time, the angle formed by the optic axis of the liquid crystal cured layer Y1 and the absorption axis of the polarizing plate at the time of projecting the optic axis on the polarizing plate was set to 30°. That is, the angle formed by the transmission axis of the polarizing plate and the optic axis of the liquid crystal compound was set to 60°. The support, the alignment film, and the liquid crystal layer X1 were peeled off from the bonded transfer film Z1, and then the liquid crystal cured layer Y1 was transferred onto the polarizing plate.

Next, the liquid crystal cured layer Y1 side of the second sheet of the transfer film Z1 was bonded onto the first liquid crystal cured layer Y1 by using an optical pressure-sensitive adhesive layer. At that time, the azimuthal direction of the optic axis of the second liquid crystal cured layer Y1 and the direction of tilt were set to be the same as those of the first liquid crystal cured layer Y1. The support, the alignment film, and the liquid crystal layer X1 were peeled off from the bonded second sheet of the transfer film Z1 to transfer the second liquid crystal cured layer Y1, and an optical film was produced. That is, in Example 1, the optically anisotropic layer is composed of two liquid crystal cured layers Y1.

(Production of Image Display Apparatus)

Figure 24:
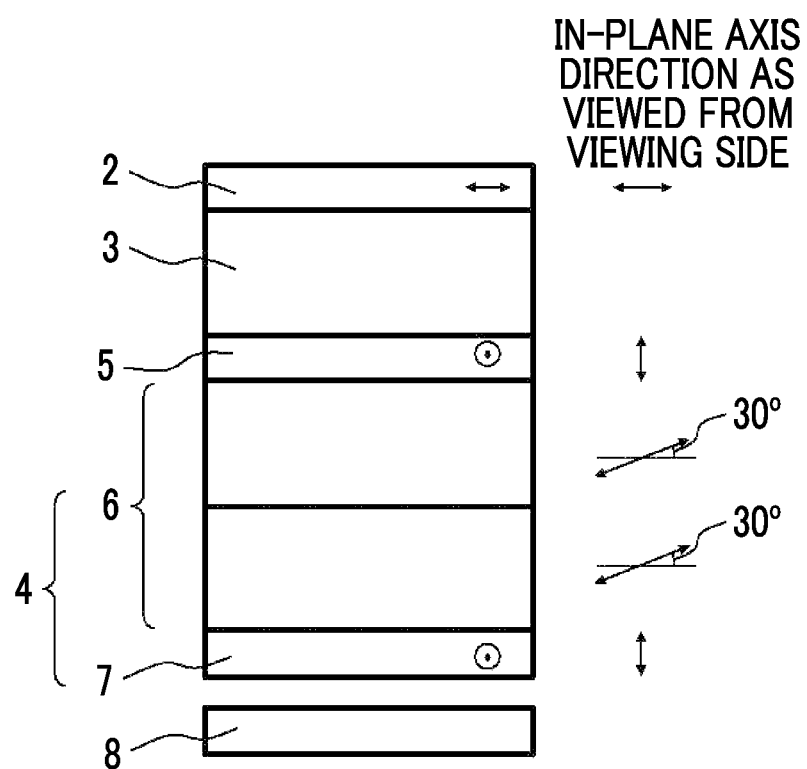
FIG. 24 is a diagram conceptually showing a layer configuration of Example 1-1.

The produced optical film was mounted on a display as follows to produce an image display apparatus having the configuration shown in FIG. 24.

A notebook PC (personal computer) manufactured by Lenovo Group, Ltd., ThinkPad. T490s, was used for the display, and the liquid crystal display element portion was disassembled to take out the liquid crystal display panel. At that time, the directions of the absorption axes of the polarizing plates disposed on both sides of the liquid crystal cell of ThinkPad T490s were checked. It was confirmed that the absorption axis of the viewing-side polarizing plate was in the horizontal direction, and the absorption axis of the backlight-side polarizing plate was in the vertical direction. Subsequently, the optical film was bonded onto the backlight-side polarizing plate to be mounted. At that time, the absorption axis of the polarizer was disposed so as to be parallel to the absorption axis of the backlight-side polarizing plate. The liquid crystal display panel on which the optical film was mounted was returned to the notebook PC main body, and an image display apparatus having the configuration shown in FIG. 24 was produced. Furthermore, the azimuthal angle α of the optic axis of the optically anisotropic layer in a state of being incorporated into the image display apparatus was 60°, and the tilt angle β was 30° (see FIG. 2).

Example 1-2

A transfer film Z2 was produced in the same manner as in Example 1-1, except that during the formation of the liquid crystal layer, the thickness of the liquid crystal layer was set to 1.1 μm, the liquid crystal layer X2 was formed without performing nitrogen purging at the time of performing ultraviolet exposure, and during the formation of the liquid crystal cured layer, the thickness of the liquid crystal cured layer was set to 1.5 μm, and the liquid crystal cured layer Y2 was formed without performing nitrogen purging at the time of performing ultraviolet exposure, and an optical film was produced by using this as an optically anisotropic layer. That is, the optical film of Example 1-2 was made to have a support, an alignment film, a liquid crystal layer X2, a liquid crystal cured layer Y2, and a polarizer. In Example 1-2, it can be said that the liquid crystal layer X2 is a liquid crystal cured layer included in the optically anisotropic layer.

(Measurement of Tilt Angle)

After the produced transfer film Z2 was produced, the tilt angle of the disc plane of the disk-like liquid crystal compound in the liquid crystal layer X2 and the liquid crystal cured layer Y2 was measured in the same manner as in Example 1-1. The tilt angle of the disc plane on the interface side of the liquid crystal layer X2 with the alignment film was 7 degrees, the tilt angle of the disc plane on the interface side of the liquid crystal layer X2 with the liquid crystal cured layer Y2 was 51 degrees, the tilt angle of the disc plane on the interface side of the liquid crystal cured layer Y2 with the liquid crystal layer X2 was 51 degrees, and the tilt angle of the disc plane on the air interface side of the liquid crystal cured layer Y2 was 39°. In a case where the tilt angle of the disc plane of this disk-like liquid crystal compound is read as the tilt angle of the fast axis, the tilt angle of the fast axis on the interface side of the liquid crystal layer X2 with the alignment film is 83 degrees, the tilt angle of the fast axis on the interface side of the liquid crystal layer X2 with the liquid crystal cured layer Y2 is 39 degrees, the tilt angle of the fast axis on the interface side of the liquid crystal cured layer Y2 with the liquid crystal layer X2 is 39 degrees, and the tilt angle of the fast axis on the air interface side of the liquid crystal cured layer Y2 is 11°.

Furthermore, the average tilt angles of the liquid crystal layer X2 alone, the liquid crystal cured layer Y2 alone, and the optically anisotropic layer as a whole, and the in-plane phase difference of the optically anisotropic layer as a whole were each measured by using AxoScan (manufactured by Axometrics, Inc.). As a result, the average tilt angle of the liquid crystal layer X2 alone was 25°, the average tilt angle of the liquid crystal cured layer Y2 alone was 60°, and the average tilt angle of the optically anisotropic layer as a whole was 43°. Furthermore, the in-plane phase difference in the optically anisotropic layer as a whole was 230 nm.

(Production of Image Display Apparatus)

An image display apparatus was produced in the same manner as in Example 1-1 using the optical film produced as described above, except that peeling of the support, the alignment film, and the liquid crystal layer X2 was not carried out.

Comparative Example 1-1

A display panel having neither an optically anisotropic layer nor a polarizing plate 7, that is, a liquid crystal display device of a Lenovo notebook PC, ThinkPad T490s, was designated as Comparative Example 1-1.

<Evaluation>

The visibility from the right-hand and left-hand sides and the front of the produced image display apparatus, the presence or absence of moire, and the reflected glare on the glass at the time of assuming an in-vehicle display were evaluated as follows.

(Direct Visibility (Brightness))

With regard to the direct visibility of the image display apparatus, an image was displayed on the image display apparatus in a dark room, and the visibility was subjected to sensory evaluation by visual inspection while changing the observation direction to the right-hand and left-hand sides and to the front. With regard to the observation direction, in a case where the normal direction of the display screen was designated as 0°, viewing from −60° was regarded as observation from the left-hand side, viewing from 0° was regarded as observation from the front, and viewing from +60° was regarded as observation from the right-hand side.

The results were evaluated according to the following criteria.
A: Bright.
B: Slightly dark.
C: Very dark.

(Presence or Absence of Moire)

During the above-described evaluation of direct visibility, the presence or absence of moire was checked.

(Reflected Glare on Glass)

The sensory evaluation of the reflected glare on the glass was carried out by installing a glass plate (20 cm×30 cm) on the left-hand side of the image display apparatus 1 as shown in FIG. 25, and observing the image reflected on the glass plate (reflector 10) from the right-hand side of the image display apparatus 1, and the reflected glare was evaluated according to the following criteria. The positions of the glass plate and the observer were set to the positions at a polar angle of ±60° with respect to the display surface of the image display apparatus 1.
A: Not visible.
B: Slightly visible.
C: Clearly visible.

The results are shown in Table 1.

TABLE 1

| | Optically anisotiopic layer | | | | Evaluation | | | | |
|---|---|---|---|---|---|---|---|---|---|
| | Alignment state of liquid crystal cured layer | Average tilt angle (°) | Azimuthal angle (°) | Front phase difference (nm) | Direct visibility (brightness) | | | Reflected glare | Moire |
| | | | | | −60° direction | 0° direction | 60° direction | | |
| Example 1-1 | Uniform | 30 | 60 | 125 | A | B | C | A | None |
| Example 1-2 | Hybrid | 43 | 60 | 230 | B | B | C | B | None |
| Comparative Example 1-1 | — | — | — | — | C | C | C | C | None |

From Table 1, it is understood that in Examples 1-1 and 1-2 of the invention, the image in the case of being observed from the left-hand side (−60° direction) of the screen was not sufficiently visible due to reduced brightness, and the image in the case of being observed from the right-hand side (60° direction) was seen brightly and clearly. Furthermore, moire was not visible.

Above all, in Example 1-1, the image at the time of being observed from the left-hand side (−60° direction) of the screen became less visible. Furthermore, in Example 1-2, the hue change at the time of being observed from the left-hand side (−60° direction) of the screen was large, whereas in Example 1-1, the change in hue was small and satisfactory. Furthermore, it is understood that the reflected glare on the glass in Example 1-1 occurred to a lesser extent than in Example 1-2.

In contrast, in Comparative Example 1-1, the same bright image was clearly visible regardless of whether the image was observed from the left or the right. Furthermore, in the Examples, the reflected glare on the glass was hardly visible, whereas in Comparative Example 1-1, the reflected glare on the glass was clearly visible. From these results, it is understood that the Examples sufficiently fulfill the object of the invention.

[Simulation]

Next, the image display apparatus of the first aspect of the invention was examined by using a simulation.

An optical simulation was performed by using LCD MASTER ver. 9 (Sintech, Inc.). Examples 1-1 and 1-2 and Comparative Example 1-1 in the simulation were set based on the specifications of Examples 1-1 and 1-2 and Comparative Example 1-1 described above.

Figure 27:
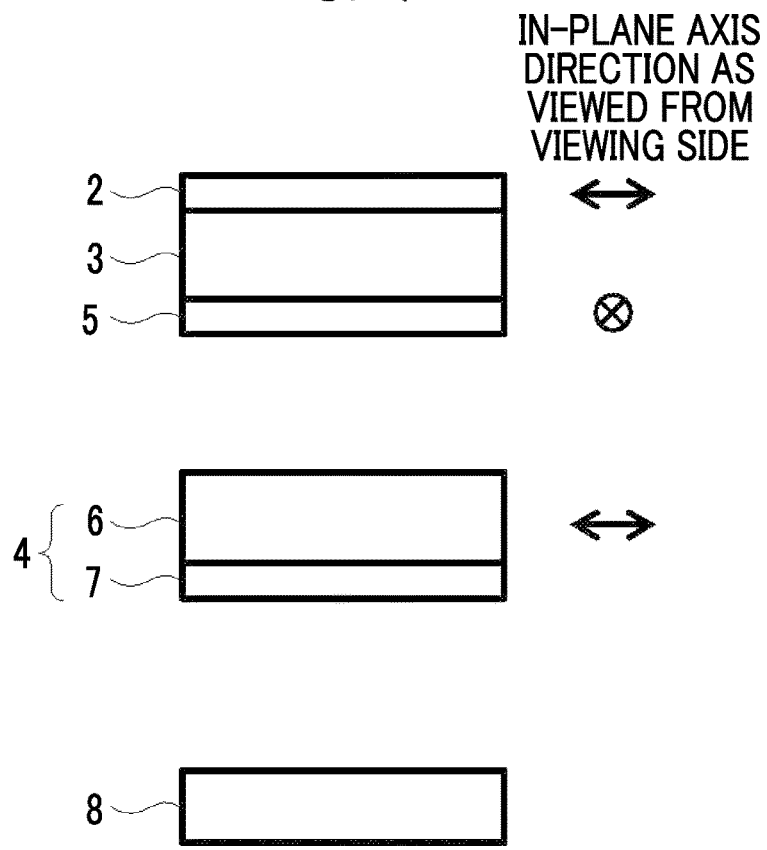
FIG. 27 is a conceptual diagram showing a configuration of the image display apparatus in a simulation.
Figure 28:
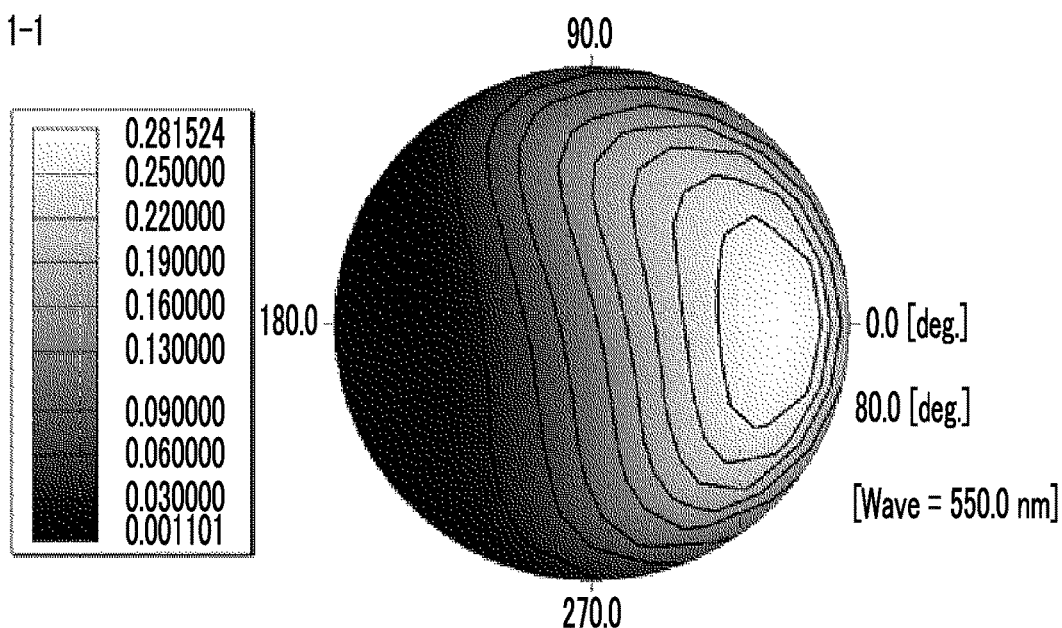
FIG. 28 is a contour diagram showing the simulation results.
Figure 29:
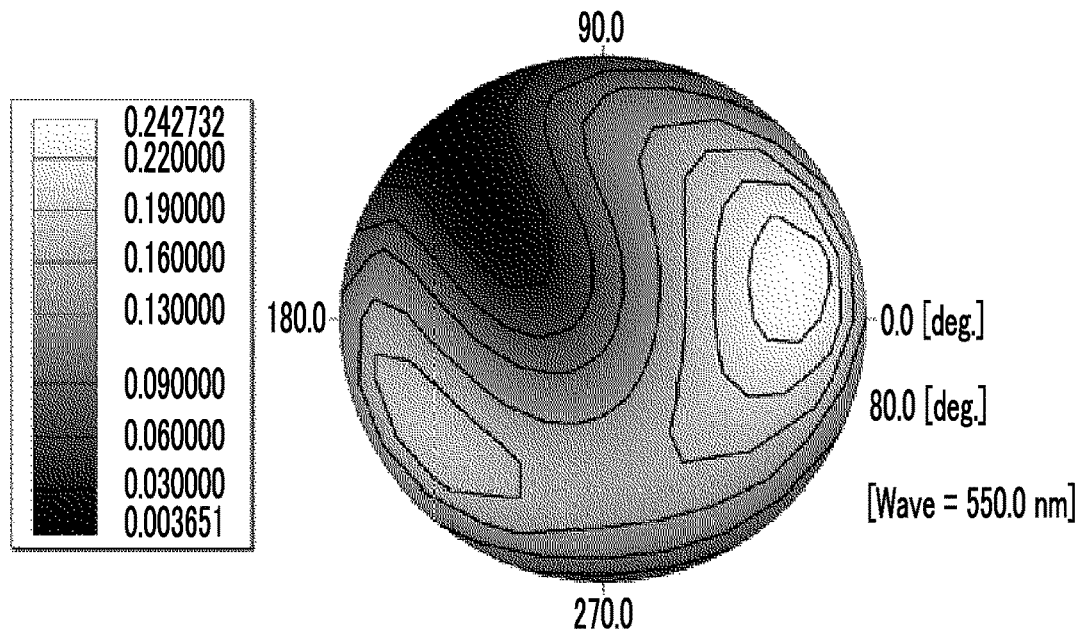
FIG. 29 is a contour diagram showing the simulation results.
Figure 30:
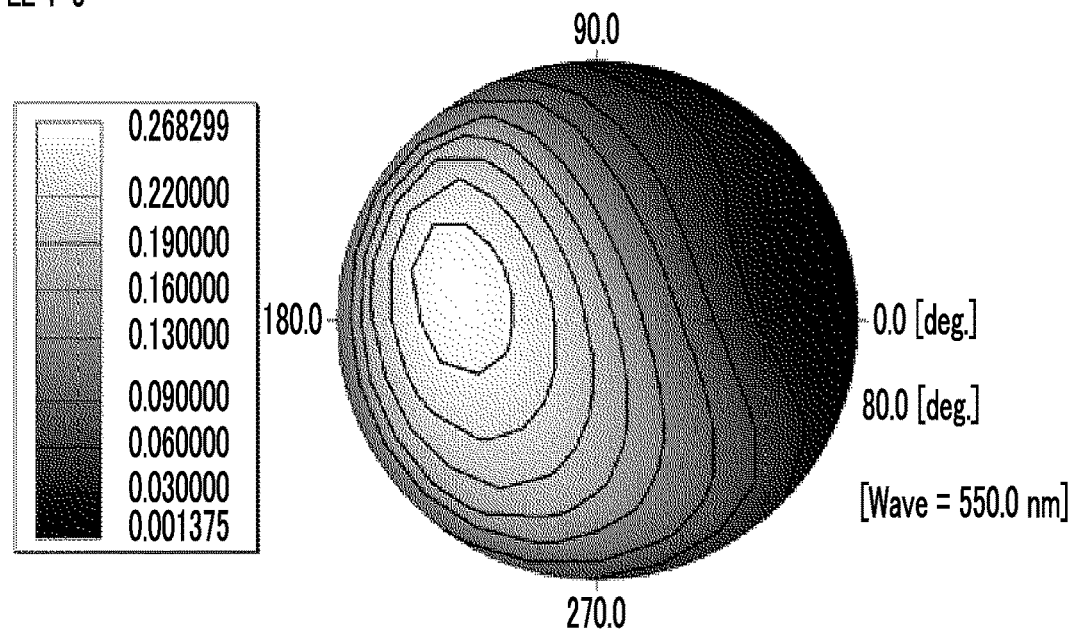
FIG. 30 is a contour diagram showing the simulation results.
Figure 31:
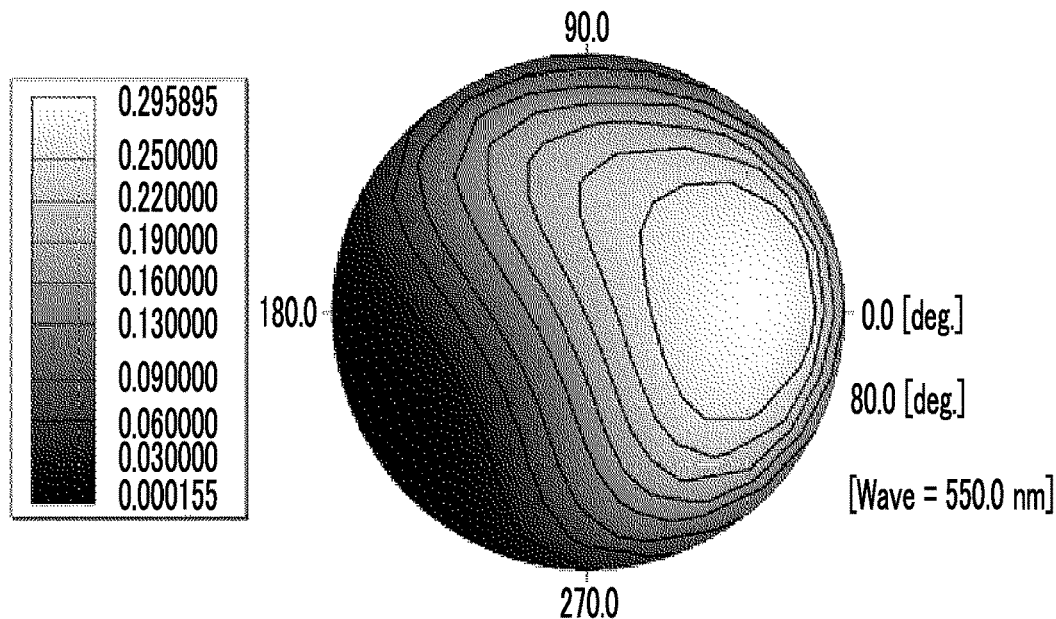
FIG. 31 is a contour diagram showing the simulation results.
Figure 32:
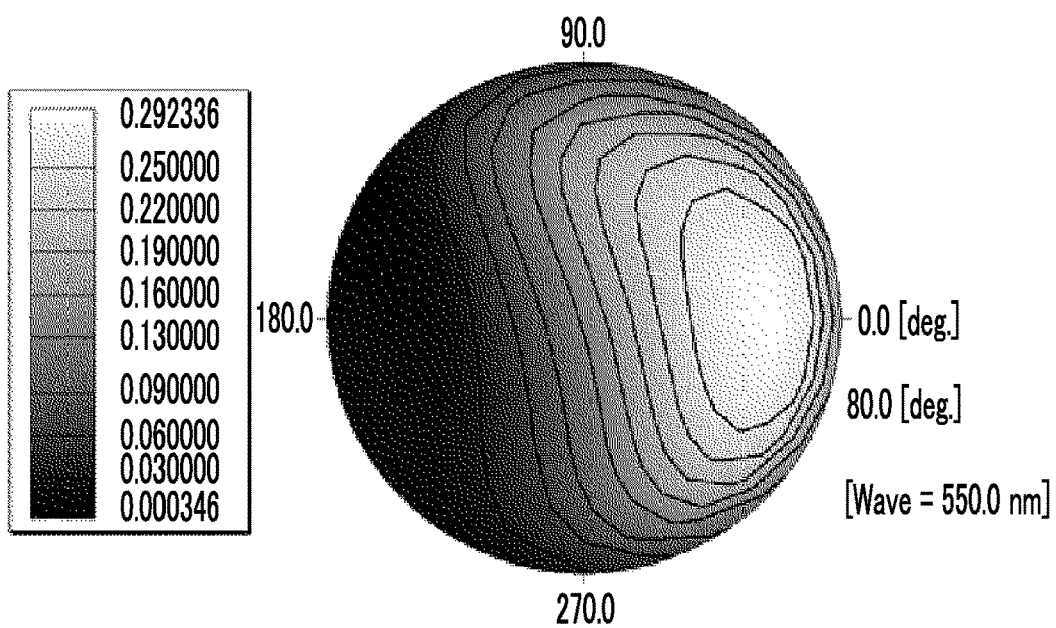
FIG. 32 is a contour diagram showing the simulation results.
Figure 33:
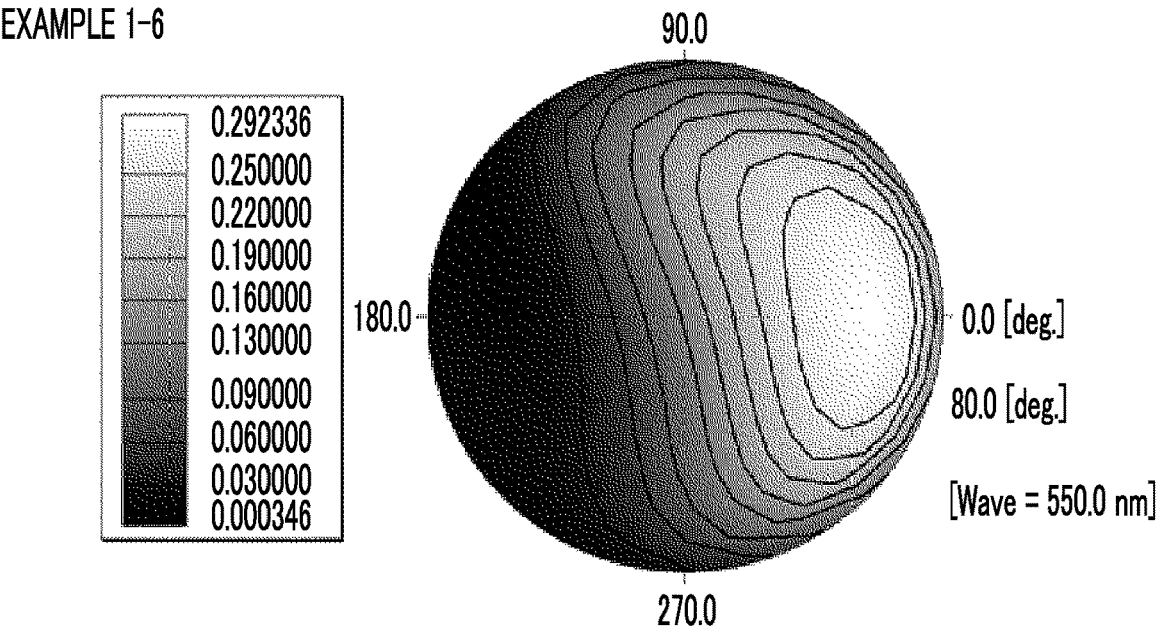
FIG. 33 is a contour diagram showing the simulation results.
Figure 34:
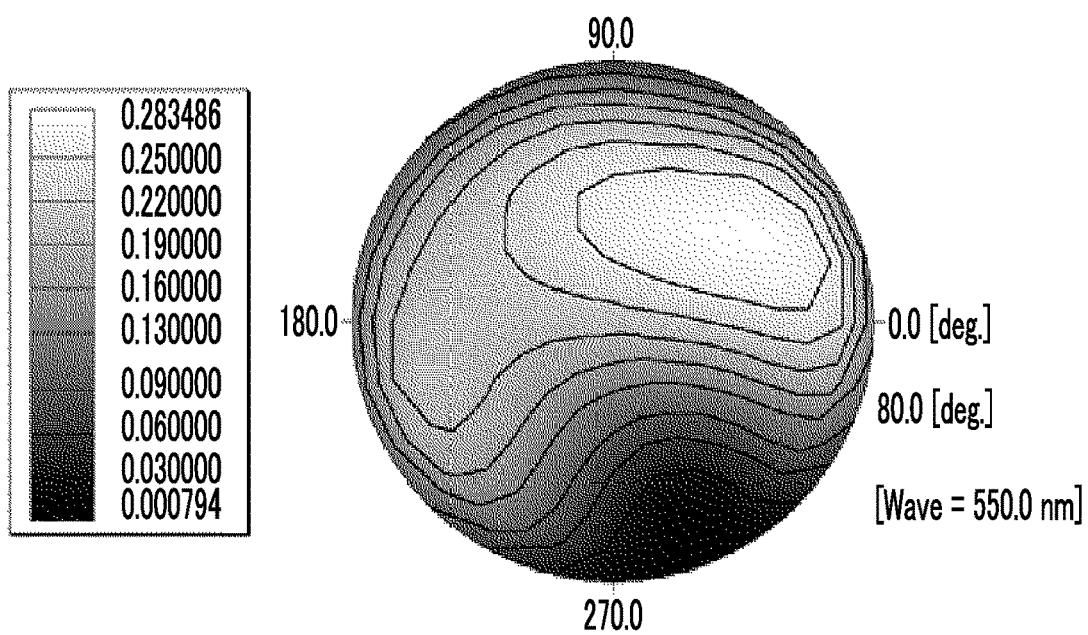
FIG. 34 is a contour diagram showing the simulation results.
Figure 35:
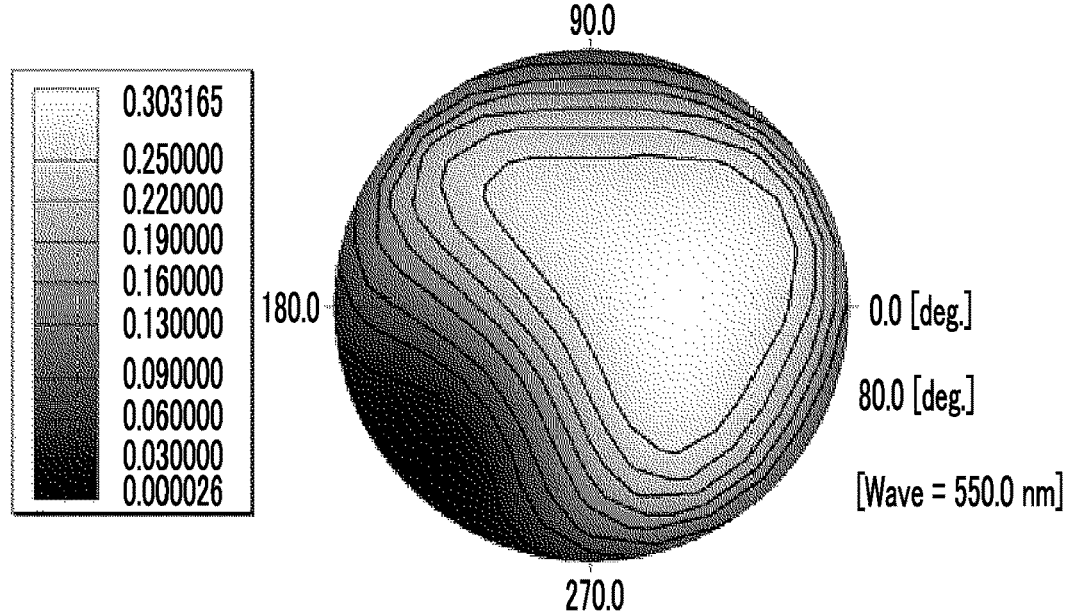
FIG. 35 is a contour diagram showing the simulation results.
Figure 36:
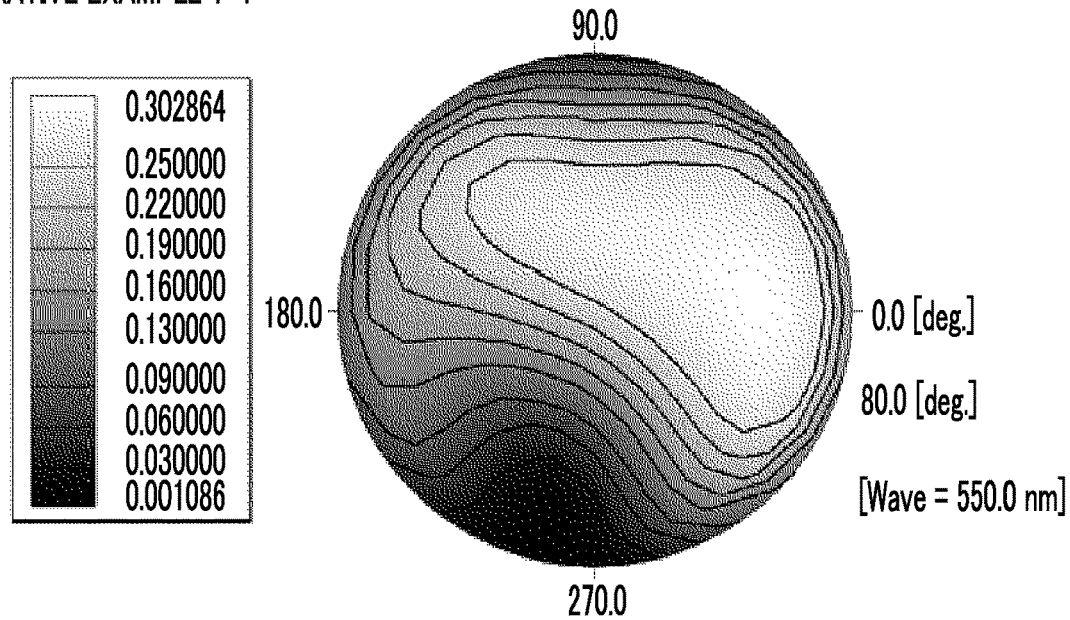
FIG. 36 is a contour diagram showing the simulation results.
Figure 37:
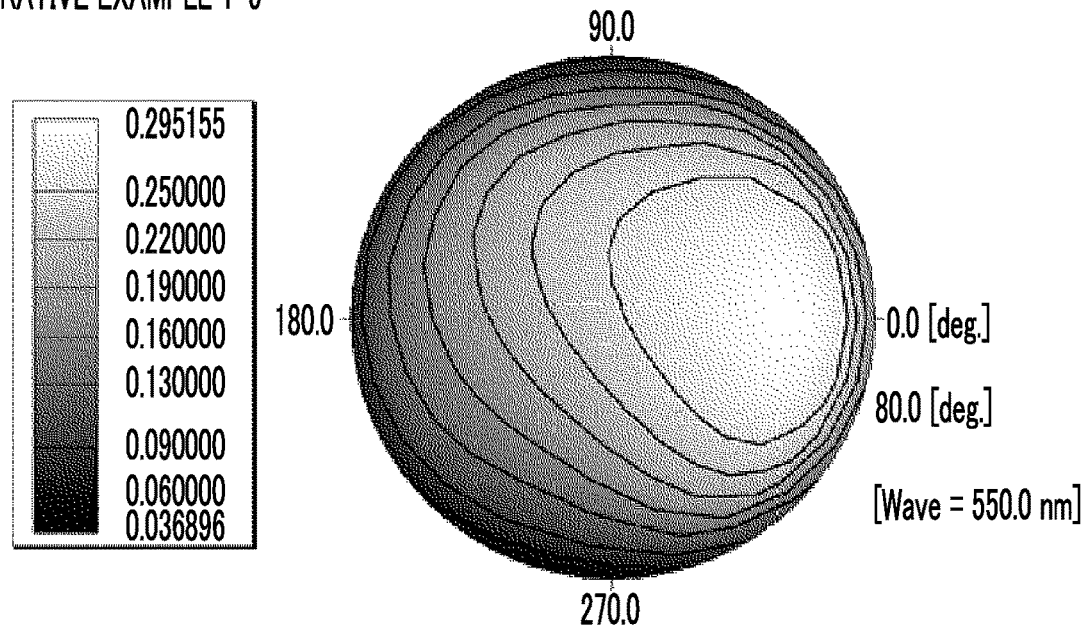
FIG. 37 is a contour diagram showing the simulation results.
Figure 38:
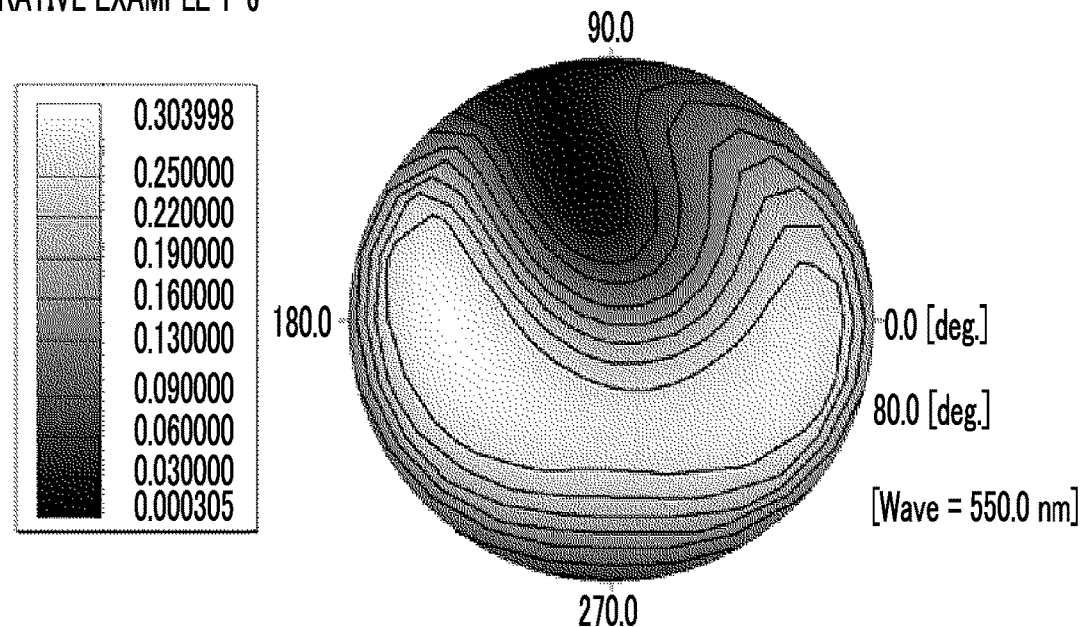
FIG. 38 is a contour diagram showing the simulation results.

Furthermore, in the simulation, the structure shown in FIG. 26 or FIG. 27 was adopted for the configuration of the image display apparatus.

In Examples 1-1, 1-2, 1-4 to 1-6, and Comparative Examples 1-2 to 1-6, the image display apparatus was configured such that, as shown in FIG. 26, the direction of the absorption axis of the viewing-side polarizing plate 2 was the horizontal direction, and the direction of the absorption axis of the backlight-side polarizing plate 5 was the vertical direction. Furthermore, the direction of the absorption axis of the polarizer 7 of the optical film 4 was configured to be orthogonal to the absorption axis of the backlight-side polarizing plate 5. Furthermore, in Example 1-3, as shown in FIG. 27, the direction of the absorption axis of the viewing-side polarizing plate 2 was the horizontal direction, and the direction of the absorption axis of the backlight-side polarizing plate 5 was the vertical direction. Furthermore, the direction of the absorption axis of the polarizer 7 of the optical film 4 was configured to be parallel to the absorption axis of the backlight-side polarizing plate 5.

In each of the Examples, the type of liquid crystal compound in the optically anisotropic layer, the positivity or negativity of the refractive index anisotropy, the number of layers of the liquid crystal cured layer, the alignment state, the average tilt angle of the optic axis, the azimuthal angle of the optic axis, the in-plane phase difference Re (550), thickness, and wavelength dispersibility were set as shown in the following Table 2. In Table 2, the direction of the absorption axis of the polarizer is the direction of the backlight-side polarizing plate with respect to the absorption axis. The type of the liquid crystal compound is indicated such that a disk-like liquid crystal compound is denoted as DLC and a rod-like liquid crystal compound is denoted as CLC. Furthermore, in Example 1-2, the average tilt angle of the optic axis for each of the first liquid crystal cured layer X2 and the second liquid crystal cured layer Y2, and the average tilt angle of the optic axis as the total optically anisotropic layer are shown.

(Refractive Index of Optical Simulation)

The ordinary light refractive index no and the extraordinary light refractive index ne of the liquid crystal compound used in the optical simulation were as follows. The numbers in parentheses mean wavelengths.

Refractive indices of liquid crystal compounds of Examples 1-5 and Comparative Example 1-4: no (450)=1.525, ne (450)=1.658, no (550)=1.503, ne (550)=1.623, no (650)=1.497, ne (650)=1.610.

Refractive indices of liquid crystal compound of Example 1-6: no (450)=1.525, ne (450)=1.628, no (550)=1.503, ne (550)=1.623, no (650)=1.497, ne (650)=1.620.

Refractive indices of liquid crystal compound in liquid crystal cured layer X2 of first layer of Example 1-2: no (450)=1.614, ne (450)=1.543, no (550)=1.603, ne (550)=1.543, no (650)=1.598, ne (650)=1.543.

Refractive indices of liquid crystal compounds of other Examples and Comparative Examples (second liquid crystal cured layer Y2 of Example 1-2): no (450)=1.652, ne (450)=1.547, no (550)=1.650, ne (550)=1.550, no (650)=1.647, ne (650)=1.552.

Here, in a case where two or more kinds of liquid crystal compounds are included in the optically anisotropic layer, the load average is determined by using the no and ne of each liquid crystal compound, and the value is used. For example, assuming that the refractive indices of the liquid crystal compound 1 are no1 and ne1, the weight ratio in all the liquid crystal compounds is w1, the refractive indices of the liquid crystal compound 2 are no2 and ne2, and the weight ratio in all the liquid crystal compounds is w2, provided that w1+w2=1, no=no1*W1+no2*W2, ne=ne1*W1+ne2*W2.

(Front Phase Difference of Optical Simulation)

The film thickness was adjusted such that the front phase difference (retardation) at 550 nm of the optically anisotropic layer would be 250 nm.

Furthermore, in Example 1-2, the tilt angle of the optic axis on the alignment film side of the first liquid crystal cured layer X2 was 83°, the tilt angle of the optic axis on the liquid crystal cured layer Y2 side was 39°, the tilt angle of the optic axis on the liquid crystal cured layer X2 side of the liquid crystal cured layer Y2 was 39°, and the tilt angle of the optic axis on the air interface side was 11°.

Furthermore, in Example 1-4, the tilt angle of the optic axis on the alignment film side of the optically anisotropic layer (liquid crystal cured layer) was 75°, and the tilt angle of the optic axis on the air interface side was 12°.

TABLE 2

| | | Optically anisotropic layer | | | | | | | | |
|---|---|---|---|---|---|---|---|---|---|---|
| | Polarizer Direction of absorption axis | Refractive index anisotropy | Type of liquid crystal compound | Number of layers of liquid crystal cured layer | Alignment state | Average tilt angle | Azimuthal angle | In-plane phase difference Re (550) | Thickness | Wavelength dispersability Re450/Re550 | Re650/Re550 |
|---|---|---|---|---|---|---|---|---|---|---|---|
| Example 1-1 | Parallel | Negative | DLC | 1 layer | Uniform | 30° | 60° | 125 nm | 2.5 μm | 1.050 | 0.952 |
| Example 1-2 | Parallel | Negative | DLC | 2 layers | Hybrid | 61° (Y2) 43° (X2) 25° (X2 + Y2) | 60° | 230 nm | 2.8 μm 2.2 μm | 1.050 1.183 | 0.952 0.920 |
| Example 1-3 | Orthogonal | Negative | DLC | 1 layer | Uniform | 30° | 60° | 125 nm | 2.5 μm | 1.050 | 0.952 |
| Example 1-4 | Parallel | Negative | DLC | 1 layer | Hybrid | 44° | 60° | 86 nm | 2.5 μm | 1.050 | 0.952 |
| Example 1-5 | Parallel | Positive | CLC | 1 layer | Uniform | 30° | 60° | 125 nm | 2.1 μm | 1.107 | 0.943 |
| Example 1-6 | Parallel | Positive | CLC | 1 layer | Uniform | 30° | 60° | 125 nm | 2.1 μm | 0.860 | 1.023 |
| Comparative Example 1-1 | | | | | No optical film | | | | | | |
| Comparative Example 1-2 | Parallel | Negative | DLC | 1 layer | Uniform | 30° | 20° | 125 nm | 2.5 μm | 1.050 | 0.952 |

TABLE 2-continued

| | | | | Optically anisotropic layer | | | | | | |
|---|---|---|---|---|---|---|---|---|---|---|
| | Polarizer Direction of absorption axis | Refractive index anisotropy | Type of liquid crystal compound | Number of layers of liquid crystal cured layer | Alignment state | Average tilt angle | Azimuthal angle | In-plane phase difference Re (550) | Thickness | Wavelength dispersability | |
| | | | | | | | | | | Re450/ Re550 | Re650/ Re550 |
| Comparative Example 1-3 | Parallel | Negative | DLC | 1 layer | Uniform | 60° | 60° | 33 nm | 2.5 μm | 1.050 | 0.952 |
| Comparative Example 1-4 | Parallel | Positive | CLC | 1 layer | Uniform | 50° | 30° | 58 nm | 2.1 μm | 1.107 | 0.943 |
| Comparative Example 1-5 | Parallel | Negative | DLC | 1 layer | Uniform | 30° | 60° | 60 nm | 1.0 μm | 1.050 | 0.952 |
| Comparative Example 1-6 | Parallel | Negative | DLC | 1 layer | Uniform | 30° | 60° | 250 nm | 5.0 μm | 1.050 | 0.952 |

Figure 39:
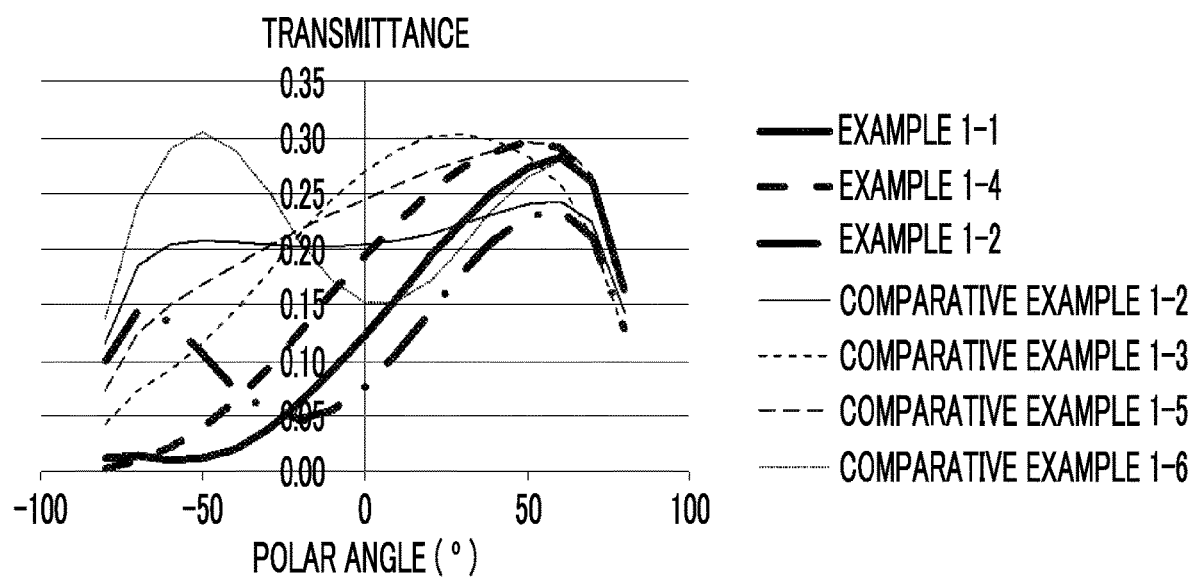
FIG. 39 is a graph showing the relationship between the polar angle and the transmittance.
Figure 40:
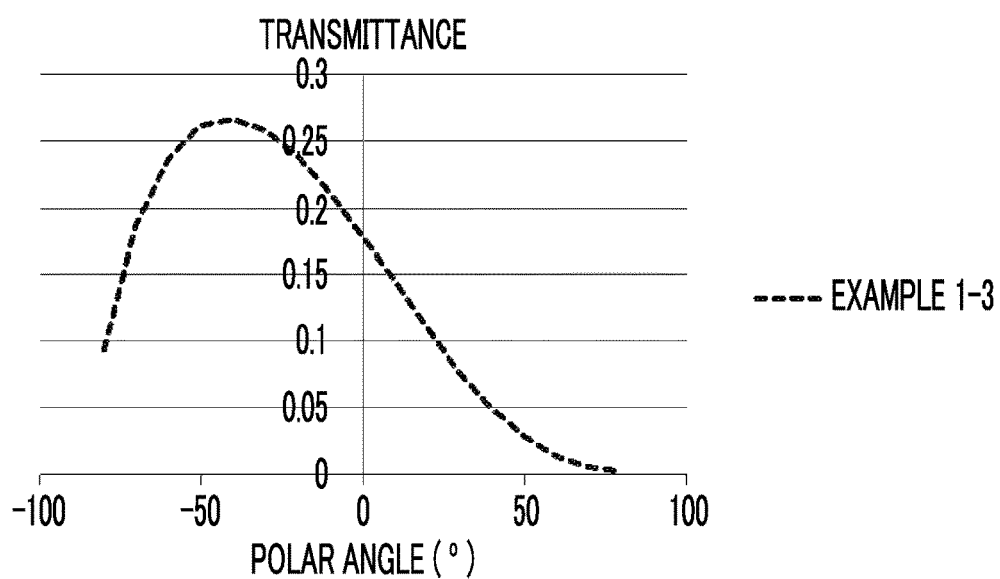
FIG. 40 is a graph showing the relationship between the polar angle and the transmittance.
Figure 41:
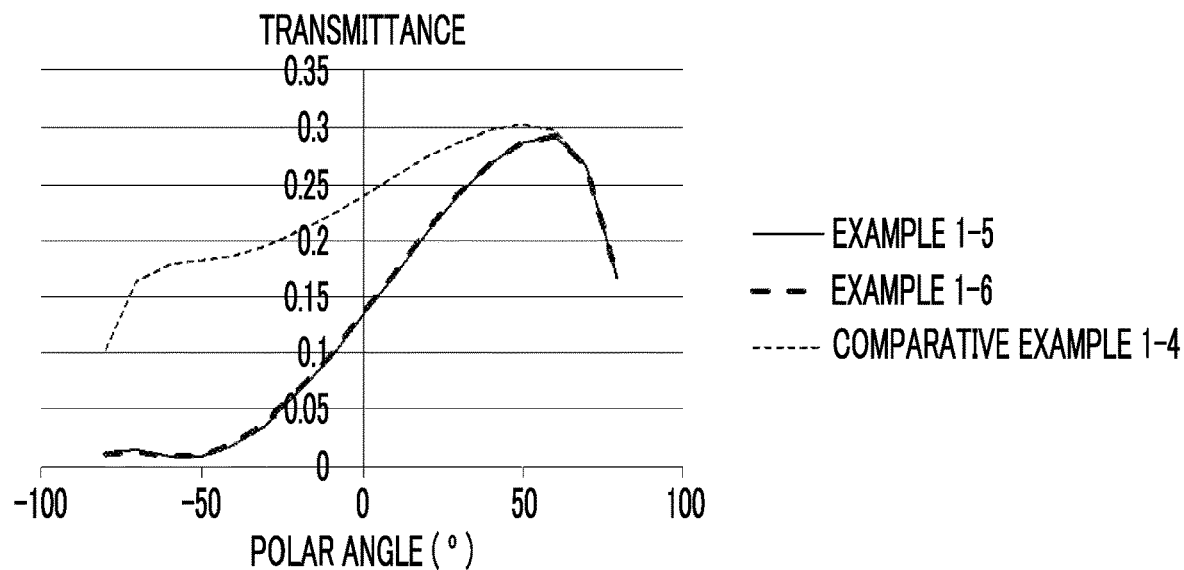
FIG. 41 is a graph showing the relationship between the polar angle and the transmittance.

In each Example and Comparative Example, the luminance distribution of the emitted light from the image display apparatus was determined by simulation. Contour diagrams of each of the Examples and Comparative Examples are shown in FIG. 28 to FIG. 38. These contour diagrams show the transmittance at 550 nm in a case where the light from the backlight passes through the optical film (polarizer+optically anisotropic layer) and the backlight-side polarizing plate. These transmittances substantially correspond to the luminance distribution of the image evaluation device. The transmittance is the proportion of the transmitted light intensity with respect to the incident light intensity, and unless particularly stated otherwise, the transmittance is not shown as a percentage (%). Furthermore, FIG. 39 to FIG. 41 show graphs indicating the relationship between the polar angle and the transmittance in the horizontal direction.

In each Example and Comparative Example, the value of (transmittance at a polar angle of −40°)÷(transmittance at a polar angle of 40°) in the horizontal direction was determined, the right-to-left difference in luminance was determined, and they were evaluated according to the following criteria. In Examples 1-3 and Comparative Example 1-6, the right-to-left difference in luminance was determined from (transmittance at a polar angle of) 40°)÷(transmittance at a polar angle of −40°).

A: The right-to-left difference is 0.1 or less.

B: The right-to-left difference is more than 0.1 and 0.4 or less.

C: The right-to-left difference is more than 0.4.

Furthermore, in each of the Examples, the uniformity of tint was evaluated by ΔE according to the following criteria. ΔE is the maximum value in a case where, with regard to the hue at the time of observing the center point of the contour diagram, that is, the image display apparatus, from the front, the color difference of all other points on the contour diagram is determined. Here, the color difference calculated based on L*a*b* reference is simulated.

AA: ΔE is 50 or less.

A: ΔE is more than 50 and 69 or less.

B: ΔE is more than 69.

The results are shown in Table 3.

TABLE 3

| | Evaluation | | |
|---|---|---|---|
| | Right-to-left difference | | Tint uniformity (ΔE) |
| Example 1-1 | 0.08 | A | A (63) |
| Example 1-2 | 0.36 | B | — |
| Example 1-3 | 0.19 | B | A (51) |
| Example 1-4 | 0.22 | B | B (71) |
| Example 1-5 | 0.07 | A | B (73) |
| Example 1-6 | 0.07 | A | AA (46) |
| Comparative Example 1-1 | 1.00 | C | — |
| Comparative Example 1-2 | 0.89 | C | — |
| Comparative Example 1-3 | 0.49 | C | — |
| Comparative Example 1-4 | 0.63 | C | — |
| Comparative Example 1-5 | 0.64 | C | — |
| Comparative Example 1-6 | 1.22 | C | — |

From each contour diagram, a graph showing the relationship between the polar angle and the transmittance, and the results in Table 3, it can be seen that the image display apparatus according to the embodiment of the invention can have asymmetry in the display characteristics in the right-to-left direction. As a result, the reflected glare on the window glass can be reduced.

From a comparison between Example 1-1 and Example 1-4, it is understood that it is preferable that the liquid crystal compound is uniformly inclined in the thickness direction in the liquid crystal cured layer.

Furthermore, from a comparison between Example 1-1 and Example 1-5, from the viewpoint of the uniformity of tint (optical compensation), it is preferable to use a disk-like liquid crystal compound, and from the viewpoint of the right-to-left difference in brightness (contrast), it can be seen that it is preferable to use a rod-like liquid crystal compound.

Furthermore, from a comparison between Example 1-1 and Example 1-6, it can be seen that it is preferable that the optically anisotropic layer has reverse wavelength dispersibility.

Next, Examples of the image display apparatus of the second aspect will be described.

Example 2-1

An optical film was produced in the same manner as in Example 1-1.

(Production of Image Display Apparatus)

Figure 42:
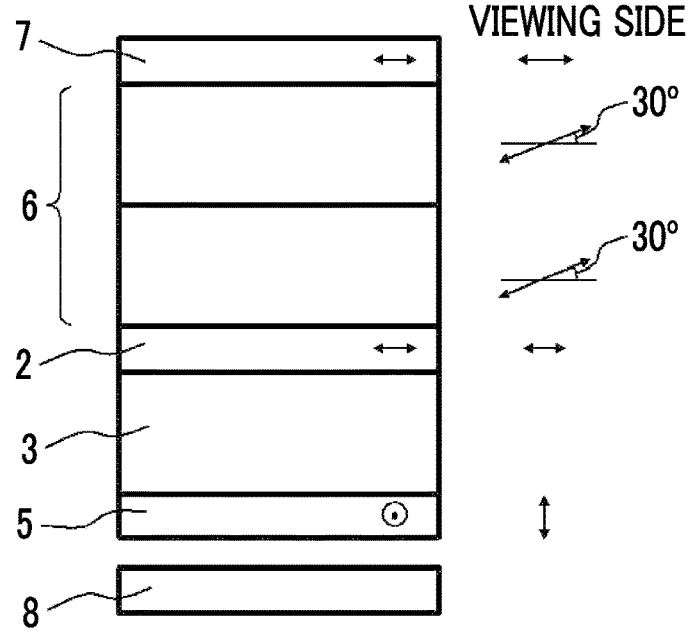
FIG. 42 is a diagram conceptually showing a layer configuration of Example 2-1.
Figure 45:
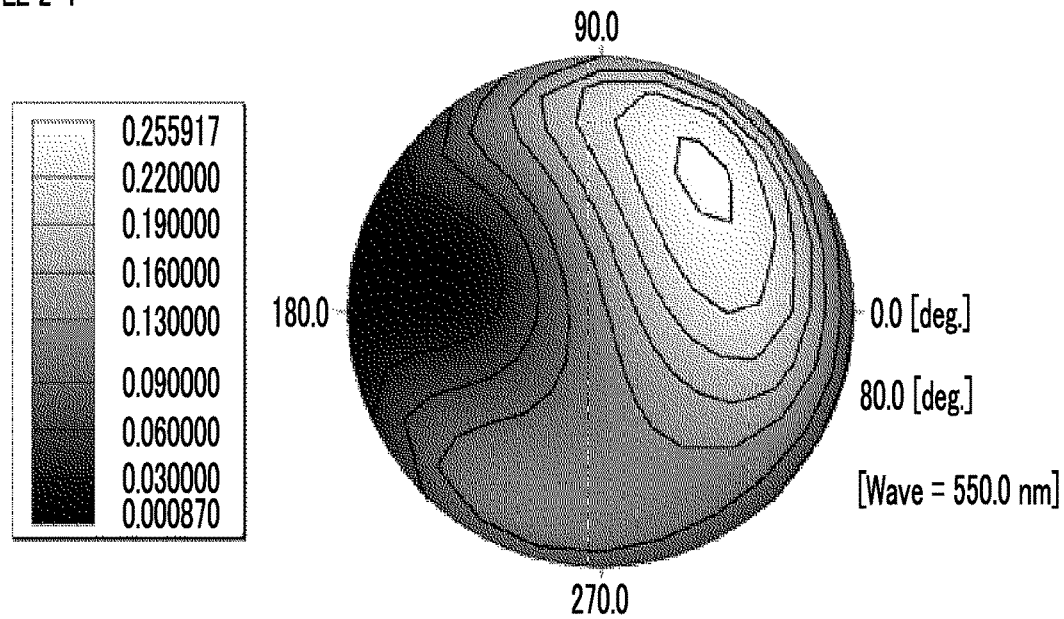
FIG. 45 is a contour diagram showing the simulation results.
Figure 46:
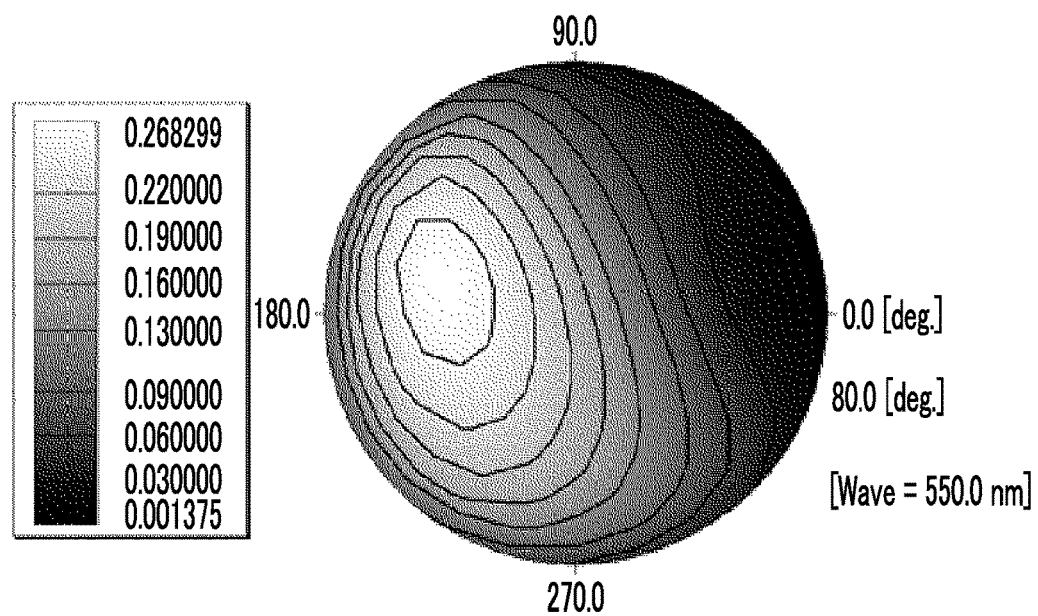
FIG. 46 is a contour diagram showing the simulation results.
Figure 47:
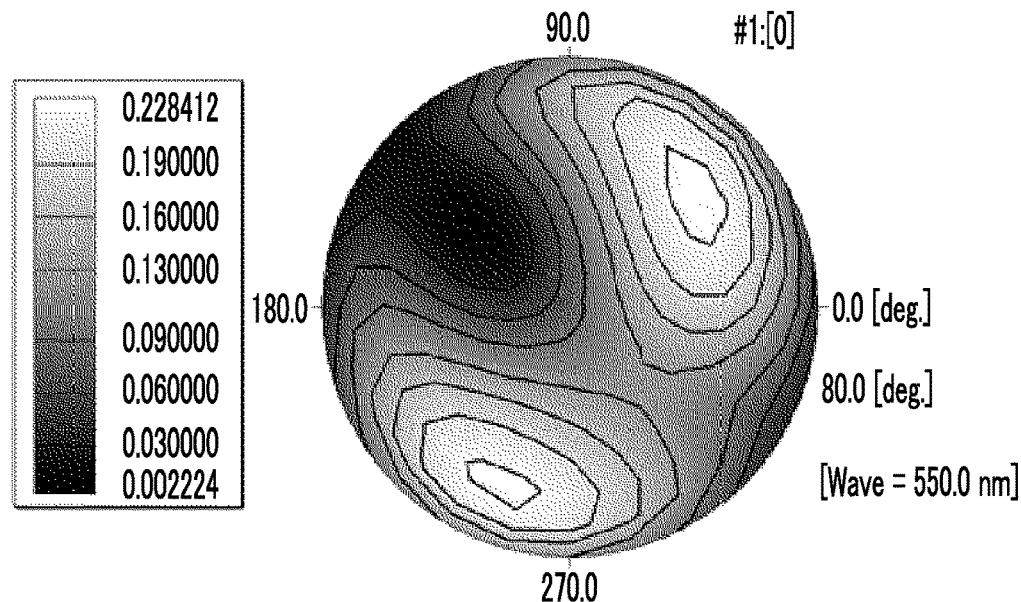
FIG. 47 is a contour diagram showing the simulation results.
Figure 48:
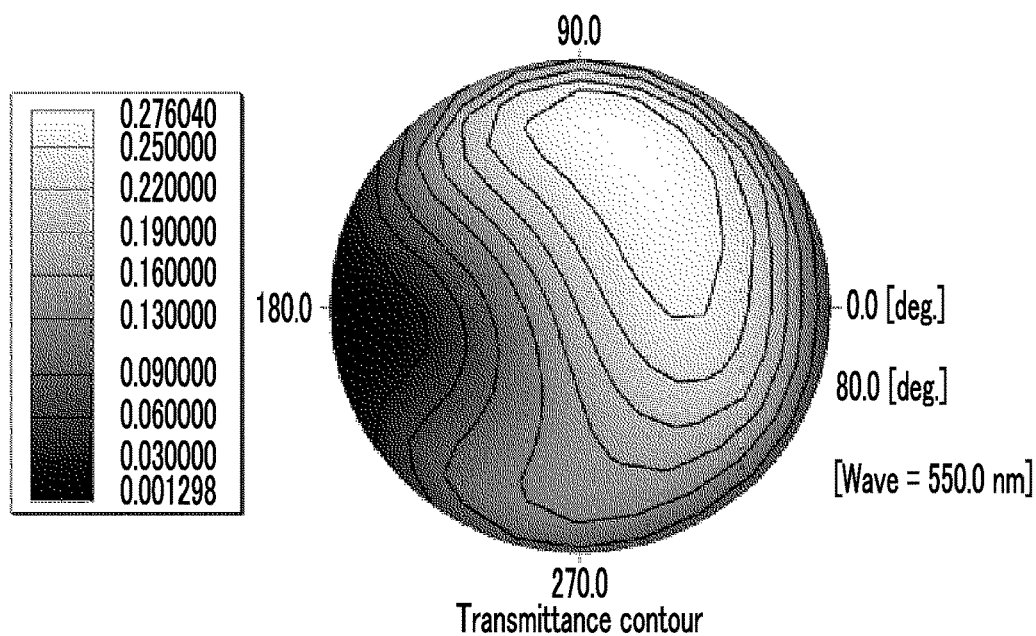
FIG. 48 is a contour diagram showing the simulation results.
Figure 49:
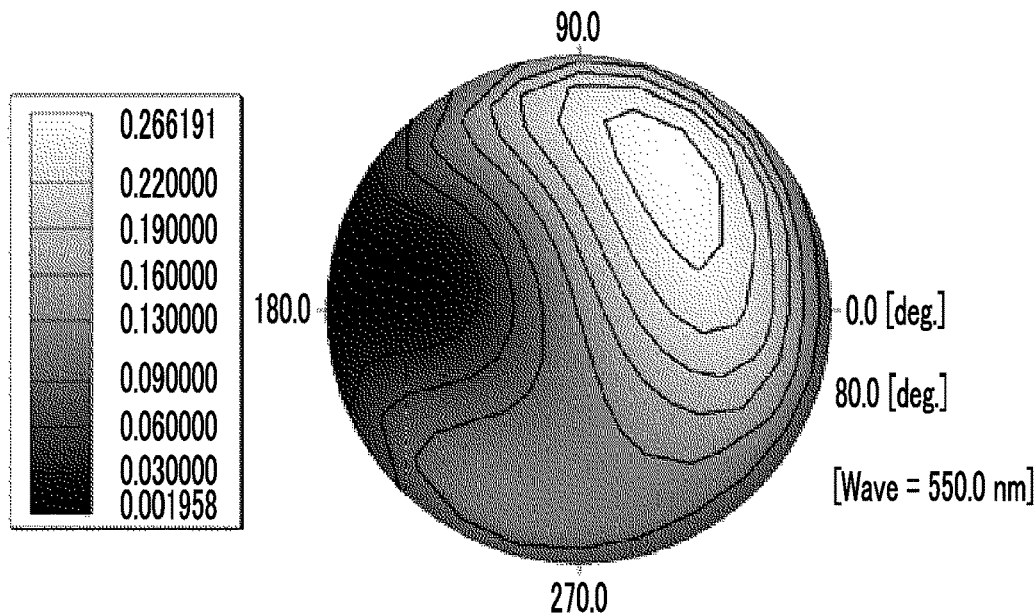
FIG. 49 is a contour diagram showing the simulation results.
Figure 50:
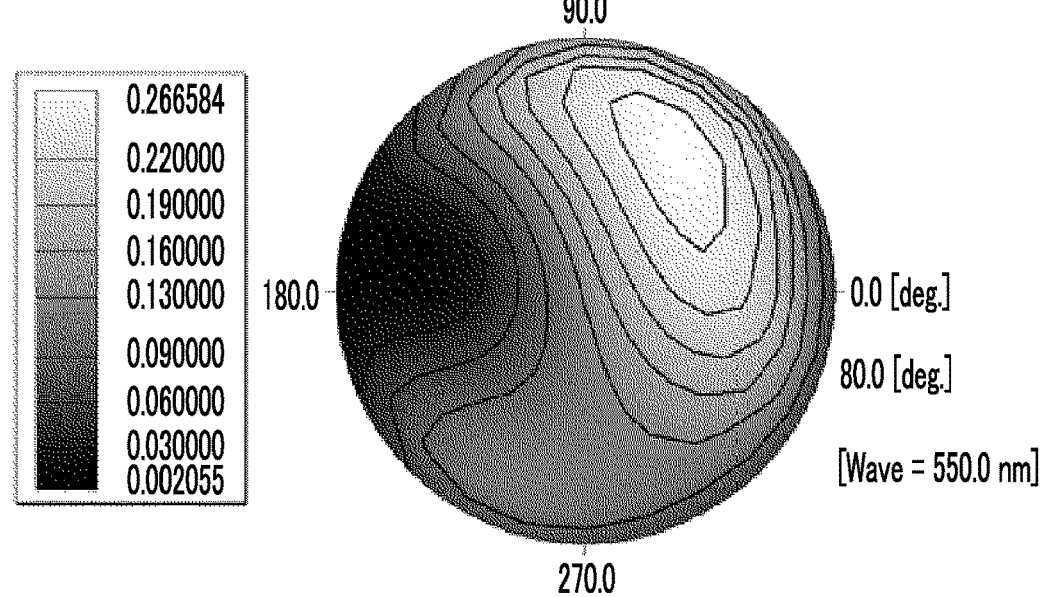
FIG. 50 is a contour diagram showing the simulation results.
Figure 51:
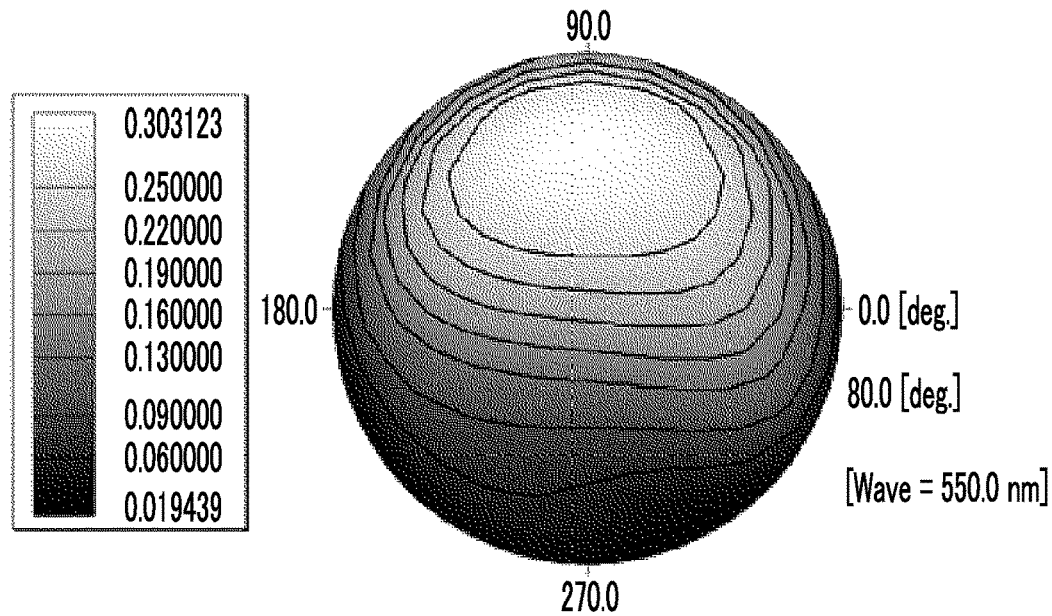
FIG. 51 is a contour diagram showing the simulation results.
Figure 52:
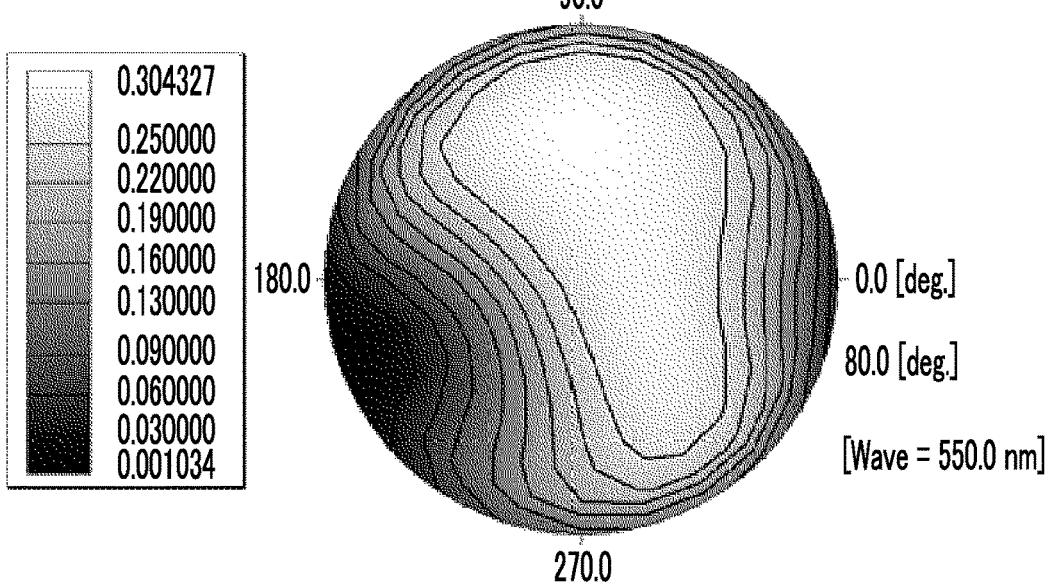
FIG. 52 is a contour diagram showing the simulation results.
Figure 53:
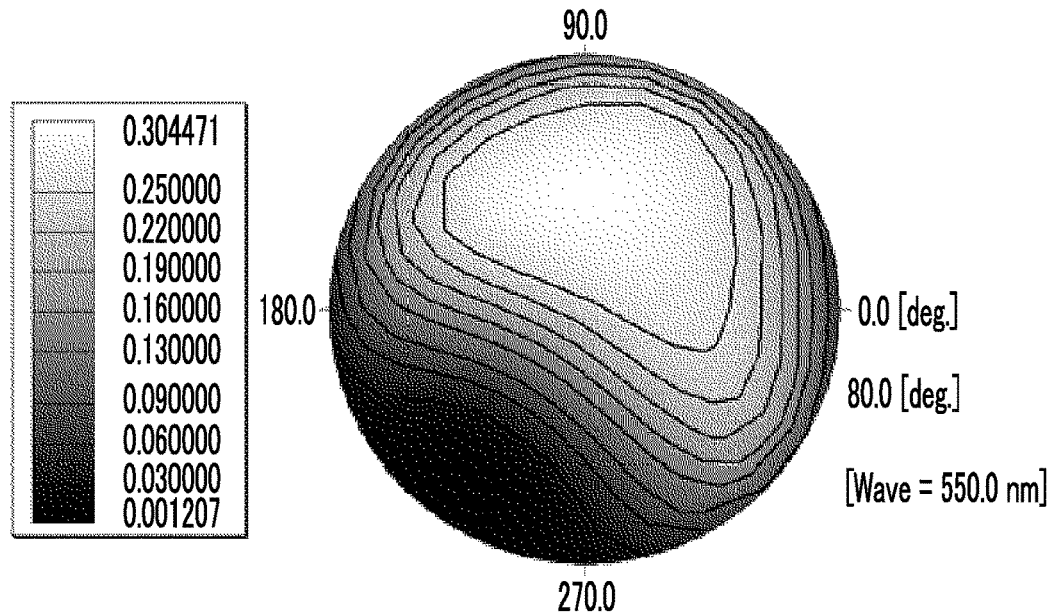
FIG. 53 is a contour diagram showing the simulation results.
Figure 54:
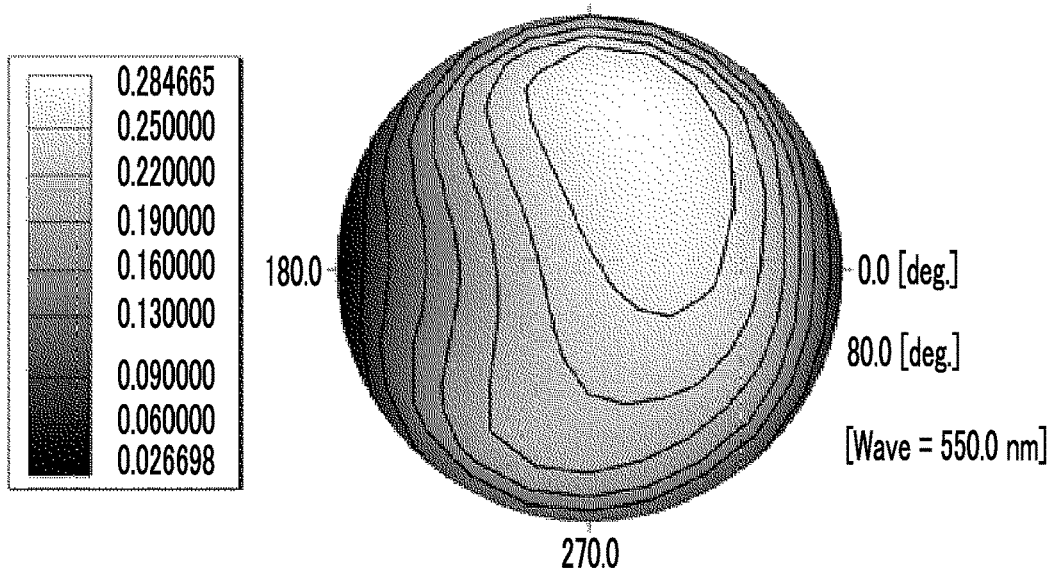
FIG. 54 is a contour diagram showing the simulation results.
Figure 55:
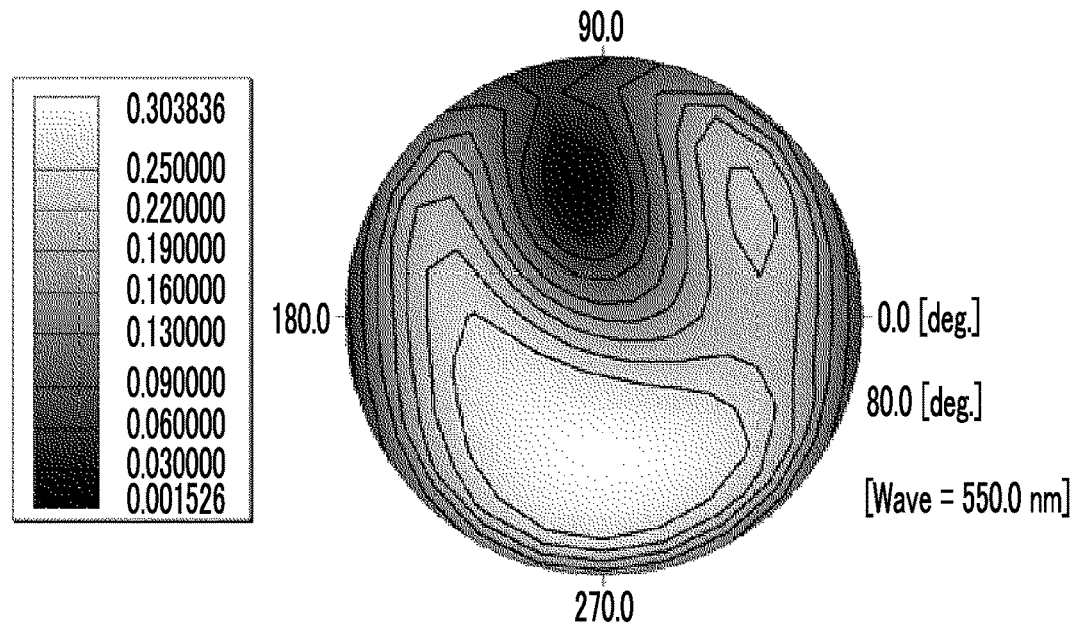
FIG. 55 is a contour diagram showing the simulation results.

The produced optical film was mounted on a display as follows to produce an image display apparatus having the configuration shown in FIG. 42.

A notebook PC (personal computer) manufactured by Lenovo Group, Ltd., ThinkPad T490s, was used for the display, and the liquid crystal display element portion was disassembled to take out the liquid crystal display panel. At that time, the directions of the absorption axes of the polarizing plates disposed on both sides of the liquid crystal cell of ThinkPad T490s were checked. It was confirmed that the absorption axis of the viewing-side polarizing plate was in the horizontal direction, and the absorption axis of the backlight-side polarizing plate was in the vertical direction. Subsequently, the optical film was bonded and mounted on the viewing-side polarizing plate. At that time, the absorption axis of the polarizer was disposed so as to be parallel to the absorption axis of the viewing-side polarizing plate. The liquid crystal display panel on which the optical film was mounted was returned to the notebook PC main body, and an image display apparatus having the configuration shown in FIG. 42 was produced. Furthermore, the azimuthal angle α of the optic axis of the optically anisotropic layer in a state of being incorporated into the image display apparatus was 60°, and the tilt angle β was 30° (see FIG. 2).

Example 2-2

An optical film was produced in the same manner as in Example 2-1, except that the angle formed by the optic axis of the liquid crystal cured layer Y1 in a case where the optic axis was projected onto the polarizing plate, and by the absorption axis of the polarizer would be 30°, and an image display apparatus was produced in the same manner as in Example 1, except that the absorption axis of the polarizer of the optical film was disposed so as to be orthogonal to the absorption axis of the viewing-side polarizing plate. The azimuthal angle α of the optic axis of the optically anisotropic layer in the state of being incorporated into the image display apparatus is 60°, and the tilt angle β is 30°.

Example 2-3

A transfer film Z2 was produced in the same manner as in Example 1-2, and an optical film was produced using this as an optically anisotropic layer. That is, the optical film of Example 2-3 had a support, an alignment film, a liquid crystal layer X2, a liquid crystal cured layer Y2, and a polarizer. With regard to Example 2-3, it can be said that the liquid crystal layer X2 is a liquid crystal cured layer included in the optically anisotropic layer.

(Production of Image Display Apparatus)

An image display apparatus was produced in the same manner as in Example 2-1, except that the optical film Z2 was used and peeling of the support, the alignment film, and the liquid crystal layer X2 was not carried out.

Comparative Example 2-1

A display panel having neither an optically anisotropic layer nor a polarizing plate 7, that is, a liquid crystal display device of a Lenovo notebook PC, ThinkPad T490s, was designated as Comparative Example 1-1.

<Evaluation>

The visibility from the right-hand and left-hand sides and the front of the produced image display apparatus, the presence or absence of moire, and the reflected glare on the glass at the time of assuming an in-vehicle display were evaluated by similar evaluation methods as described above.

The results are shown in Table 4. In Table 4, the direction of the absorption axis is the direction of the absorption axis of the polarizer with respect to the direction of the absorption axis of the viewing-side polarizing plate.

TABLE 4

| | | Optically ainsotropic layer | | | | Evaluation | | | | |
|---|---|---|---|---|---|---|---|---|---|---|
| | Direction of absorption axis | Alignment state of liquid crystal cured layer | Average tilt angle (°) | Azimuthal angle (°) | Front phase difference (nm) | Direct visibility (brightness) | | | Reflected glare | Moire |
| | | | | | | −60° direction | 0° direction | 60° direction | | |
| Example 2-1 | Parallel | Uniform | 30 | 60 | 125 | A | B | C | A | None |
| Example 2-2 | Orthogonal | Uniform | 30 | 60 | 125 | C | B | A | A | None |
| Example 2-3 | Parallel | Hybrid | 43 | 60 | 230 | B | B | C | B | None |
| Comparative Example 2-1 | — | — | — | — | — | C | C | C | C | None |

From Table 4, it is understood that in Examples 2-1 and 2-3 of the invention, the image in the case of being observed from the left-hand side (−60° direction) of the screen was not sufficiently visible due to a decrease in brightness, and the image in the case of being observed from the right-hand side (60° direction) was seen brightly and clearly. Furthermore, moire was not visible. It is understood that in Example 2-2, the image in the case of being observed from the right-hand side (60° direction) of the screen was not sufficiently visible due to a decrease in brightness, and the image in the case of being observed from the left-hand side (−60° direction) was seen brightly and clearly.

Above all, in Example 2-1, the image in the case of being observed from the left-hand side (−60° direction) of the screen became less visible. Furthermore, in Example 2-3, the change in hue in the case of being observed from the left-hand side (−60° direction) of the screen was large, whereas in Example 2-1, the change in hue was small and satisfactory. It can be seen that in Example 2-1 as compared with Example 2-3, the reflected glare on the glass was further reduced.

In contrast, in Comparative Example 2-1, the same bright image was clearly visible regardless of whether the image was observed from the right or the left. Furthermore, in the Examples, the reflected glare on the glass was hardly visible, whereas in Comparative Example 2-1, the reflected glare on the glass was clearly visible. From these results, it is understood that the Examples sufficiently fulfill the object of the invention.

[Simulation]

Next, the image display apparatus of the second aspect of the invention was examined by using a simulation.

An optical simulation was performed by using LCD MASTER ver. 9 (Sintech, Inc.). Examples 2-1 to 2-3 and Comparative Example 2-1 in the simulation were set based on the specifications of Examples 2-1 to 2-3 and Comparative Example 2-1 described above.

Furthermore, in the simulation, the structure shown in FIG. 43 or FIG. 44 was adopted for the configuration of the image display apparatus.

In Examples 2-1 and 2-3 to 2-6, and Comparative Examples 2-2 to 2-6, the image display apparatus was configured such that, as shown in FIG. 43, the direction of the absorption axis of the viewing-side polarizing plate 2 was the horizontal direction, and the direction of the absorption axis of the backlight-side polarizing plate 5 was the vertical direction. Furthermore, the direction of the absorption axis of the polarizer 7 of the optical film 4 was configured to be parallel to the absorption axis of the viewing-side polarizing plate 5. Furthermore, in Example 2-2, as shown in FIG. 44, the direction of the absorption axis of the viewing-side polarizing plate 2 was the horizontal direction, and the direction of the absorption axis of the backlight-side polarizing plate 5 was the vertical direction. Furthermore, the direction of the absorption axis of the polarizer 7 of the optical film 4 was configured to be orthogonal to the absorption axis of the viewing-side polarizing plate 5.

In each of the Examples, the type of liquid crystal compound in the optically anisotropic layer, the positivity or negativity of the refractive index anisotropy, the number of layers of the liquid crystal cured layer, the alignment state, the average tilt angle of the optic axis, the azimuthal angle of the optic axis, the in-plane phase difference Re (550), thickness, and wavelength dispersibility were set as shown in the following Table 5. In Table 5, the direction of the absorption axis of the polarizer is the direction of the viewing-side polarizing plate with respect to the absorption axis. The type of the liquid crystal compound is indicated such that a disk-like liquid crystal compound is denoted as DLC and a rod-like liquid crystal compound is denoted as CLC. Furthermore, in Example 2-3, the average tilt angle of the optic axis for each of the first liquid crystal cured layer X2 and the second liquid crystal cured layer Y2, and the average tilt angle of the optic axis as the total optically anisotropic layer are shown.

(Refractive Index of Optical Simulation)

The ordinary light refractive index no and the extraordinary light refractive index ne of the optically anisotropic layer used in the optical simulation were as follows. The numbers in parentheses mean wavelengths.

Refractive indices of liquid crystal compounds of Examples 2-5 and Comparative Example 2-4: no (450)=1.525, ne (450)=1,658, no (550)=1.503, ne (550)=1,623, no (650)=1.497, ne (650)=1.610, Refractive indices of liquid crystal compound of Example 2-6: no (450)=1.525, ne (450)=1.628, no (550)=1.503, ne (550)=1.623, no (650)=1.497, ne (650)=1.620.

Refractive indices of liquid crystal compound in liquid crystal cured layer X2 of first layer of Example 2-3: no (450)=1.614, ne (450)=1.543, no (550)=1,603, ne (550)=1.543, no (650)=1.598, ne (650)=1.543.

Refractive indices of liquid crystal compounds of other Examples and Comparative Examples (including second liquid crystal cured layer Y2 of Example 2-3): no (450)=1.652, ne (450)=1.547, no (550)=1.650, ne (550)=1.550, no (650)=1.647, ne (650)=1.552.

(Front Phase Difference of Optical Simulation)

The film thickness was adjusted such that the front phase difference (retardation) at 550 nm of the optically anisotropic layer would be 250 nm.

Furthermore, in Example 2-3, the tilt angle of the optic axis on the alignment film side of the first liquid crystal cured layer X2 was 83°, the tilt angle of the optic axis on the liquid crystal cured layer Y2 side was 39°, the tilt angle of the optic axis on the liquid crystal cured layer X2 side of the liquid crystal cured layer Y2 was 39°, and the tilt angle of the optic axis on the air interface side was 11°.

Furthermore, in Example 2-4, the tilt angle of the optic axis on the alignment film side of the optically anisotropic layer (liquid crystal cured layer) was 75°, and the tilt angle of the optic axis on the air interface side was 12°.

TABLE 5

| | | Optically anisotropic layer | | | | | | | | | |
|---|---|---|---|---|---|---|---|---|---|---|---|
| | Polarizer Direction of absorption axis | Refractive index anisotropy | Type of liquid crystal compound | Number of layers of liquid crystal cured layer | Alignment state | Average tilt angle | Azimuthal angle | In-plane phase difference Re (550) | Thickness | Wavelength dispersability Re450/Re550 | Re650/Re550 |
| Example 2-1 | Parallel | Negative | DLC | 1 layer | Uniform | 30° | 60° | 125 nm | 2.5 µm | 1.050 | 0.952 |
| Example 2-2 | Orthogonal | Negative | DLC | 1 layer | Uniform | 30° | 60° | 125 nm | 2.5 µm | 1.050 | 0.952 |
| Example 2-3 | Parallel | Negative | DLC | 2 layers | Hybrid | 61° 43° (Y2) (X2) 25° + (X2) Y2) | 60° | 230 nm | 2.8 µm 2.2 µm | 1.050 1.183 | 0.952 0.920 |
| Example 2-4 | Parallel | Negative | DLC | 1 layer | Hybrid | 44° | 60° | 86 nm | 2.5 µm | 1.050 | 0.952 |
| Example 2-5 | Parallel | Positive | CLC | 1 layer | Uniform | 30° | 60° | 125 nm | 2.1 µm | 1.107 | 0.943 |
| Example 2-6 | Parallel | Positive | CLC | 1 layer | Uniform | 30° | 60° | 125 nm | 2.1 µm | 0.860 | 1.023 |
| Comparative Example 2-1 | | | | | No optical film | | | | | | |
| Comparative Example 2-2 | Parallel | Negative | DLC | 1 layer | Uniform | 30° | 20° | 125 nm | 2.5 µm | 1.050 | 0.952 |

TABLE 5-continued

| | | | | | | | | | | Wavelength dispersability | |
|---|---|---|---|---|---|---|---|---|---|---|---|
| | Polarizer Direction of absorption axis | Refractive index anisotropy | Type of liquid crystal compound | Number of layers of liquid crystal cured layer | Alignment state | Average tilt angle | Azimuthal angle | In-plane phase difference Re (550) | Thickness | Re450/Re550 | Re650/Re550 |
| Comparative Example 2-3 | Parallel | Negative | DLC | 1 layer | Uniform | 60° | 60° | 33 nm | 2.5 μm | 1.050 | 0.952 |
| Comparative Example 2-4 | Parallel | Positive | CLC | 1 layer | Uniform | 50° | 30° | 58 nm | 2.1 μm | 1.107 | 0.943 |
| Comparative Example 2-5 | Parallel | Negative | DLC | 1 layer | Uniform | 30° | 60° | 60 nm | 1.0 μm | 1.050 | 0.952 |
| Comparative Example 2-6 | Parallel | Negative | DLC | 1 layer | Uniform | 30° | 60° | 250 nm | 5.0 μm | 1.050 | 0.952 |

Figure 56:
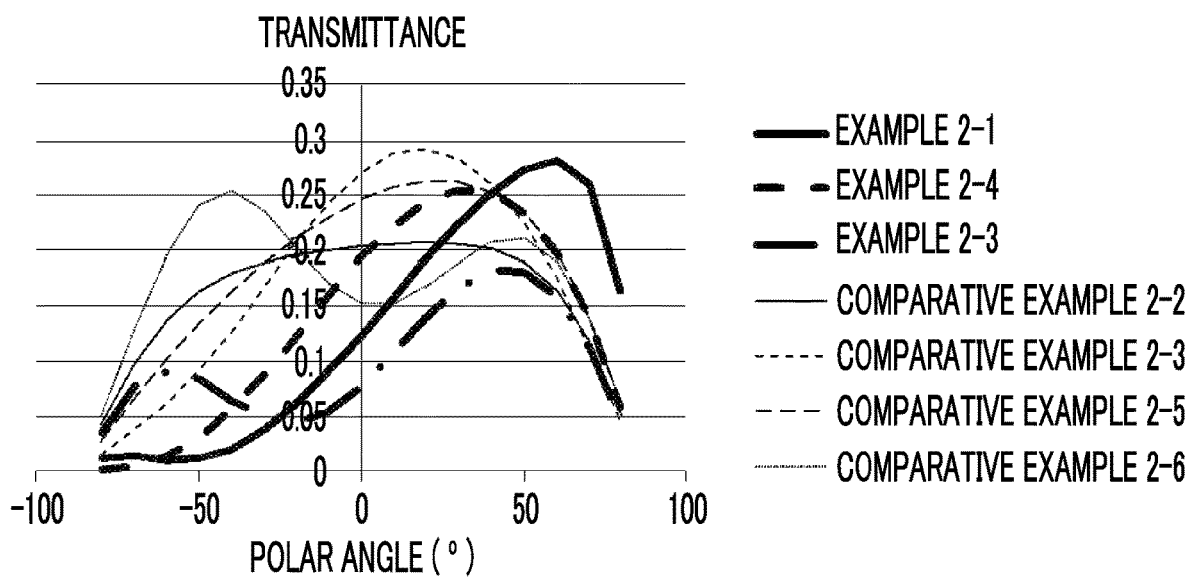
FIG. 56 is a graph showing the relationship between the polar angle and the transmittance.
Figure 57:
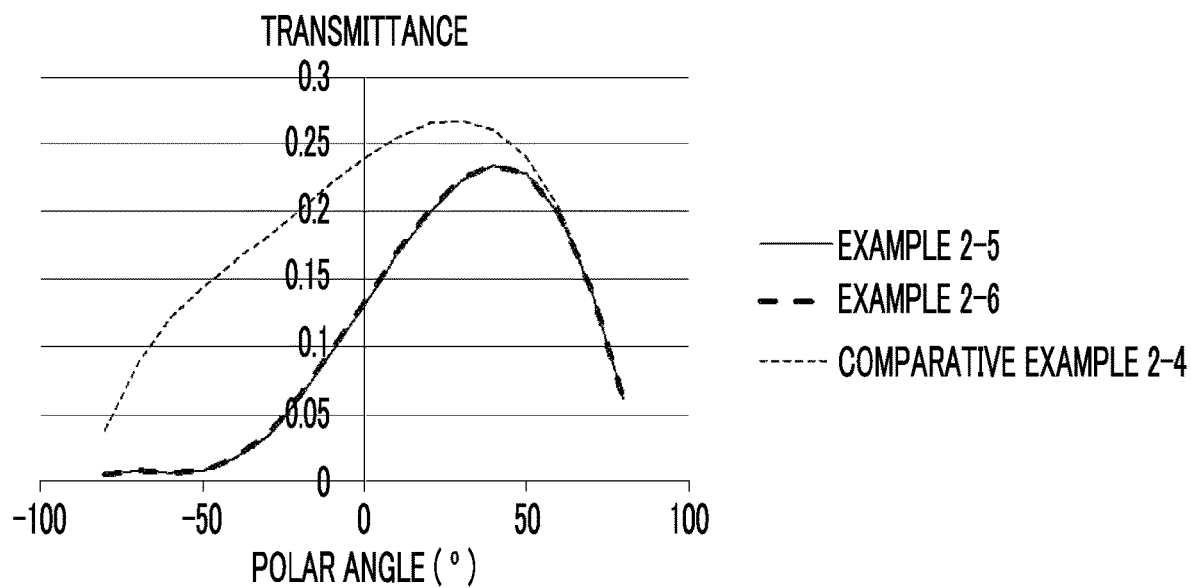
FIG. 57 is a graph showing the relationship between the polar angle and the transmittance.
Figure 58:
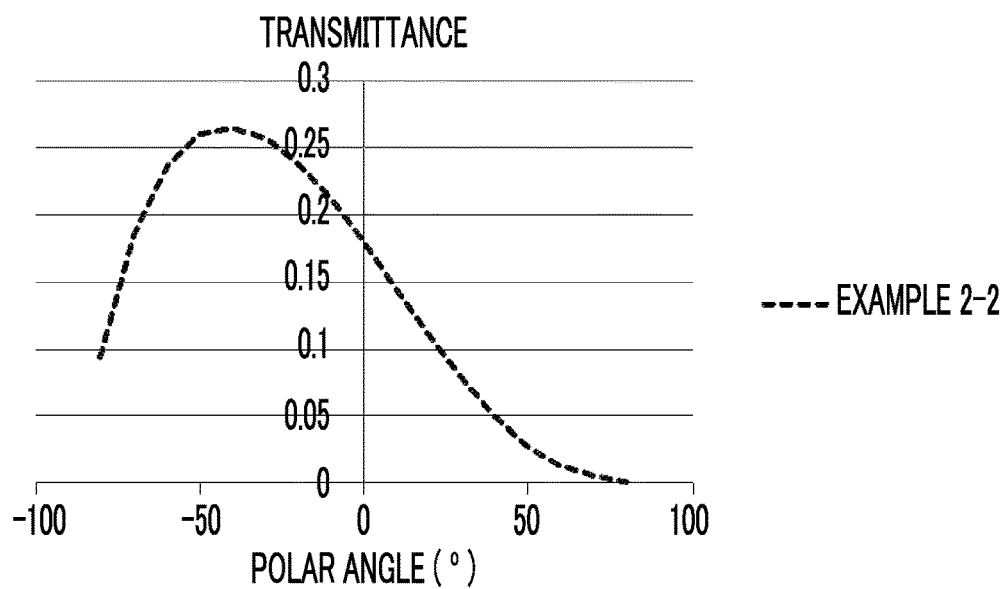
FIG. 58 is a graph showing the relationship between the polar angle and the transmittance.

In each Example and Comparative Example, the luminance distribution of the emitted light from the image display apparatus was determined by simulation. Contour diagrams of each of the Examples and Comparative Examples are shown in FIG. 45 to FIG. 55. These contour diagrams show the transmittance at 550 nm in a case where the light from the backlight passes through the optical film (polarizer+optically anisotropic layer) and the backlight-side polarizing plate. These transmittances substantially correspond to the luminance distribution of the image evaluation device. Furthermore, FIG. 56 to FIG. 58 show graphs indicating the relationship between the polar angle and the transmittance in the horizontal direction.

Furthermore, in each of the Examples and Comparative Examples, the right-to-left difference in luminance and the uniformity of tint ΔE were evaluated by evaluation methods similar to those described above.

In Examples 2-2 and Comparative Example 2-6, the right-to-left difference in luminance was determined from (transmittance at a polar angle of) 40°÷(transmittance at a polar angle of −40°).

The results are shown in Table 6,

TABLE 6

| | Evaluation | |
|---|---|---|
| | Right-to-left difference | Tint uniformity (ΔE) |
| Example 2-1 | 0.08 | A    A (62) |
| Example 2-2 | 0.19 | B    A (51) |
| Example 2-3 | 0.36 | B    — |
| Example 2-4 | 0.22 | B    A (56) |
| Example 2-5 | 0.07 | A    B (70) |
| Example 2-6 | 0.07 | A    AA (46) |
| Comparative Example 2-1 | 1.00 | C    — |
| Comparative Example 2-2 | 0.89 | C    — |
| Comparative Example 2-3 | 0.49 | C    — |
| Comparative Example 2-4 | 0.63 | C    — |
| Comparative Example 2-5 | 0.64 | C    — |
| Comparative Example 2-6 | 1.22 | C    — |

From each contour diagram, a graph showing the relationship between the polar angle and the transmittance, and the results in Table 6, it can be seen that the image display apparatus according to the embodiment of the invention can have asymmetry in the display characteristics in the right-to-left direction. As a result, the reflected glare on the window glass can be reduced.

From a comparison between Example 2-1 and Example 2-4, it is understood that it is preferable that the liquid crystal compound is uniformly inclined in the thickness direction in the liquid crystal cured layer.

Furthermore, from a comparison between Example 2-1 and Example 2-5, from the viewpoint of the uniformity of tint (optical compensation), it is preferable to use a disk-like liquid crystal compound, and from the viewpoint of the right-to-left difference in brightness (contrast), it can be seen that it is preferable to use a rod-like liquid crystal compound.

Furthermore, from a comparison between Example 2-1 and Example 2-6, it can be seen that it is preferable that the optically anisotropic layer has reverse wavelength dispersibility.

From the above results, the effect of the present invention is obvious.

Explanation of References 1, 1b: image display apparatus
2: viewing-side polarizing plate
3: liquid crystal cell
4: optical film
5: backlight-side polarizing plate
6: optically anisotropic layer
7: polarizer
8: backlight
10: reflector
11: side window
12: observer (driver)
20: support
22: liquid crystal layer
23: liquid crystal compound
24: liquid crystal cured layer

What is claimed is:

1. An image display apparatus comprising in the following order:
an optical film;
a viewing-side polarizing plate;
a liquid crystal cell;
a backlight-side polarizing plate; and
a backlight in this order,
wherein the optical film includes an optically anisotropic layer and a polarizer in this order from a liquid crystal cell side,
an absorption axis of the viewing-side polarizing plate and an absorption axis of the polarizer are parallel or orthogonal to each other, the optically anisotropic layer is optically uniaxially anisotropic, while in a case where an optic axis of the optically anisotropic layer is projected onto the polarizer as viewed from a viewing-side of the image display apparatus, an azimuthal angle of the optic axis is +50° to +70° or −50° to −70° with respect to a horizontal direction, an average tilt angle of the optic axis with respect to a main surface of the optically anisotropic layer is 20° to 45°, an in-plane phase difference Re (550) of the optically anisotropic layer at a wavelength of 550 nm is 70 nm to 240 nm, and the image display characteristics are asymmetric in right-to-left direction.

2. An optical film comprising at least:

an optically anisotropic layer; and a polarizer, wherein the optically anisotropic layer is optically uniaxially anisotropic, while in a case where an optic axis of the optically anisotropic layer is projected onto the polarizer as viewed from an optically anisotropic layer side, an angle formed by the optic axis and an absorption axis of the polarizer is +50° to +70° or −50° to −70°, an average tilt angle of the optic axis with respect to a main surface of the optically anisotropic layer is 20° to 45°, and an in-plane phase difference Re (550) of the optically anisotropic layer at a wavelength of 550 nm is 70 nm to 240 nm.

3. The image display apparatus according to claim 2, wherein the optically anisotropic layer has a liquid crystal cured layer formed of a liquid crystal composition including a liquid crystal compound, and the liquid crystal compound is aligned so as to be uniformly inclined over a thickness direction in the liquid crystal cured layer.

4. The optical film according to claim 3, wherein the liquid crystal compound is a disk-like liquid crystal compound or a rod-like liquid crystal compound.

5. The optical film according to claim 2, wherein an in-plane phase difference Re (λ) of the optically anisotropic layer satisfies relationships of the following Formula (3) and Formula (4):

Re(450)/Re(550)<1.0 (3)

Re(650)/Re(550)>1.0 (4)

6. The image display apparatus according to claim 2, wherein the optically anisotropic layer has a liquid crystal cured layer formed of a liquid crystal composition including a liquid crystal compound, and the liquid crystal composition includes 0.1 to 3.0 parts by mass of a polymer A including at least constitutional units represented by the following General Formula (1) and General Formula (2) per 100 parts by mass of the liquid crystal compound:

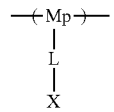

General Formula (1)

in General Formula (1), Mp represents a trivalent group constituting a portion or the entirety of the polymer main chain; L represents a single bond or a divalent linking group; and X represents a substituted or unsubstituted aromatic ring or a group in which a plurality of substituted or unsubstituted aromatic rings are bonded through a single bond,

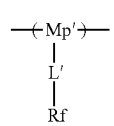

General Formula (2)

in General Formula (2), Mp' represents a group represented by Formula (X1) or a group represented by Formula (X2), L' represents a single bond or a divalent linking group, and Rf represents an alkyl group having a $CF_3$ group or a $CF_2H$ group at an end and represents an alkyl group in which 50% or more of hydrogen atoms in the alkyl group have been substituted with fluorine atoms, and in Formula (X1) and Formula (X2), the symbol * represents the bonding position, provided that a hydrogen atom in Formula (X1) and Formula (X2) may be substituted with a substituent

(X1)

(X2)

7. An optical film comprising at least:

an optically anisotropic layer; and a polarizer, wherein the optically anisotropic layer is optically uniaxially anisotropic, while in a case where an optic axis of the optically anisotropic layer is projected onto the polarizer as viewed from an optically anisotropic layer side, an angle formed by the optic axis and a transmission axis of the polarizer is +50° to +70° or −50° to −70°, an average tilt angle of the optic axis with respect to a main surface of the optically anisotropic layer is 20° to 45°, and an in-plane phase difference Re (550) of the optically anisotropic layer at a wavelength of 550 nm is 70 nm to 240 nm.

* * * * *